US011165544B2

(12) United States Patent
Verma et al.

(10) Patent No.: US 11,165,544 B2
(45) Date of Patent: Nov. 2, 2021

(54) MULTI-USER PREAMBLE FORMAT FOR A WIRELESS LOCAL AREA NETWORK

(71) Applicant: QUALCOMM Incorporated, San Diego, CA (US)

(72) Inventors: Lochan Verma, San Diego, CA (US); Bin Tian, San Diego, CA (US); Sameer Vermani, San Diego, CA (US); Youhan Kim, Saratoga, CA (US); Lin Yang, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 75 days.

(21) Appl. No.: 16/592,689

(22) Filed: Oct. 3, 2019

(65) Prior Publication Data

US 2020/0112408 A1    Apr. 9, 2020

Related U.S. Application Data

(60) Provisional application No. 62/741,477, filed on Oct. 4, 2018.

(51) Int. Cl.
*H04L 5/00*    (2006.01)
*H04B 7/0452*    (2017.01)
*H04W 84/12*    (2009.01)

(52) U.S. Cl.
CPC ......... *H04L 5/0037* (2013.01); *H04B 7/0452* (2013.01); *H04L 5/0023* (2013.01); *H04W 84/12* (2013.01)

(58) Field of Classification Search
CPC ... H04L 5/0037; H04L 5/0023; H04B 7/0452; H04W 84/12

(Continued)

(56) References Cited

U.S. PATENT DOCUMENTS

2015/0341102 A1* 11/2015 Erceg ................. H04L 5/005
                                                        370/338
2016/0204912 A1*  7/2016 Sun ................... H04L 1/0042
                                                        375/302

(Continued)

OTHER PUBLICATIONS

Chen (Intel) X., "Discussions on the PHY Features for EHT", IEEE Draft; 11-18-1461-01-0EHT-Discussions-on-the-PHY-Features-for-EHT, IEEE-SA Mentor, Piscataway, NJ, USA, vol. 802.11 EHT, No. 1, (Sep. 13, 2018), pp. 1-21, XP068128725, Retrieved from the Internet: URL: https://mentor.ieee.org/802.11/dcn/18/11-18-1461-01-0ehtdiscussions-on-the-phy-features-for-eht.pptx [retrieved on Sep. 13, 2018] p. 4, last point, p. 12, third point, p. 13, second point.

(Continued)

*Primary Examiner* — Congvan Tran
(74) *Attorney, Agent, or Firm* — Kevin T. Cheatham

(57) ABSTRACT

Methods, systems, and devices for wireless communications are described for control signaling in next generation wireless local area network (WLAN) environments. A message transmitted by an access point may allocate resources to a plurality of stations. The access point may be configured to allocate up to 320 MHz of total bandwidth along with coarse punctures. The access point may also allocate up to eight space-time streams to each station in a multi-user multiple-input multiple output (MU-MIMO) transmission, and support simultaneous transmission to up to sixteen stations. To support 320 MHz bandwidth and up to sixteen stations, one or more signaling fields used in other environments may be repurposed to effectively signal the additional resources available in a next generation WLAN.

30 Claims, 21 Drawing Sheets

(58) Field of Classification Search
USPC .......................................................... 370/330
See application file for complete search history.

(56) References Cited

U.S. PATENT DOCUMENTS

| | | | |
|---|---|---|---|
| 2017/0006608 A1* | 1/2017 | Josiam | H04L 5/0023 |
| 2017/0070998 A1* | 3/2017 | Wu | H04L 5/0094 |
| 2017/0181129 A1 | 6/2017 | Bharadwaj et al. | |
| 2018/0054810 A1* | 2/2018 | Shinohara | H04W 72/0406 |
| 2018/0092127 A1* | 3/2018 | Park | H04W 74/0816 |
| 2018/0124788 A1* | 5/2018 | Choi | H04W 72/0453 |
| 2018/0302858 A1* | 10/2018 | Son | H04L 1/00 |
| 2018/0309550 A1* | 10/2018 | Sun | H04L 5/0007 |
| 2019/0058569 A1* | 2/2019 | Seok | H04L 5/0007 |
| 2020/0015234 A1* | 1/2020 | Li | H04W 72/042 |
| 2021/0144696 A1* | 5/2021 | Cariou | H04L 27/2602 |

OTHER PUBLICATIONS

Partial International Search Report—PCT/US2019/054799—ISA/EPO—dated Jan. 27, 2020 (185221WO).
International Search Report and Written Opinion—PCT/US2019/054799—ISA/EPO—dated Apr. 9, 2020 (185221WO).

\* cited by examiner

MULTI-USER PREAMBLE FORMAT FOR A WIRELESS LOCAL AREA NETWORK

CROSS REFERENCES

The present Application for patent claims priority to U.S. Provisional Patent Application No. 62/741,477 by Verma et al., entitled "MULTI-USER PREAMBLE FORMAT FOR A WIRELESS LOCAL AREA NETWORK," filed Oct. 4, 2018, assigned to the assignee hereof, and expressly incorporated herein.

BACKGROUND

The following relates generally to wireless communications, and more specifically to multi-user preamble format for a wireless local area network (WLAN).

A WLAN may be formed by one or more access points (that provide a shared wireless communication medium for use by a number of client devices also referred to as stations. The basic building block of a WLAN conforming to the 802.11 family of standards is a Basic Service Set (BSS), which is managed by an access point. Each BSS is identified by a service set identifier (SSID) that is advertised by the access point. An access point periodically broadcasts beacon frames to enable any stations within wireless range of the access point to establish or maintain a communication link with the WLAN.

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, power, and space). A wireless network, for example a WLAN, such as a Wi-Fi (i.e., Institute of Electrical and Electronics Engineers (IEEE) 802.11) network may include access point that may communicate with one or more stations or mobile devices. The access point may be coupled to a network, such as the Internet, and may enable a mobile device to communicate via the network (or communicate with other devices coupled to the access point). A wireless device may communicate with a network device bi-directionally. For example, in a WLAN, a station may communicate with an associated access point via downlink and uplink. The downlink (or forward link) may refer to the communication link from the access point to the station, and the uplink (or reverse link) may refer to the communication link from the station to the access point. Some wireless communication systems may be configured to exchange messages in an extremely high throughput (EHT) environment. The EHT environments may allow additional space-time streams to be allocated to stations. Techniques for signaling in such EHT environments may be desired.

SUMMARY

The described techniques relate to improved methods, systems, devices, or apparatuses that support multi-user preamble format for a wireless local area network (WLAN). Generally, the described techniques provide for control signaling in next generation WLANs, such as extremely high throughput (EHT) WLANs, are described. An access point may be configured to allocate up to 320 MHz of total bandwidth along with coarse punctures. Additionally, the access point may allocate up to sixteen legacy training fields (LTFs), eight space-time streams, and support simultaneous transmission to up to sixteen stations. The access point may utilize enhanced control signaling in preamble transmissions. In some cases, the access point may utilize a first portion (SIG-A portion) of a preamble transmission to allocate up to 320 MHz of total bandwidth along with coarse punctures and up to sixteen LTFs. In some cases, the access point may allocate up to eight space-time streams to each station in a multi-user multiple-input multiple output (MU-MIMO) transmission, and support simultaneous transmission to up to sixteen stations in either the SIG-A portion of a preamble transmission or a second portion (SIG-B) portion of the preamble transmission. In some implementations, the SIG-A and SIG-B fields may be high efficiency (HE) fields, EHT fields, or a combination of thereof. In some cases, the preamble may be an HE preamble, an EHT preamble, or a combination thereof. In some cases, the LTFs may be HE-LTFs, EHT-LTFs, or a combination thereof.

A method of wireless communication at an access point is described. The method may include transmitting a first signaling (SIG-A) portion of a preamble for a MU-MIMO transmission, where the SIG-A portion configures a bandwidth of the MU-MIMO transmission and indicates that a second signaling (SIG-B) portion of the preamble includes a full bandwidth common field, transmitting the SIG-B portion of the preamble, the SIG-B portion including the full bandwidth common field duplicated once on each of a set of segments of the bandwidth, where the full bandwidth common field configures a puncturing pattern for the bandwidth and a number of a set of stations for the MU-MIMO transmission, and performing the MU-MIMO transmission to the set of MU-MIMO stations on the bandwidth in accordance with the puncturing pattern.

An apparatus for wireless communication is described. The apparatus may include a first interface, a second interface, and a wireless modem configured to transmit a SIG-A portion of a preamble for a MU-MIMO transmission, where the SIG-A portion configures a bandwidth of the MU-MIMO transmission and indicates that a SIG-B portion of the preamble includes a full bandwidth common field, transmit the SIG-B portion of the preamble, the SIG-B portion including the full bandwidth common field duplicated once on each of a set of segments of the bandwidth, where the full bandwidth common field configures a puncturing pattern for the bandwidth and a number of a set of stations for the MU-MIMO transmission, and perform the MU-MIMO transmission to the set of MU-MIMO stations on the bandwidth in accordance with the puncturing pattern.

Another apparatus for wireless communication is described. The apparatus may include means for transmitting a SIG-A portion of a preamble for a MU-MIMO transmission, where the SIG-A portion configures a bandwidth of the MU-MIMO transmission and indicates that a SIG-B portion of the preamble includes a full bandwidth common field, transmitting the SIG-B portion of the preamble, the SIG-B portion including the full bandwidth common field duplicated once on each of a set of segments of the bandwidth, where the full bandwidth common field configures a puncturing pattern for the bandwidth and a number of a set of stations for the MU-MIMO transmission, and performing the MU-MIMO transmission to the set of MU-MIMO stations on the bandwidth in accordance with the puncturing pattern.

A non-transitory computer-readable medium storing code for wireless communication is described. The code may include instructions executable by a processor to transmit a SIG-A portion of a preamble for a MU-MIMO transmission, where the SIG-A portion configures a bandwidth of the MU-MIMO transmission and indicates that a SIG-B portion of the preamble includes a full bandwidth common field, transmit the SIG-B portion of the preamble, the SIG-B portion including the full bandwidth common field duplicated once on each of a set of segments of the bandwidth, where the full bandwidth common field configures a puncturing pattern for the bandwidth and a number of a set of stations for the MU-MIMO transmission, and perform the MU-MIMO transmission to the set of MU-MIMO stations on the bandwidth in accordance with the puncturing pattern.

In some examples of the method, apparatuses, and non-transitory computer-readable medium described herein, transmitting the SIG-A portion may include operations, features, means, or instructions for generating a bandwidth field and a bandwidth extension field of the SIG-A, the bandwidth field and the bandwidth extension field collectively configuring the bandwidth of the MU-MIMO transmission.

In some examples of the method, apparatuses, and non-transitory computer-readable medium described herein, the bandwidth extension field may be repurposed from a number of SIG-B symbols or MU-MIMO users field of the SIG-A portion of the preamble. In some examples of the method, apparatuses, and non-transitory computer-readable medium described herein, the bandwidth field and the bandwidth extension field collectively configure a coarse puncturing of the bandwidth of the MU-MIMO transmission.

In some examples of the method, apparatuses, and non-transitory computer-readable medium described herein, transmitting the SIG-A portion of the preamble may include operations, features, means, or instructions for generating a number of legacy training field (LTF) symbols field and a number of LTF symbols extension field to configure a number of LTF symbols in the preamble.

In some examples of the method, apparatuses, and non-transitory computer-readable medium described herein, the number of LTF symbols extension field may be repurposed from a number of SIG-B symbols or MU-MIMO users field of the SIG-A portion of the preamble. In some examples of the method, apparatuses, and non-transitory computer-readable medium described herein, the number of SIG-B symbols or MU-MIMO users field includes 4 bits.

In some examples of the method, apparatuses, and non-transitory computer-readable medium described herein, transmitting the SIG-A portion of the preamble may include operations, features, means, or instructions for setting a bit of a SIG-B Compression field to indicate that the SIG-B. In some examples of the method, apparatuses, and non-transitory computer-readable medium described herein, transmitting the SIG-A portion of the preamble may include operations, features, means, or instructions for setting a bit of a SIG-B Compression field to indicate that the SIG-B.

In some examples of the method, apparatuses, and non-transitory computer-readable medium described herein, transmitting the SIG-B portion of the preamble may include operations, features, means, or instructions for generating a first field of the full bandwidth common field indicating the puncturing pattern of the bandwidth, a second field of the full bandwidth common field indicating the number of the set of stations for the MU-MIMO transmission, a third field of the full bandwidth common field including a cyclic redundancy check, and a fourth field of the full bandwidth common field including a convolutional decoding tail.

In some examples of the method, apparatuses, and non-transitory computer-readable medium described herein, the first field of the full bandwidth common field includes 5 bits, the second field of the full bandwidth common field includes 4 bits, the third field of the full bandwidth common field includes 4 bits, and the fourth field of the full bandwidth common field includes 6 bits.

In some examples of the method, apparatuses, and non-transitory computer-readable medium described herein, transmitting the SIG-B portion of the preamble may include operations, features, means, or instructions for generating a first field of the full bandwidth common field indicating the puncturing pattern of the bandwidth and the number of the set of stations for the MU-MIMO transmission, a second field of the full bandwidth common field including a cyclic redundancy check, and a third field of the full bandwidth common field including a convolutional decoding tail.

In some examples of the method, apparatuses, and non-transitory computer-readable medium described herein, the first field of the full bandwidth common field includes 9 bits, the second field of the full bandwidth common field includes 4 bits, and the third field of the full bandwidth common field includes 6 bits. In some examples of the method, apparatuses, and non-transitory computer-readable medium described herein, the bandwidth of the MU-MIMO transmission may be 320 MHz.

In some examples of the method, apparatuses, and non-transitory computer-readable medium described herein, each of the set of segments of the bandwidth may be 20 MHz. In some examples of the method, apparatuses, and non-transitory computer-readable medium described herein, the SIG-B portion of the preamble further includes a user field, the full bandwidth common field and the user field being included in the SIG-B portion of the preamble without a padding in between. In some examples of the method, apparatuses, and non-transitory computer-readable medium described herein, the full bandwidth common field may be encoded using a binary convolutional code (BCC) with a code rate of ½, the full bandwidth common field including 19 bits.

A method of wireless communication at a MU-MIMO station is described. The method may include receiving from an access point, a SIG-A portion of a preamble for a MU-MIMO transmission, where the SIG-A portion configures a bandwidth of the MU-MIMO transmission and indicates that a SIG-B portion of the preamble includes a full bandwidth common field, receiving from the access point, the SIG-B portion of the preamble, the SIG-B portion including the full bandwidth common field duplicated once on each of a set of segments of the bandwidth, where the full bandwidth common field configures a puncturing pattern for the bandwidth and a number of a set of stations for the MU-MIMO transmission, and performing the MU-MIMO transmission to the access point on the bandwidth in accordance with the puncturing pattern.

An apparatus for wireless communication is described. The apparatus may include a first interface, a second interface, and a wireless modem configured to receive from an access point, a SIG-A portion of a preamble for a MU-MIMO transmission, where the SIG-A portion configures a bandwidth of the MU-MIMO transmission and indicates that a SIG-B portion of the preamble includes a full bandwidth common field, receive from the access point, the SIG-B portion of the preamble, the SIG-B portion including the full bandwidth common field duplicated once on each of a set of segments of the bandwidth, where the full bandwidth common field configures a puncturing pattern for the bandwidth and a number of a set of stations for the MU-MIMO transmission, and perform the MU-MIMO transmission to the access point on the bandwidth in accordance with the puncturing pattern.

Another apparatus for wireless communication is described. The apparatus may include means for receiving from an access point, a SIG-A portion of a preamble for a MU-MIMO transmission, where the SIG-A portion configures a bandwidth of the MU-MIMO transmission and indicates that a SIG-B portion of the preamble includes a full bandwidth common field, receiving from the access point, the SIG-B portion of the preamble, the SIG-B portion including the full bandwidth common field duplicated once on each of a set of segments of the bandwidth, where the full bandwidth common field configures a puncturing pattern for the bandwidth and a number of a set of stations for the MU-MIMO transmission, and performing the MU-MIMO transmission to the access point on the bandwidth in accordance with the puncturing pattern.

A non-transitory computer-readable medium storing code for wireless communication is described. The code may include instructions executable by a processor to receive from an access point, a SIG-A portion of a preamble for a MU-MIMO transmission, where the SIG-A portion configures a bandwidth of the MU-MIMO transmission and indicates that a SIG-B portion of the preamble includes a full bandwidth common field, receive from the access point, the SIG-B portion of the preamble, the SIG-B portion including the full bandwidth common field duplicated once on each of a set of segments of the bandwidth, where the full bandwidth common field configures a puncturing pattern for the bandwidth and a number of a set of stations for the MU-MIMO transmission, and perform the MU-MIMO transmission to the access point on the bandwidth in accordance with the puncturing pattern.

In some examples of the method, apparatuses, and non-transitory computer-readable medium described herein, receiving the SIG-A portion may include operations, features, means, or instructions for receiving a bandwidth field and a bandwidth extension field of the SIG-A, the bandwidth field and the bandwidth extension field collectively configuring the bandwidth of the MU-MIMO transmission. In some examples of the method, apparatuses, and non-transitory computer-readable medium described herein, the bandwidth extension field may be repurposed from a number of SIG-B symbols or MU-MIMO users field of the SIG-A portion of the preamble.

In some examples of the method, apparatuses, and non-transitory computer-readable medium described herein, the bandwidth field and the bandwidth extension field collectively configure a coarse puncturing of the bandwidth of the MU-MIMO transmission. In some examples of the method, apparatuses, and non-transitory computer-readable medium described herein, receiving the SIG-A portion of the preamble may include operations, features, means, or instructions for receiving a number of legacy training field (LTF) symbols field and a number of LTF symbols extension field to configure a number of LTF symbols in the preamble.

In some examples of the method, apparatuses, and non-transitory computer-readable medium described herein, the number of LTF symbols extension field may be repurposed from a number of SIG-B symbols or MU-MIMO users field of the SIG-A portion of the preamble. In some examples of the method, apparatuses, and non-transitory computer-readable medium described herein, the number of SIG-B symbols or MU-MIMO users field includes 4 bits. In some examples of the method, apparatuses, and non-transitory computer-readable medium described herein, receiving the SIG-A portion of the preamble may include operations, features, means, or instructions for determining that a bit of a SIG-B Compression field may be set to indicate that the SIG-B.

In some examples of the method, apparatuses, and non-transitory computer-readable medium described herein, receiving the SIG-A portion of the preamble may include operations, features, means, or instructions for determining that a bit of a SIG-B Compression field may be set to indicate that the SIG-B. In some examples of the method, apparatuses, and non-transitory computer-readable medium described herein, receiving the SIG-B portion of the preamble may include operations, features, means, or instructions for receiving a first field of the full bandwidth common field indicating the puncturing pattern of the bandwidth, a second field of the full bandwidth common field indicating the number of the set of stations for the MU-MIMO transmission, a third field of the full bandwidth common field including a cyclic redundancy check, and a fourth field of the full bandwidth common field including a convolutional decoding tail.

In some examples of the method, apparatuses, and non-transitory computer-readable medium described herein, the first field of the full bandwidth common field includes 5 bits, the second field of the full bandwidth common field includes 4 bits, the third field of the full bandwidth common field includes 4 bits, and the fourth field of the full bandwidth common field includes 6 bits.

In some examples of the method, apparatuses, and non-transitory computer-readable medium described herein, receiving the SIG-B portion of the preamble may include operations, features, means, or instructions for receiving a first field of the full bandwidth common field indicating the puncturing pattern of the bandwidth and the number of the set of stations for the MU-MIMO transmission, a second field of the full bandwidth common field including a cyclic redundancy check, and a third field of the full bandwidth common field including a convolutional decoding tail. In some examples of the method, apparatuses, and non-transitory computer-readable medium described herein, the first field of the full bandwidth common field includes 9 bits, the second field of the full bandwidth common field includes 4 bits, and the third field of the full bandwidth common field includes 6 bits.

In some examples of the method, apparatuses, and non-transitory computer-readable medium described herein, the bandwidth of the MU-MIMO transmission may be 320 MHz. In some examples of the method, apparatuses, and non-transitory computer-readable medium described herein, each of the set of segments of the bandwidth may be 20 MHz.

In some examples of the method, apparatuses, and non-transitory computer-readable medium described herein, the SIG-B portion of the preamble further includes a user field, the full bandwidth common field and the user field being included in the SIG-B portion of the preamble without a padding in between. In some examples of the method, apparatuses, and non-transitory computer-readable medium described herein, the full bandwidth common field may be encoded using a BCC with a code rate of ½, the full bandwidth common field including 19 bits.

A method of wireless communication at an access point is described. The method may include transmitting a SIG-A portion of a preamble for a MU-MIMO transmission, transmitting a SIG-B portion of the preamble, the SIG-B portion including multiple instances of a per-user field for a station of a set of stations associated with the MU-MIMO transmission, where the multiple instances of the per-user field collectively indicate a spatial configuration of the station for the MU-MIMO transmission, and performing the MU-MIMO transmission to the station according to the indicated spatial configuration.

An apparatus for wireless communication is described. The apparatus may include a first interface, a second interface, and a wireless modem configured to transmit a SIG-A portion of a preamble for a MU-MIMO transmission, transmit a SIG-B portion of the preamble, the SIG-B portion including multiple instances of a per-user field for a station of a set of stations associated with the MU-MIMO transmission, where the multiple instances of the per-user field collectively indicate a spatial configuration of the station for the MU-MIMO transmission, and perform the MU-MIMO transmission to the station according to the indicated spatial configuration.

Another apparatus for wireless communication is described. The apparatus may include means for transmitting a SIG-A portion of a preamble for a MU-MIMO transmission, transmitting a SIG-B portion of the preamble, the SIG-B portion including multiple instances of a per-user field for a station of a set of stations associated with the MU-MIMO transmission, where the multiple instances of the per-user field collectively indicate a spatial configuration of the station for the MU-MIMO transmission, and performing the MU-MIMO transmission to the station according to the indicated spatial configuration.

A non-transitory computer-readable medium storing code for wireless communication is described. The code may include instructions executable by a processor to transmit a SIG-A portion of a preamble for a MU-MIMO transmission, transmit a SIG-B portion of the preamble, the SIG-B portion including multiple instances of a per-user field for a station of a set of stations associated with the MU-MIMO transmission, where the multiple instances of the per-user field collectively indicate a spatial configuration of the station for the MU-MIMO transmission, and perform the MU-MIMO transmission to the station according to the indicated spatial configuration.

In some examples of the method, apparatuses, and non-transitory computer-readable medium described herein, transmitting the SIG-B portion of the preamble may include operations, features, means, or instructions for generating, for each instance of the per-user field for the station, a spatial configuration field and a spatial configuration extension field.

In some examples of the method, apparatuses, and non-transitory computer-readable medium described herein, the spatial configuration field indicates a starting space-time index for the station and the spatial configuration extension field indicates a total number of space-time steams allocated to the station. In some examples of the method, apparatuses, and non-transitory computer-readable medium described herein, the spatial configuration field includes 4 bits and the spatial configuration extension field includes 2 bits.

A method of wireless communication at a station is described. The method may include receiving from an access point, a SIG-A portion of a preamble for a MU-MIMO transmission, receiving from the access point, a SIG-B portion of the preamble, the SIG-B portion including multiple instances of a per-user field for the station of a set of stations associated with the MU-MIMO transmission, where the multiple instances of the per-user field collectively indicate a spatial configuration of the station for the MU-MIMO transmission, and performing the MU-MIMO transmission to the access point according to the indicated spatial configuration.

An apparatus for wireless communication is described. The apparatus may include a first interface, a second interface, and a wireless modem configured to receive from an access point, a SIG-A portion of a preamble for MU-MIMO transmission, receive from the access point, a SIG-B portion of the preamble, the SIG-B portion including multiple instances of a per-user field for the station of a set of stations associated with the MU-MIMO transmission, where the multiple instances of the per-user field collectively indicate a spatial configuration of the station for the MU-MIMO transmission, and perform the MU-MIMO transmission to the access point according to the indicated spatial configuration.

Another apparatus for wireless communication is described. The apparatus may include means for receiving from an access point, a SIG-A portion of a preamble for a MU-MIMO transmission, receiving from the access point, a SIG-B portion of the preamble, the SIG-B portion including multiple instances of a per-user field for the station of a set of stations associated with the MU-MIMO transmission, where the multiple instances of the per-user field collectively indicate a spatial configuration of the station for the MU-MIMO transmission, and performing the MU-MIMO transmission to the access point according to the indicated spatial configuration.

A non-transitory computer-readable medium storing code for wireless communication is described. The code may include instructions executable by a processor to receive from an access point, a SIG-A portion of a preamble for a MU-MIMO transmission, receive from the access point, a SIG-B portion of the preamble, the SIG-B portion including multiple instances of a per-user field for the station of a set of stations associated with the MU-MIMO transmission, where the multiple instances of the per-user field collectively indicate a spatial configuration of the station for the MU-MIMO transmission, and perform the MU-MIMO transmission to the access point according to the indicated spatial configuration.

In some examples of the method, apparatuses, and non-transitory computer-readable medium described herein, receiving the SIG-B portion of the preamble may include operations, features, means, or instructions for receiving, for each instance of the per-user field for the station, a spatial configuration field and a spatial configuration extension field.

In some examples of the method, apparatuses, and non-transitory computer-readable medium described herein, the spatial configuration field indicates a starting space-time index for the station and the spatial configuration extension field indicates a total number of space-time steams allocated to the station. In some examples of the method, apparatuses, and non-transitory computer-readable medium described herein, the spatial configuration field includes 4 bits and the spatial configuration extension field includes 2 bits.

A method of wireless communication at an access point is described. The method may include transmitting a SIG-A portion of a preamble for a MU-MIMO transmission, transmitting a SIG-B portion of the preamble, the SIG-B portion including a set of per-user fields, each per-user field indicating a spatial configuration of a different station of a set of stations associated with the MU-MIMO transmission, where a first spatial configuration of a first per-user field of the set per-user fields references a first spatial configuration table, and one or more remaining spatial configurations of one or more remaining per-user fields of the set of per-user fields reference a second spatial configuration table, and performing the MU-MIMO transmission to the set of stations according to the indicated spatial configurations.

An apparatus for wireless communication is described. The apparatus may include a first interface, a second interface, and a wireless modem configured to transmit a SIG-A portion of a preamble for a MU-MIMO transmission, transmit a SIG-B portion of the preamble, the SIG-B portion including a set of per-user fields, each per-user field indicating a spatial configuration of a different station of a set of stations associated with the MU-MIMO transmission, where a first spatial configuration of a first per-user field of the set per-user fields references a first spatial configuration table, and one or more remaining spatial configurations of one or more remaining per-user fields of the set of per-user fields reference a second spatial configuration table, and perform the MU-MIMO transmission to the set of stations according to the indicated spatial configurations.

Another apparatus for wireless communication is described. The apparatus may include means for transmitting a SIG-A portion of a preamble for a MU-MIMO transmission, transmitting a SIG-B portion of the preamble, the SIG-B portion including a set of per-user fields, each per-user field indicating a spatial configuration of a different station of a set of stations associated with the MU-MIMO transmission, where a first spatial configuration of a first per-user field of the set per-user fields references a first spatial configuration table, and one or more remaining spatial configurations of one or more remaining per-user fields of the set of per-user fields reference a second spatial configuration table, and performing the MU-MIMO transmission to the set of stations according to the indicated spatial configurations.

A non-transitory computer-readable medium storing code for wireless communication is described. The code may include instructions executable by a processor to transmit a SIG-A portion of a preamble for a MU-MIMO transmission, transmit a SIG-B portion of the preamble, the SIG-B portion including a set of per-user fields, each per-user field indicating a spatial configuration of a different station of a set of stations associated with the MU-MIMO transmission, where a first spatial configuration of a first per-user field of the set per-user fields references a first spatial configuration table, and one or more remaining spatial configurations of one or more remaining per-user fields of the set of per-user fields reference a second spatial configuration table, and perform the MU-MIMO transmission to the set of stations according to the indicated spatial configurations.

In some examples of the method, apparatuses, and non-transitory computer-readable medium described herein, transmitting the SIG-B portion of the preamble may include operations, features, means, or instructions for arranging the set of per-user fields of the SIG-B portion of the preamble in a descending order of a number of space-time streams per station. In some examples of the method, apparatuses, and non-transitory computer-readable medium described herein, the spatial configuration of each per-user field indicates a starting space-time stream index and a number of space-time streams allocated to the station associated with that per-user field. In some examples of the method, apparatuses, and non-transitory computer-readable medium described herein, the first spatial configuration table may be smaller than the second spatial configuration table.

In some examples of the method, apparatuses, and non-transitory computer-readable medium described herein, the first spatial configuration of the first per-user field may have a format different from the one or more remaining spatial configurations of the one or more remaining per-user fields.

In some examples of the method, apparatuses, and non-transitory computer-readable medium described herein, transmitting the SIG-B portion of the preamble may include operations, features, means, or instructions for including an indication of a total number of space-time streams for the MU-MIMO transmission in the first per-user field. Some examples of the method, apparatuses, and non-transitory computer-readable medium described herein may further include operations, features, means, or instructions for indicating a total number of space-time streams for the MU-MIMO transmission using a set of legacy training fields (LTFs) of the preamble.

A method of wireless communication at a station is described. The method may include receiving from an access point, a SIG-A portion of a preamble for a MU-MIMO transmission, receiving from the access point, a SIG-B portion of the preamble, the SIG-B portion including a set of per-user fields, each per-user field indicating a spatial configuration of a different station of a set of stations associated with the MU-MIMO transmission, where a first spatial configuration of a first per-user field of the set per-user fields references a first spatial configuration table, and one or more remaining spatial configurations of one or more remaining per-user fields of the set of per-user fields reference a second spatial configuration table, and performing the MU-MIMO transmission to the access point according to the indicated spatial configurations.

An apparatus for wireless communication is described. The apparatus may include a first interface, a second interface, and a wireless modem configured to receive from an access point, a SIG-A portion of a preamble for a MU-MIMO transmission, receive from the access point, a SIG-B portion of the preamble, the SIG-B portion including a set of per-user fields, each per-user field indicating a spatial configuration of a different station of a set of stations associated with the MU-MIMO transmission, where a first spatial configuration of a first per-user field of the set per-user fields references a first spatial configuration table, and one or more remaining spatial configurations of one or more remaining per-user fields of the set of per-user fields reference a second spatial configuration table, and perform the MU-MIMO transmission to the access point according to the indicated spatial configurations.

Another apparatus for wireless communication is described. The apparatus may include means for receiving from an access point, a SIG-A portion of a preamble for a MU-MIMO transmission, receiving from the access point, a SIG-B portion of the preamble, the SIG-B portion including a set of per-user fields, each per-user field indicating a spatial configuration of a different station of a set of stations associated with the MU-MIMO transmission, where a first spatial configuration of a first per-user field of the set per-user fields references a first spatial configuration table, and one or more remaining spatial configurations of one or more remaining per-user fields of the set of per-user fields reference a second spatial configuration table, and performing the MU-MIMO transmission to the access point according to the indicated spatial configurations.

A non-transitory computer-readable medium storing code for wireless communication is described. The code may include instructions executable by a processor to receive from an access point, a SIG-A portion of a preamble for a MU-MIMO transmission, receive from the access point, a SIG-B portion of the preamble, the SIG-B portion including a set of per-user fields, each per-user field indicating a spatial configuration of a different station of a set of stations associated with the MU-MIMO transmission, where a first spatial configuration of a first per-user field of the set per-user fields references a first spatial configuration table, and one or more remaining spatial configurations of one or more remaining per-user fields of the set of per-user fields reference a second spatial configuration table, and perform the MU-MIMO transmission to the access point according to the indicated spatial configurations.

In some examples of the method, apparatuses, and non-transitory computer-readable medium described herein, receiving the SIG-B portion of the preamble may include operations, features, means, or instructions for receiving the set of per-user fields of the SIG-B portion of the preamble arranged in a descending order of a number of space-time streams per station.

In some examples of the method, apparatuses, and non-transitory computer-readable medium described herein, the spatial configuration of each per-user field indicates a starting space-time stream index and a number of space-time streams allocated to the station associated with that per-user field. In some examples of the method, apparatuses, and non-transitory computer-readable medium described herein, the first spatial configuration table may be smaller than the second spatial configuration table.

In some examples of the method, apparatuses, and non-transitory computer-readable medium described herein, the first spatial configuration of the first per-user field may have a format different from the one or more remaining spatial configurations of the one or more remaining per-user fields. In some examples of the method, apparatuses, and non-transitory computer-readable medium described herein, receiving the SIG-B portion of the preamble may include operations, features, means, or instructions for parsing the first per-user field to determine an indication of a total number of space-time streams for the MU-MIMO transmission.

In some examples of the method, apparatuses, and non-transitory computer-readable medium described herein, receiving the SIG-B portion of the preamble may include operations, features, means, or instructions for determining a total number of space-time streams for the MU-MIMO transmission using a set of legacy training fields (LTFs) of the preamble. In some examples of the method, apparatuses, and non-transitory computer-readable medium described herein, determining a total number of space-time streams for the MU-MIMO transmission may include operations, features, means, or instructions for determining a channel using a set of LTFs of the preamble.

A method of wireless communication at an access point is described. The method may include transmitting a SIG-A portion of a preamble for a MU-MIMO transmission, transmitting a SIG-B portion of the preamble, the SIG-B portion including an indication of a spatial configuration table and a set of per-user fields, the spatial configuration table indicating a spatial configuration of a different station of a set of stations associated with the MU-MIMO transmission by reference to the indicated spatial configuration table, and performing the MU-MIMO transmission to the set of stations according to the indicated spatial configurations.

An apparatus for wireless communication is described. The apparatus may include a first interface, a second interface, and a wireless modem configured to transmit a SIG-A portion of a preamble for a MU-MIMO transmission, transmit a SIG-B portion of the preamble, the SIG-B portion including an indication of a spatial configuration table and a set of per-user fields, the spatial configuration table indicating a spatial configuration of a different station of a set of stations associated with the MU-MIMO transmission by reference to the indicated spatial configuration table, and perform the MU-MIMO transmission to the set of stations according to the indicated spatial configurations.

Another apparatus for wireless communication is described. The apparatus may include means for transmitting a SIG-A portion of a preamble for a MU-MIMO transmission, transmitting a SIG-B portion of the preamble, the SIG-B portion including an indication of a spatial configuration table and a set of per-user fields, the spatial configuration table indicating a spatial configuration of a different station of a set of stations associated with the MU-MIMO transmission by reference to the indicated spatial configuration table, and performing the MU-MIMO transmission to the set of stations according to the indicated spatial configurations.

A non-transitory computer-readable medium storing code for wireless communication is described. The code may include instructions executable by a processor to transmit a SIG-A portion of a preamble for a MU-MIMO transmission, transmit a SIG-B portion of the preamble, the SIG-B portion including an indication of a spatial configuration table and a set of per-user fields, the spatial configuration table indicating a spatial configuration of a different station of a set of stations associated with the MU-MIMO transmission by reference to the indicated spatial configuration table, and perform the MU-MIMO transmission to the set of stations according to the indicated spatial configurations.

In some examples of the method, apparatuses, and non-transitory computer-readable medium described herein, transmitting the SIG-B portion of the preamble may include operations, features, means, or instructions for arranging the set of per-user fields of the SIG-B portion of the preamble in a descending order of number of space-time streams per station. In some examples of the method, apparatuses, and non-transitory computer-readable medium described herein, the spatial configuration indicates a starting space-time stream index and a number of space-time streams allocated to the station associated with that per-user field. In some examples of the method, apparatuses, and non-transitory computer-readable medium described herein, the spatial configuration table includes 8 bits.

A method of wireless communication at a station is described. The method may include receiving from an access point, a SIG-A portion of a preamble for a MU-MIMO transmission, receiving from the access point, a SIG-B portion of the preamble, the SIG-B portion including an indication of a spatial configuration table and a set of per-user fields, the spatial configuration table indicating a spatial configuration of a different station of a set of stations associated with the MU-MIMO transmission by reference to the indicated spatial configuration table, and performing the MU-MIMO transmission to the access point according to the indicated spatial configurations.

An apparatus for wireless communication is described. The apparatus may include a first interface, a second interface, and a wireless modem configured to receive from an access point, a SIG-A portion of a preamble for a MU-MIMO transmission, receive from the access point, a SIG-B portion of the preamble, the SIG-B portion including an indication of a spatial configuration table and a set of per-user fields, the spatial configuration table indicating a spatial configuration of a different station of a set of stations associated with the MU-MIMO transmission by reference to the indicated spatial configuration table, and perform the MU-MIMO transmission to the access point according to the indicated spatial configurations.

Another apparatus for wireless communication is described. The apparatus may include means for receiving from an access point, a SIG-A portion of a preamble for a MU-MIMO transmission, receiving from the access point, a SIG-B portion of the preamble, the SIG-B portion including an indication of a spatial configuration table and a set of per-user fields, the spatial configuration table indicating a spatial configuration of a different station of a set of stations associated with the MU-MIMO transmission by reference to the indicated spatial configuration table, and performing the MU-MIMO transmission to the access point according to the indicated spatial configurations.

A non-transitory computer-readable medium storing code of wireless communication is described. The code may include instructions executable by a processor to receive from an access point, a SIG-A portion of a preamble for a MU-MIMO transmission, receive from the access point, a SIG-B portion of the preamble, the SIG-B portion including an indication of a spatial configuration table and a set of per-user fields, the spatial configuration table indicating a spatial configuration of a different station of a set of stations associated with the MU-MIMO transmission by reference to the indicated spatial configuration table, and perform the MU-MIMO transmission to the access point according to the indicated spatial configurations.

In some examples of the method, apparatuses, and non-transitory computer-readable medium described herein, receiving the SIG-B portion of the preamble may include operations, features, means, or instructions for receiving the set of per-user fields of the SIG-B portion of the preamble arranged in a descending order of number of space-time streams per station. In some examples of the method, apparatuses, and non-transitory computer-readable medium described herein, the spatial configuration indicates a starting space-time stream index and a number of space-time streams allocated to the station associated with that per-user field.

In some examples of the method, apparatuses, and non-transitory computer-readable medium described herein, further may include operations, features, means, or instructions for identifying a per-user field from the set of per-user fields using a station identifier. In some examples of the method, apparatuses, and non-transitory computer-readable medium described herein, the spatial configuration table includes 8 bits.

DETAILED DESCRIPTION

Figure 1:
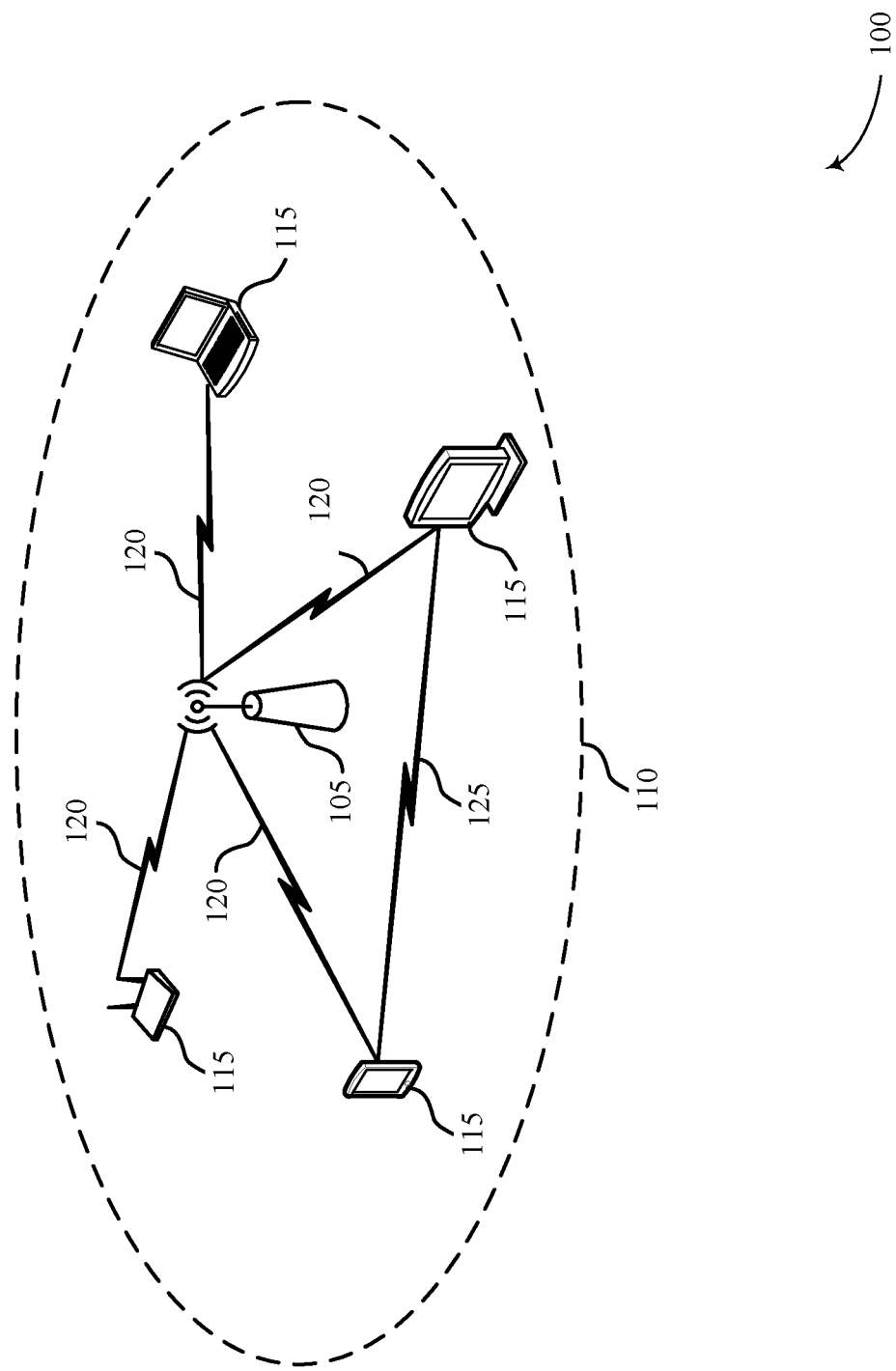
FIG. 1 illustrates an example of a system for wireless communications that supports multi-user preamble format for a WLAN in accordance with aspects of the present disclosure.

In some wireless communication systems, next generation WLANs, also referred to as extremely high throughput (EHT) networks, may provide additional features over legacy networks (for example, high efficiency (HE) networks). For example, next generation access points may be configured to support communications having a total bandwidth of up to 320 MHz and up to sixteen space-time streams allocated to a set of stations. Additionally, next generation WLANs may support allocation of up to eight space time streams to each station in a multiple-input multiple output (MIMO) transmission. These additional capabilities are governed by control signaling between the access point and the stations. Techniques are therefore needed to provide efficient control signaling for features specific to next generation WLANs while maintaining backwards compatibility with legacy devices and networks.

Techniques for control signaling in next generation WLANs, such as EHT WLANs, are described. A message transmitted by an access point may allocate resources to a set of stations. The access point may be configured to allocate up to 320 MHz of total bandwidth along with coarse punctures. Additionally, the access point may allocate up to sixteen legacy training fields (LTF), allocate up to eight space-time streams to each station in a MU-MIMO transmission, and support simultaneous transmission to up to sixteen stations. In some cases, the access point may allocate up to 320 MHz of total bandwidth along with coarse punctures and up to sixteen LTFs in a first portion of signaling (SIG-A portion). In some cases, the access point may allocate up to eight space-time streams to each station in a MU-MIMO transmission, and support simultaneous transmission to up to sixteen stations in either the SIG-A portion of a preamble transmission or a second portion (SIG-B) portion of the preamble transmission. To support 320 MHz bandwidth and up to sixteen stations, one or more fields related to space-time stream configurations in a message may be expanded as compared to other environments (for example, HE environments). In some cases, one or more signaling fields used in HE systems may be repurposed to effectively signal the additional resources available in a next generation WLAN.

Aspects of the disclosure are initially described in the context of a wireless communications system. Aspects of the disclosure are further illustrated by and described with reference to apparatus diagrams, system diagrams, and flowcharts that relate to multi-user preamble format for a WLAN.

Examples provided herein may reference HE fields of HE preambles, such as HE-LTF, HE SIG-A, and HE-SIG-B fields. It will be understood that these examples are non-limiting, and that the same principles may be implemented using analogous fields or preambles associated with different WLAN standards. For example, the principles of the present disclosure may be implemented using EHT fields of EHT preambles, including EHT-LTF, EHT-SIG-A, and EHT-SIG-B fields.

FIG. 1 illustrates a WLAN 100 (which may be an example of a Wi-Fi network) configured in accordance with various aspects of the present disclosure. The WLAN 100 may include an access point 105 and multiple associated stations 115, which may represent devices such as mobile stations, personal digital assistant (PDAs), other handheld devices, netbooks, notebook computers, tablet computers, laptops, display devices (e.g., TVs, computer monitors), printers, etc. The access point 105 and the associated stations 115 may represent a basic service set (BSS) or an extended service set (ESS). The various stations 115 in the network are able to communicate with one another through the access point 105. Also shown is a coverage area 110 of the access point 105, which may represent a basic service area (BSA) of the WLAN 100. An extended network station (not shown) associated with the WLAN 100 may be connected to a wired or wireless distribution system that may allow multiple access points 105 to be connected in an ESS.

In some cases, access point 105 may transmit a first signaling (SIG-A) portion (e.g., a first HE signaling (HE-SIG-A) portion or a first EHT signaling (EHT-SIG-A) portion) of a preamble (e.g., a HE preamble or a EHT preamble) for a multi-user multiple-input multiple output (MU-MIMO) transmission. In some cases, the SIG-A portion may configure a bandwidth of the MU-MIMO transmission and may indicate that a second signaling (SIG-B) portion (e.g., a second HE signaling (HE-SIG-B) portion or a second EHT signaling (EHT-SIG-B) portion) of the preamble includes a full bandwidth common field. The access point 105 may transmit the SIG-B portion of the preamble, the SIG-B portion including the full bandwidth common field duplicated once on each of a set of segments of the bandwidth. In some cases, the full bandwidth common field may configure a puncturing pattern for the bandwidth and a number of a set of stations for the MU-MIMO transmission. The access point 105 may perform the MU-MIMO transmission to the set of MU-MIMO stations on the bandwidth in accordance with the puncturing pattern.

Although not shown in FIG. 1, a station 115 may be located in the intersection of more than one coverage area 110 and may associate with more than one access point 105. A single access point 105 and an associated set of stations 115 may be referred to as a BSS. An ESS is a set of connected BSSs. A distribution system (not shown) may be used to connect access points 105 in an ESS. In some cases, the coverage area 110 of an access point 105 may be divided into sectors (also not shown). The WLAN 100 may include access points 105 of different types (e.g., metropolitan area, home network), with varying and overlapping coverage areas 110. Two stations 115 may also communicate directly via a direct wireless link 125 regardless of whether both stations 115 are in the same coverage area 110. Examples of direct wireless links 120 may include Wi-Fi Direct connections, Wi-Fi Tunneled Direct Link Setup (TDLS) links, and other group connections. Stations 115 and access points 105 may communicate according to the WLAN radio and baseband protocol for physical and medium access control (MAC) layers from IEEE 802.11 and versions including, but not limited to, 802.11b, 802.11g, 802.11a, 802.11n, 802.11ac, 802.11ad, 802.11ah, 802.11ax, etc. In other implementations, peer-to-peer connections or ad hoc networks may be implemented within WLAN 100.

In some cases, a station 115 (or an access point 105) may be detectable by a central access point 105, but not by other stations 115 in the coverage area 110 of the central access point 105. For example, one station 115 may be at one end of the coverage area 110 of the central access point 105 while another station 115 may be at the other end. Thus, both stations 115 may communicate with the access point 105, but may not receive the transmissions of the other. This may result in colliding transmissions for the two stations 115 in a contention based environment (e.g., carrier sense multiple access (CSMA)/collision avoidance (CA)) because the stations 115 may not refrain from transmitting on top of each other. A station 115 whose transmissions are not identifiable, but that is within the same coverage area 110 may be known as a hidden node. CSMA/CA may be supplemented by the exchange of a Request to Send (RTS) packet transmitted by a sending station 115 (or access point 105) and a Clear to Send (CTS) packet transmitted by the receiving station 115 (or access point 105). This may alert other devices within range of the sender and receiver not to transmit for the duration of the primary transmission. Thus, RTS/CTS may help mitigate a hidden node problem.

In some cases, the access point 105 may communicate with the station 115 using MU-MIMO frames. Each frame may carry a physical layer header or preamble. This preamble may be used to configure resources for the station 115 based on next generation WLAN capabilities. In some cases, the preamble may repurpose legacy fields to signal a configuration of next generation EHT resources for the MU-MIMO frame. For example, a MU-MIMO frame may carry an preamble that contains a SIG-A portion and a SIG-B portion. The SIG-A portion may configure a bandwidth of the MU-MIMO frame and indicate that the SIG-B portion includes a full bandwidth common field. The SIG-B portion may follow the SIG-A portion and include the indicated full bandwidth common field duplicated once on each of a set of segments of the bandwidth. The full bandwidth common field may configure a puncturing pattern for the bandwidth and a number of a set of stations 115 receiving the MU-MIMO frame. The payload of the MU-MIMO frame may include a MU-MIMO transmission to the stations on the bandwidth in accordance with the signaled puncturing pattern.

In some cases, the SIG-B portion of the preamble may include multiple instances of a per-user field for a station 115 receiving the MU-MIMO frame. The multiple instances of the per-user field collectively indicate a spatial configuration of the station for the MU-MIMO frame. Additionally, or alternatively, the SIG-B portion of the preamble may include multiple instances of a per-user field that collectively indicate a spatial configuration of each station 115 of the MU-MIMO frame. Additionally, or alternatively, the SIG-B portion of the preamble may include multiple per-user fields, each per-user field indicating a spatial configuration of a different station 115 associated with the MU-MIMO frame. A first one of the per-user fields may reference a first spatial configuration table to convey the spatial configuration of a first station 115, and the remaining per-user fields may reference a second spatial configuration table to convey the spatial configuration of a second station 115 or any subsequent station 115.

Particular aspects of the subject matter described herein may be implemented to realize one or more advantages. The described techniques may provide efficient control signaling for features specific to next generation WLANs while maintaining backwards compatibility with legacy devices and networks, among other advantages. As such, supported techniques may include improved network operations and, in some examples, may promote network efficiencies, among other benefits.

Aspects of the disclosure are initially described in the context of wireless communications systems. Aspects are then described with respect to a MU preamble format for a WLAN. Aspects of the disclosure are further illustrated by and described with reference to apparatus diagrams, system diagrams, and flowcharts that relate to control signaling in next generation WLANs, such as EHT WLANs.

Figure 2:
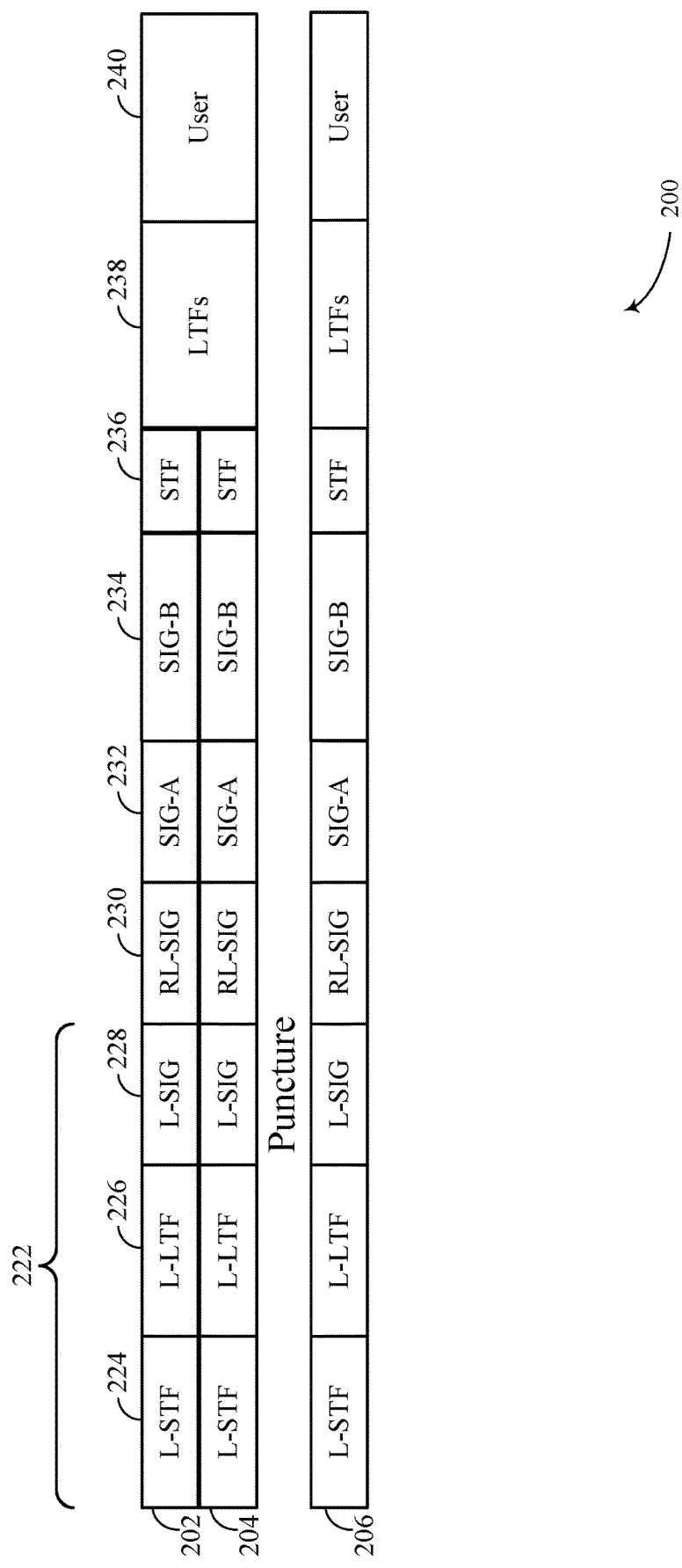
FIG. 2 illustrates an example of a frame that supports multi-user preamble format for a WLAN in accordance with aspects of the present disclosure.

FIG. 2 illustrates an example of a frame 200 that supports multi-user preamble format for a WLAN in accordance with aspects of the present disclosure. In some examples, the frame 200 may be usable for communications between an access point and each of a number of stations identified by the access point. For example, the frame 200 may be formatted as an HE or EHT frame in accordance with the IEEE 802.11ax amendment to the IEEE 802.11 set of standards. In some cases, frame 200 can also be formatted as a next generation or EHT frame.

Next generation WLANs, such as EHT WLANs, may support additional features that are not supported by legacy environments (such as HE, or EHT environments). In existing systems, WLAN preambles may be configured to include a SIG-A field and a SIG-B field. The SIG-B field may include WLAN signaling information usable by the number of stations identified to receive downlink communications. Next generation WLANs may be configured to support an enhanced SIG-B design. In existing systems, the SIG-B field may include WLAN signaling information usable by the number of stations identified to receive downlink communications in the frame 200. More specifically, the SIG-B field may include information usable by the number of stations to decode data received in a data portion of the frame 200. In some EHT environments, SIG-B signaling design may follow [1 2 1 2] structure of SIG-B signaling as described in IEEE 802.11ax amendment to the IEEE 802.11 set of standards. For example, a SIG-B field may include a [1 2 1 2] structure, where the "1's" correspond to a first set of content channels and the "2's" correspond to a second set of content channels.

EHT environments may be configured to support up to 16 EHT users multiplexed in a MU transmission. For example, in some EHT environments, access points may be configured to support a up to sixteen users, with each user being associated with one space-time stream. Additionally, a MU transmission in EHT environments may support an allocation of eight space-time streams per user. That is, in EHT environments, each user (or stations) may be allocated up to eight space-time streams. In some cases, an access point may be configured to allocate up to 320 MHz of total bandwidth to one or more stations. To support sixteen stations, and to allocate up to eight space-time streams to the each of the stations, one or more fields related to space-time stream configurations in a message may be changed as compared to other environments (for example, HE environment).

In legacy systems, the SIG-A portion of an signaling portion of a frame preamble has 3 bits to indicate a total bandwidth and coarse punctures. Additionally, the SIG-A portion of the signaling portion of the preamble has 3 bits to indicate a number of LTF symbols. In some cases, the total bandwidth and coarse punctures may be indicated according to Table 1 and the number of LTF symbols may be indicated according to Table 2.

TABLE 1

| Bandwidth | 3 bits | Set to 0 for 20 MHz. Set to 1 for 40 MHz. Set to 2 for 80 MHz non-preamble puncturing mode. Set to 3 for 160 MHz and 80 + 80 MHz non-preamble puncturing mode. If the SIG-B Compression field is 0: Set to 4 for preamble puncturing in 80 MHz, where in the preamble, the secondary 20 MHz is punctured. Set to 5 for preamble puncturing in 80 MHz, where in the preamble, one of the two 20 MHz sub-channels in secondary 40 MHz is punctured. Set to 6 for preamble puncturing in 160 MHz or 80 + 80 MHz, where in the primary 80 MHz of the preamble, the secondary 20 MHz is punctured. Set to 7 for preamble puncturing in 160 MHz or 80 + 80 MHz, where in the primary 80 MHz of the preamble, the primary 40 MHz is present. If the SIG-B Compression field is 1 then values 4-7 are reserved. |
|---|---|---|

TABLE 2

| Number of LTF symbols and Midamble Periodicity | 3 bits | When the Doppler field is 0, indicates the number of LTF symbols: Set to 0 for 1 LTF symbol. Set to 1 for 2 LTF symbols. Set to 2 for 4 LTF symbols. Set to 3 for 6 LTF symbols. Set to 4 for 8 LTF symbols. Other values are reserved. When the Doppler field is 1, B8-B9 indicates the number of LTF symbols, up to 4, and B10 indicates midamble periodicity: 0 indicates 1 LTF symbol. 1 indicates 2 LTF symbols. 2 indicates 4 LTF symbols. 3 is reserved. B10 is set to 0 if TXVECTOR parameter MIDAMBLE_PERIODICITY is 10 and set to 1 is the TXVECTOR parameter PREAMBLE_PERIODICITY is 20. |
|---|---|---|

In some cases, the SIG-A portion of the signaling may also include a number of SIG-B symbols or MU-MIMO users field that includes 4 bits. For example, in environments, the number of SIG-B symbols or MU-MIMO users field may be indicated according to Table 3.

TABLE 3

| Number SIG-B symbols or MU-MIMO users | 4 bits | Indicates the number of orthogonal frequency-division multiplexing (OFDM) symbols in the SIG-B field when the SIG-B Compression field is 0. Indicates the number of MU-MIMO users minus 1 when the SIG-B Compression field is 1. |
|---|---|---|

In some EHT or HE environments, additional information may be provided by repurposing the number of SIG-B symbols or MU-MIMO users field. For example, the access point may transmit an indication of the total bandwidth (i.e., 320 MHz) to the stations using a common bandwidth field in the SIG-B portion of the preamble. For example, the access point may transmit a first SIG-A portion of a preamble for a MU-MIMO transmission, where the SIG-A portion may indicate that a SIG-B portion of the preamble includes a full bandwidth common field. In some cases, the access point may generate a bandwidth field and a bandwidth extension field of the SIG-A. In some cases, the bandwidth field and the bandwidth extension field may collectively configure the bandwidth of the MU-MIMO transmission. In some cases, the 4-bit field in SIG-A portion may be repurposed to indicate a bandwidth extension field and a number of LTFs field. In some cases, up to 2 bits of the SIG-A portion may indicate the total of 320 MHz bandwidth and its coarse puncture, and 1 bit may be repurposed to indicate LTF extension. In some cases, the bandwidth field of the HE or EHT environment may be reserved for indicating other properties. In some cases, the access point may transmit the SIG-A portion of the preamble by setting a bit of a SIG-B Compression field to indicate that the SIG-B includes the full bandwidth common field. In some cases, the SIG-B Compression field may be set according to Table 4.

TABLE 4

| SIG-B Compression | 1 bit | Set to 1 for full bandwidth MU-MIMO. Set to 0 otherwise |
|---|---|---|

In some systems (such as IEEE 802.11ax systems), the SIG-B Compression=1 in the SIG-A portion may imply that the SIG-B portion does not have a common field (or the SIG-B portion is a full bandwidth transmission). Additionally, the SIG-B Compression=0 in the SIG-A portion may imply that the common field is present in the SIG-B portion (such as common field for resource allocation or orthogonal frequency-division multiple access (OFDMA) transmission). According to present techniques described herein, in EHT environments, the SIG-B Compression=1 in the SIG-A portion may imply that the SIG-B portion includes a full bandwidth common field. In some cases, the SIG-B Compression=0 in the SIG-A portion may indicate the presence of an OFDMA common field according to existing rules (such as rules of IEEE 802.11ax systems). In some cases, the OFDMA common field may indicate a resource unit (RU) allocation and a number of a set of stations served by the access point.

More specifically, the access point may set the bit of a SIG-B Compression field to indicate that the SIG-B includes the full bandwidth common field. In cases, where the access point is performing a MU-MIMO transmission on 80 MHz bandwidth, the SIG-B Compression=1 may indicate that a full bandwidth common field may be present in each 20 MHz segment of the total bandwidth. In some cases, the full bandwidth common field may be duplicated once on each of a set of segments of the bandwidth. In some examples, the full bandwidth common field may configure a puncturing pattern for the total bandwidth and a number of stations for the MU-MIMO transmission. Referring to FIG. 2, the frame 200 may indicate the transmission of the SIG-A portion and the SIG-B portion.

As depicted in FIG. 2, the frame 200 includes a legacy preamble portion 222 that includes a legacy short training field (L-STF) 224, an L-LTF 226, and a legacy signaling field (L-SIG) 228. The frame 200 further includes a non-legacy preamble portion that includes a repeated legacy signaling field (RL-SIG) 230, a first signaling field (SIG-A) 232, a second signaling field (SIG-B) 234, an short training field (STF) 236 and a number of LTFs 238. The frame 200 also can include a payload or user portion 240 after the preamble. The user portion 240 (also referred to as a data portion) can include MAC protocol data units (MPDUs), for example, in the form of an aggregated MPDU (AMPDU). In some cases, the high-efficiency fields, such as SIG-A fields 232, SIG-B fields 234, STF fields 236, or LTF fields 238, may be examples of or may include EHT environment fields. For example, the SIG-A field 232 may be an EHT-SIG-A field, the SIG-B field 234 may be an EHT-SIG-B field, the STF field 236 may be an EHT-STF field, or the LTF field 238 may be an EHT-LTF field, or a combination thereof.

The frame 200 may be transmitted over a radio frequency spectrum band, which may include a set of sub-bands. As previously described, the bandwidth used for MU-MIMO transmission in the radio spectrum band may be 80 MHz. In some examples, the radio frequency spectrum band may have a bandwidth of 80 MHz, and each of the sub-bands may have a bandwidth of 20 MHz. In the example of FIG. 2, the frame 200 is divided into 3 portions (e.g., 202, 204, and 206), with a puncture in between. As described herein, the radio frequency spectrum band includes a set of sub-bands. The L-STF, L-LTF, and L-SIG fields 224, 226 and 228, respectively, may be duplicated and transmitted in each of the set of sub-bands. The information in the RL-SIG field 230 and the SIG-A field 232 is also duplicated and transmitted in each sub-band as shown in FIG. 2.

According to IEEE 802.11ax framework, the RL-SIG field 230 may indicate to a station that the frame 200 is an IEEE 802.11ax frame. The SIG-A field 232 may include WLAN signaling information usable by stations other than the number of stations that are identified to receive downlink communications in the frame 200. The SIG-A field 232 may also include information usable by the identified number of stations to decode the SIG-B field 234. The SIG-B field 234 may include WLAN signaling information usable by the number of stations identified to receive downlink communications in the frame 200. As previously discussed, the SIG-B field 234 may include the full bandwidth common field and a user field (shown in FIG. 3). More specifically, the SIG-B field 234 may include information usable by the number of stations to decode data received in the user portion 240. The SIG-B field 234 may be encoded separately from the SIG-A field 232. The SIG-A field 232 may, in some implementations, indicate a bandwidth of resources being allocated, a compression mode of the SIG-B field 234, a number of MU-MIMO user or SIG-B symbols, a number of space-time streams (Nsts) or LTFs, or a combination thereof. In some cases, the SIG-A field 232 may be modified for EHT signaling. In such cases, the EHT-SIG-A field may indicate that a bandwidth of the resources is up to 320 MHz and that the number of space-time streams is up to sixteen.

In some cases, when SIG-B Compression=0, an OFDMA common field may be present in each 20 MHz segment (such as 202, 204, 206) of the bandwidth. In some cases, the OFDMA common field may indicate an RU allocation and a number of users (such as stations) supported by the access point. In some cases, a number of SIG-B Symbols may be calculated from the number of users indicated in the OFDMA common field. The RU allocation table indicated by the OFDMA common field may be according to the RU allocation table in Table 5. Additionally, the RU allocation table may be extended to indicate additional users for 242/484/996 RU according to Table 6.

TABLE 5

| 8 bits indices (B7 B6 B5 B4 B3 B2 B1 B0) | 1 | 2 | 3 | 4 | 5 | 6 | 7 | 8 | 9 | Number of entries |
|---|---|---|---|---|---|---|---|---|---|---|
| 11000y2y1y0 | | | | | 242 | | | | | 8 |
| 11001y2y1y0 | | | | | 484 | | | | | 8 |
| 11010y2y1y0 | | | | | 996 | | | | | 8 |
| 11011y2y1y0 | | | | | Reserved | | | | | 8 |
| 111x4x3x2x1x0 | | | | | Reserved | | | | | 32 |

TABLE 6

| 11011y2y1y0 | 242 | 8 entries indicating 9-16 users |
| --- | --- | --- |
| 11100y2y1y0 | 484 | 8 entries indicating 9-16 users |
| 11101 | 996 | 8 entries indicating 9-16 users |
| 1111x3x2x1x0 | Reserved | 16 |

As depicted in Table 6, up to eight users may be indicated as in Table 5 (i.e., RU allocation table for HE, or EHT), and 9-16 users may be indicated using the new entries in Table 6. In some cases, if SIG-B Compression=1, the bandwidth field including 3 bits may indicate 20/40/80/160(80+80)/320 MHz bandwidth, and the number of SIG-B symbols or MU-MIMO users field may be repurposed to be reserved. In some cases, the number of SIG-B symbols or MU-MIMO users may be used for indicating other properties such as LTF Extensions.

Figure 3:
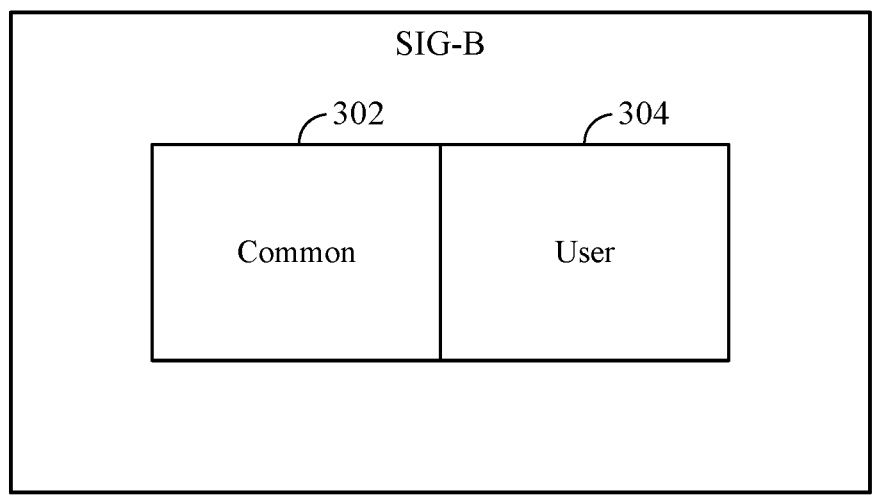
FIG. 3 illustrates an example of a second signaling (SIG-B) portion that supports multi-user preamble format for a WLAN in accordance with aspects of the present disclosure.

FIG. 3 illustrates an example of a SIG-B portion 300 (e.g., a HE-SIG-B portion or an EHT-SIG-B portion) that supports multi-user preamble format for a WLAN in accordance with aspects of the present disclosure. In some examples, SIG-B portion 300 may include a full bandwidth common field 302 and a user field 304.

In some cases, the full bandwidth common field 302 may be present in each sub-band of the set of sub-bands as described in FIG. 2. In some examples, one full bandwidth common field 302 may be present in each sub-band of the set of sub-bands, where each full bandwidth common field 302 may have identical values access each sub-band. The full bandwidth common field 302 may include a first field of the full bandwidth common field 302 indicating the puncturing pattern of the bandwidth, a second field of the full bandwidth common field 302 indicating the number of the set of stations for the MU-MIMO transmission, a third field of the full bandwidth common field 302 including a cyclic redundancy check, and a fourth field of the full bandwidth common field 302 including a convolutional decoding tail. In some cases, the full bandwidth common field 302 may include 19 bits and may follow a pattern described in Table 7. In some cases, a first field of the full bandwidth common field 302 may indicate the puncturing pattern of the bandwidth and the number of the set of stations for the MU-MIMO transmission, a second field of the full bandwidth common field 302 may indicate a cyclic redundancy check, and a third field of the full bandwidth common field 302 may indicate a convolutional decoding tail. In some cases, such a pattern for the full bandwidth common field 302 may be described in Table 8.

TABLE 7

| Bits | Field |
| --- | --- |
| 5 | Bandwidth with puncture pattern |
| 4 | Number of MU-MIMO users |
| 4 | Cyclic Redundancy Check |
| 6 | Convolutional Decoding Tail |

TABLE 8

| Bits | Field |
| --- | --- |
| 9 | Bandwidth with puncture pattern and number of MU-MIMO users |
| 4 | Cyclic Redundancy Check |
| 6 | Convolutional Decoding Tail |

As described in Table 7, the first field of the full bandwidth common field 302 may include 5 bits, the second field of the full bandwidth common field 302 may include 4 bits, the third field of the full bandwidth common field 302 may include 4 bits, and the fourth field of the full bandwidth common field 302 may include 6 bits. Additionally, as described in Table 8, the first field of the full bandwidth common field 302 may include 9 bits, the second field of the full bandwidth common field 302 may include 4 bits, and the third field of the full bandwidth common field 302 may include 6 bits. In some cases, the SIG-B portion of the preamble, the full bandwidth common field 302 and the user field 304 may be included without padding in between. Additionally, the full bandwidth common field 302 may be encoded using a binary convolutional code (BCC) with a code rate of ½.

Figure 4A:
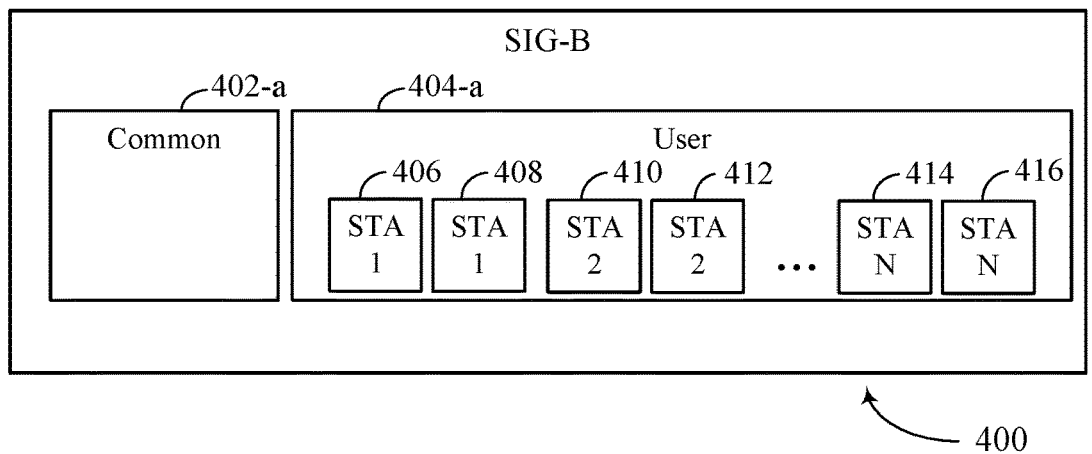
FIGS. 4A-4C illustrates an example of SIG-B portions that support multi-user preamble format for a WLAN in accordance with aspects of the present disclosure.
Figure 4B:
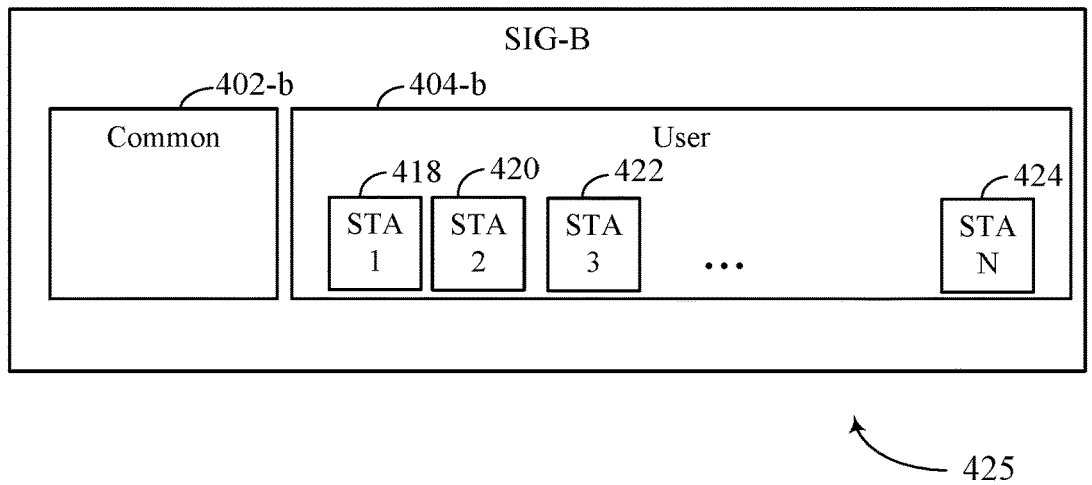
Figure 4C:
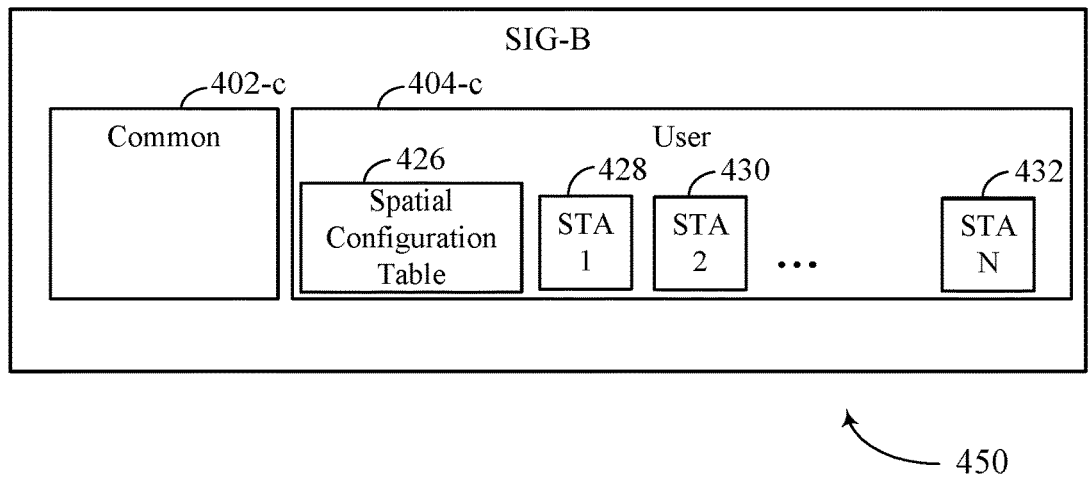

FIGS. 4A-4C illustrate examples of SIG-B portions 400, 425 and 450 that support multi-user preamble format for a WLAN in accordance with aspects of the present disclosure. In some examples, SIG-B portions 400, 425 and 450 may include a full bandwidth common field 402 (such as 402-a, 402-b, 402-c) and a user field 404 (such as 404-a, 404-b, 404-c). In some cases, the full bandwidth common field 402 (such as 402-a, 402-b, 402-c) may be present in each sub-band of the set of sub-bands. That is the full bandwidth common field 402 (such as 402-a, 402-b, 402-c) may be present in each 20 MHz portion as described with reference to FIG. 2.

With reference to FIG. 4A, the SIG-B portions 400 may include multiple instances of per-user fields (such as 406, 408, 410, 412, 414, 416) allocated to a set of stations. In some cases, a pair of per-user fields may be allocated to a station of a set of stations associated with the MU-MIMO transmission. As described in FIG. 4A, the per-user field 406 and the per-user field 408 may be associated with station 1 (such as STA 1). Additionally, the per-user field 410 and the per-user field 412 may be associated with station 2 (such as STA 2). In some cases, the multiple instances of the per-user field (such as 406, 408, 410, 412, 414, 416) may collectively indicate a spatial configuration of the station for the MU-MIMO transmission. In one example, the per-user field 406 and the per-user field 408 may indicate the spatial configuration for station 1 (such as STA 1). In some cases, the access point may generate a spatial configuration field and a spatial configuration extension field for each instance of the per-user field (such as 406, 408, 410, 412, 414, 416) for the station. In some cases, the spatial configuration field and a spatial configuration extension field may be generated according to Table 9.

TABLE 9

| Bits | Subfield |
| --- | --- |
| B0-B10 | Station identifier (STA-ID) |
| B11-B14 | Spatial Configuration |
| B15-B18 | Modulation and Coding Scheme (MCS) |
| B19 | Spatial Configuration Extension |
| B20 | Spatial Configuration Extension |

In some examples, the spatial configuration field may include 4 bits and the spatial configuration extension field may include 2 bits. In some HE or EHT environments, the 4 bits of the configuration field indicate may indicate a starting space-time index out of all starting space-time indices across all users for a particular station and the remaining 2 bits for the spatial configuration extension field may indicate the number of space-time streams allocated to the station. However, in next generation WLAN environments, the access point may be configured to assign more than four space-time streams to a station. In order to assign more than four space-time streams to one station, the access point may overcome the 2-bit limitation by assigning two per-user fields to that station. Thus, the access point may transmit multiple instances of per-user fields (such as 406, 408, 410, 412, 414, 416) so that they collectively indicate the total number of space-time streams allocated to the station. In some cases, the first per-user field 406 may indicate the four space-time streams allocated to the station (such as STA 1), and the second per-user field 408 may indicate the remaining streams on the same RU to the station (such as STA 1). In some cases, the full bandwidth common field 402 may indicate a total number of MU-MIMO as "n+x," where "n" is the number of user fields with unique STA-ID and "x" is the number of user fields with duplicate STA-ID. The access point may perform the MU-MIMO transmission to the stations according to the indicated spatial configurations.

With reference to FIG. 4B, the SIG-B portion 425 may include multiple instances of per-user fields (such as 418, 420, 422, 424) allocated to a set of stations. As depicted in FIG. 4B, the SIG-B portion 425 may include a set of per-user fields, each per-user field indicating a spatial configuration of a different station (such as STA 1, STA 2, . . . , STA N) of a set of stations associated with the MU-MIMO transmission. In some cases, a first spatial configuration of a first per-user field 418 of the set of per-user fields may reference a first spatial configuration table, and one or more remaining spatial configurations of one or more remaining per-user fields (such as 420, 422, 424) of the set of per-user fields may reference a second spatial configuration table. In some cases, the first spatial configuration table may be generated according to Table 10 and the second configuration table may be generated according to Table 11. More specifically, the access point may be configured to utilize the first spatial configuration table and the second spatial configuration table to signal up to sixteen space-time streams and up to eight space-time streams per user.

TABLE 10

| Number of Entries | Entry | Number of Bits |
| --- | --- | --- |
| 8 | Start Nsts Idx = 1 Nsts = 1, 2, 3, 4, 5, 6, 7, 8 | 3 bits to cover 8 combinations (some values are reserved) |

TABLE 11

| Number of Entries | Entry | Number of Bits |
| --- | --- | --- |
| 1 | Start Nsts Idx = 2, Nsts = 1 | 6 bits to cover 60 combinations (some values are reserved) |
| 2 | Start Nsts Idx = 3, Nsts = 1, 2 | 6 bits to cover 60 combinations (some values are reserved) |
| 3 | Start Nsts Idx = 4, Nsts = 1, 2, 3 | 6 bits to cover 60 combinations (some values are reserved) |
| 4 | Start Nsts Idx = 5, Nsts = 1, 2, 3, 4 | 6 bits to cover 60 combinations (some values are reserved) |
| 5 | Start Nsts Idx = 6, Nsts = 1, 2, 3, 4, 5 | 6 bits to cover 60 combinations (some values are reserved) |
| 6 | Start Nsts Idx = 7, Nsts = 1, 2, 3, 4, 5, 6 | 6 bits to cover 60 combinations (some values are reserved) |
| 7 | Start Nsts Idx = 8, Nsts = 1, 2, 3, 4, 5, 6, 7 | 6 bits to cover 60 combinations (some values are reserved) |
| 8 | Start Nsts Idx = 9, Nsts = 1, 2, 3, 4, 5, 6, 7, 8 | 6 bits to cover 60 combinations (some values are reserved) |
| 4 | Start Nsts Idx = 10, Nsts = 1, 2, 3, 4 | 6 bits to cover 60 combinations (some values are reserved) |
| 5 | Start Nsts Idx = 11, Nsts = 1, 2, 3, 4, 5 | 6 bits to cover 60 combinations (some values are reserved) |
| 5 | Start Nsts Idx = 12, Nsts = 1, 2, 3, 4, 5 | 6 bits to cover 60 combinations (some values are reserved) |
| 4 | Start Nsts Idx = 13, Nsts = 1, 2, 3, 4 | 6 bits to cover 60 combinations (some values are reserved) |
| 3 | Start Nsts Idx = 14, Nsts = 1, 2, 3 | 6 bits to cover 60 combinations (some values are reserved) |
| 2 | Start Nsts Idx = 15, Nsts = 1, 2 | 6 bits to cover 60 combinations (some values are reserved) |
| 1 | Start Nsts Idx = 16, Nsts = 1 | 6 bits to cover 60 combinations (some values are reserved) |

In some cases, the per-user fields (such as 418, 420, 422, 424) may be arranged in descending order of space-time streams allocated per user. That is, a user field corresponding to a station with a number of space-time streams allocated may occur first, followed by others in decreasing order of number of space-time streams allocated. In some cases, a receiving station (such as STA 1, STA 2, . . . , STA N) may estimate a channel for LTF (e.g., HE-LTF or EHT-LTF) and number of space-time streams. In some cases, the station may be configured to parse the first per-user field 306, and determine an indication of a total number of space-time streams for the MU-MIMO transmission.

In some cases, as described in Table 10 and Table 11, the spatial configuration of each per-user field (such as 418, 420, 422, 424) may indicate a starting space-time stream index and a number of space-time streams allocated to the station associated with that per-user field (such as 418, 420, 422, 424). In some cases, the first spatial configuration table (such as Table 10) is smaller than the second spatial configuration table (such as Table 11). Additionally or alternatively, the first spatial configuration of the first per-user field 418 may have a format different from the one or more remaining spatial configurations of the one or more remaining per-user fields (such as 420, 422, 424). In some cases, the access point may include an indication of a total number of space-time streams for the MU-MIMO transmission in the first per-user field 418. The access point may perform the MU-MIMO transmission to the stations according to the indicated spatial configurations.

With reference to FIG. 4C, the SIG-B portion 450 may include an indication of a spatial configuration table 426 and a set of per-user fields (such as 428, 430, 432). In some cases, the spatial configuration table 426 may indicate a spatial configuration of a different station of a set of stations (such as STA 1, STA 2, . . . , STA N) associated with the MU-MIMO transmission by reference to the indicated spatial configuration table 426. For example, a set of stations may receive a first per-user field as a common per-user field. The common per-user field may indicate the spatial configuration table 426. In some examples, the spatial configuration table may be generated according to Table 12.

TABLE 12

| N user | 8 bits B0-B7 |
|---|---|
| 2 | 36 entries |
| 3 | 89 entries |
| 4 | 129 entries |
| 5 | 136 entries |
| 6 | 118 entries |
| 7 | 91 entries |
| 8 | 66 entries |
| 9 | 45 entries |
| 10 | 30 entries |
| 11 | 19 entries |
| 12 | 12 entries |
| 13 | 7 entries |
| 14 | 4 entries |
| 15 | 2 entries |
| 16 | 1 entry |

In some cases, the access point may be configured to utilize the common per-user field to signal up the spatial configuration table 426, and the remaining per-user fields (such as 428, 430, 432) may be used to signal other attributes to their associated stations (such as station 1, station 2, . . . , station N). In some cases, such attributes may be MCS, coding, Dual Subcarrier Modulation (DCM), etc. Each station (such as station 1, station 2, . . . , station N) may receive the spatial configuration table 426 and may identify their spatial configuration by reading the column of the spatial configuration table corresponding to their per-user field position in a list of per-user fields (such as 428, 430, 432). The access point may then perform the MU-MIMO transmission to the stations according to the indicated spatial configurations.

Figure 5:
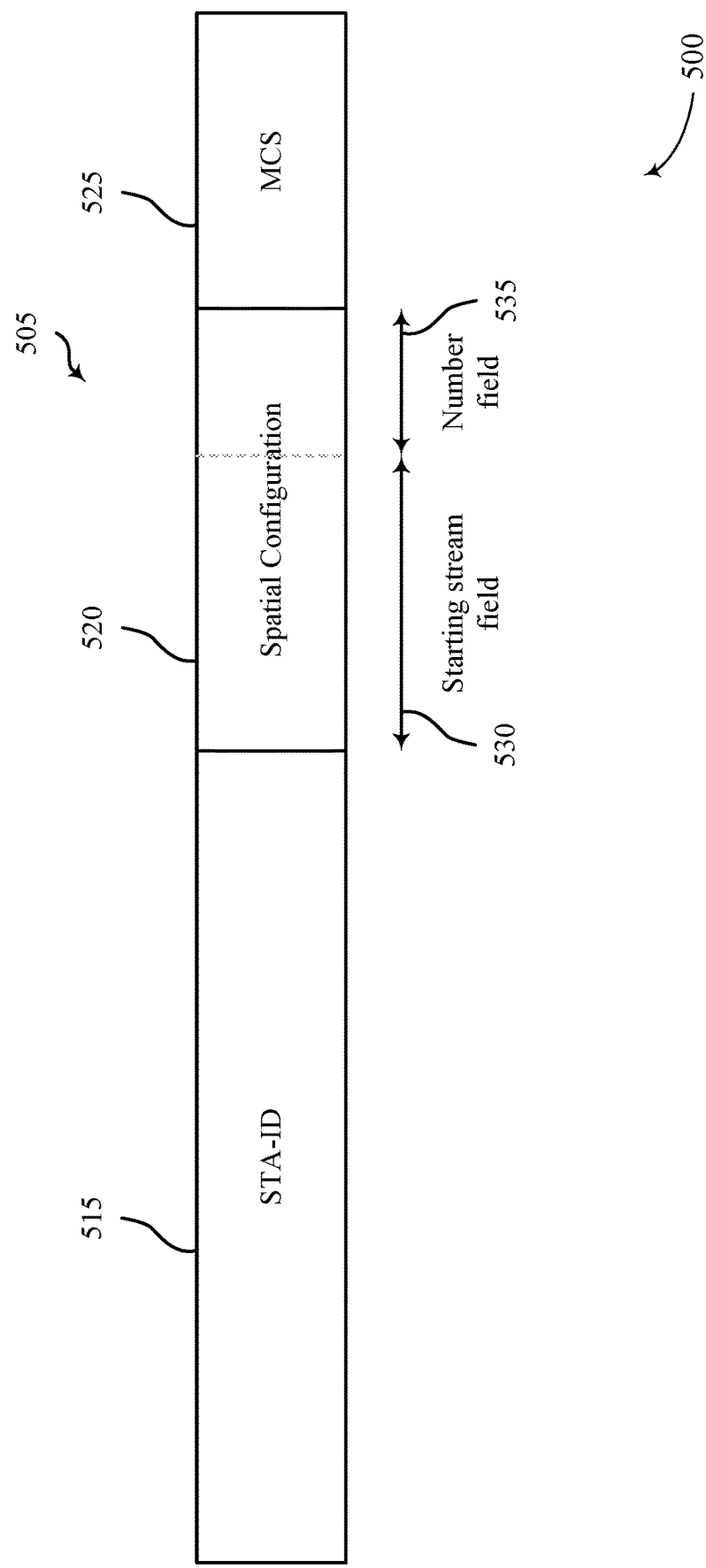
FIG. 5 illustrates an example of a SIG-B field that supports multi-user preamble format for a WLAN in accordance with aspects of the present disclosure.

FIG. 5 illustrates examples of SIG-B field 500 that supports multi-user preamble format for a WLAN in accordance with aspects of the present disclosure. The SIG-B field 500 field may support communications between an access point and a set of stations according to some implementations. The SIG-B field 500 may be an example of the SIG-B field 234 described with reference to FIG. 2. In some cases, the SIG-B field 500 may be an example of an EHT-SIG-B field that supports signaling of up to sixteen spatial streams in a per-user field. In some cases, the EHT-SIG-B field may be a modified version of a SIG-B field. The SIG-B field 500 may be part of a multiple user physical layer convergence procedure (PLCP) protocol data unit (MU PPDU). The MU PPDU may be an example of a HE MU PPDU or an EHT MU PPDU. The type of SIG-B field used by the access point may be based on a compression mode of different possible compression modes of the SIG-B field. In some cases, the compression mode may be indicated in a SIG-A field.

In some cases, the EHT MU PPDU may be configured to indicate a variety of information for one or more stations. For example, the EHT MU PPDU may include multiple fields, each of which may be associated with a particular station. In some cases, the SIG-B field 500 may be used to allocate MU MIMO resources to a station. In some cases, a SIG-B field 500 may be at least a portion of a user specific field or at least a portion of a user block field, such as within a user specific field in a SIG-B field.

In next generation WLAN environments, the number of different possible spatial configurations may be greater than other environments (for example, an HE or EHT environment) because an access point may be configured to allocate up to sixteen different spatial streams to a set of stations. The SIG-B field 500 may be configured to indicate to an individual station its spatial stream configuration. The SIG-B field 500 may be configured in a variety of different ways. The field 505 may include a STA-ID field 515, a spatial configuration field 520, and an MCS field 525. The field 505 may include twenty-one bits, in some cases.

The STA-ID field 515 may indicate the station identifier for the station intended to use the field 505. In some cases, the STA-ID field 515 may include eleven bits (for example, B0-B10). In some cases, the spatial configuration field 520 may indicate the spatial streams that are allocated to the station indicated in the STA-ID field 515. The spatial configuration field 520 may be divided into a starting spatial stream field 530 and a spatial stream number field 535. The starting spatial stream field 530 may indicate the index of a first spatial stream being allocated to the station and the spatial stream number field 535 may indicate the number of spatial streams being allocated to the station. Using this information, the station may be configured to determine the indices for each of any other spatial streams allocated to the station by the access point. Additionally, The MCS field 525 may indicate the MCS for resources allocated to the station indicated in the STA-ID field 515. The MCS field 525 may include four bits (for example, B15-B18). In some EHT environments, the access point may be able to allocate up to sixteen different spatial streams to different stations, where any individual station may be allocated up to eight spatial streams. In such examples, the starting spatial stream field 530 may indicate one of the sixteen different spatial streams as the starting spatial stream that is allocated to the station. The MCS field 525 may indicate the MCS for resources allocated to the station indicated in the STA-ID field 515. The MCS field 525 may include four bits. Although the field 505 may show a particular distributions of fields, the fields may be distributed throughout field 505 in any manner, including in a manner different than that shown. For example, the MCS field 525 may be before the spatial configuration field 520. In other examples, bits of fields may be interleaved with one another. Other configurations are also possible.

Figure 6:
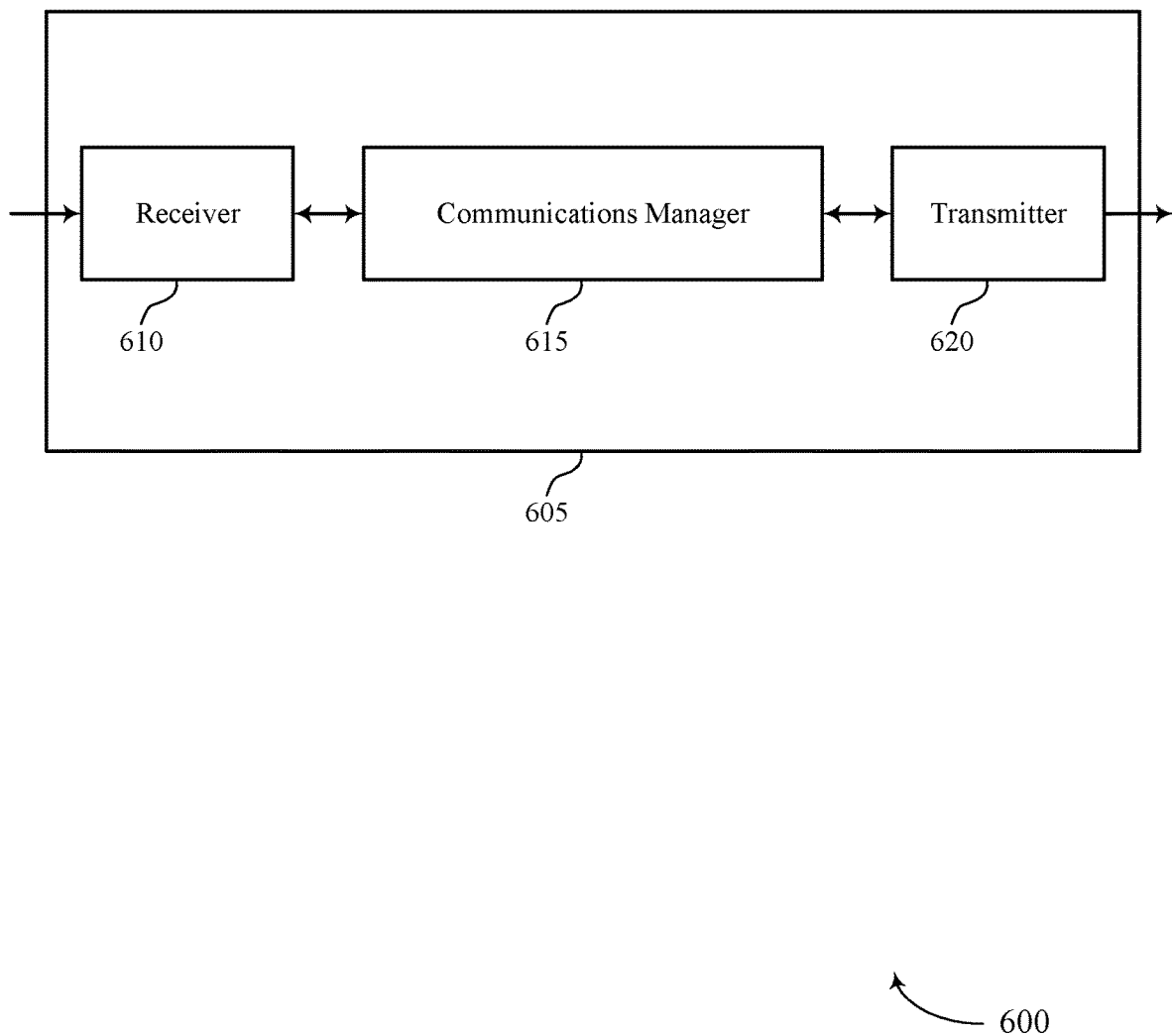
FIGS. 6 and 7 show block diagrams of devices that support multi-user preamble format for a WLAN in accordance with aspects of the present disclosure.

FIG. 6 shows a block diagram 600 of a device 605 that supports multi-user preamble format for a WLAN in accordance with aspects of the present disclosure. The device 605 may be an example of aspects of an access point as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to multi-user preamble format for a WLAN). Information may be passed on to other components of the device. The receiver 610 may be an example of aspects of the transceiver 920 described with reference to FIG. 9. The receiver 610 may utilize a single antenna or a set of antennas.

The communications manager 615 may transmit a first SIG-A portion of a preamble for a MU-MIMO transmission, where the SIG-A portion configures a bandwidth of the MU-MIMO transmission and indicates that a SIG-B portion of the preamble includes a full bandwidth common field, transmit the SIG-B portion of the preamble, the SIG-B portion including the full bandwidth common field duplicated once on each of a set of segments of the bandwidth, where the full bandwidth common field configures a puncturing pattern for the bandwidth and a number of a set of stations for the MU-MIMO transmission, and perform the MU-MIMO transmission to the set of MU-MIMO stations on the bandwidth in accordance with the puncturing pattern. The communications manager 615 may also transmit a SIG-A portion of a preamble for a MU-MIMO transmission, transmit a SIG-B portion of the preamble, the SIG-B portion including multiple instances of a per-user field for a station of a set of stations associated with the MU-MIMO transmission, where the multiple instances of the per-user field collectively indicate a spatial configuration of the station for the MU-MIMO transmission, and perform the MU-MIMO transmission to the station according to the indicated spatial configuration. In some implementations, SIG-A and SIG-B fields may be high efficiency (HE) fields, EHT fields, or a combination of thereof. In some cases, preambles may be an HE preamble, an EHT preamble, or a combination thereof. In some cases, LTFs may be HE-LTFs, EHT-LTFs, or a combination thereof.

The communications manager 615 may also transmit a SIG-A portion of a preamble for a MU-MIMO transmission, transmit a SIG-B portion of the preamble, the SIG-B portion including a set of per-user fields, each per-user field indicating a spatial configuration of a different station of a set of stations associated with the MU-MIMO transmission, where a first spatial configuration of a first per-user field of the set per-user fields references a first spatial configuration table, and one or more remaining spatial configurations of one or more remaining per-user fields of the set of per-user fields reference a second spatial configuration table, and perform the MU-MIMO transmission to the set of stations according to the indicated spatial configurations. The communications manager 615 may also transmit a SIG-A portion of a preamble for a MU-MIMO transmission, transmit a SIG-B portion of the preamble, the SIG-B portion including an indication of a spatial configuration table and a set of per-user fields, the spatial configuration table indicating a spatial configuration of a different station of a set of stations associated with the MU-MIMO transmission by reference to the indicated spatial configuration table, and perform the MU-MIMO transmission to the set of stations according to the indicated spatial configurations. The communications manager 615 may be an example of aspects of the communications manager 805 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

In some implementations, the communication manager 615 may be implemented as a wireless modem that connects to the receiver over a first interface and to the transmitter over a second interface. The wireless modem may obtain and decode signals received wirelessly from the receiver over the first interface, and may output signals for wireless transmission over the transmitter via the second interface.

The transmitter 620 may transmit signals generated by other components of the device. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

The communications manager 615 as described herein may be implemented to realize one or more potential advantages. One implementation may allow the device 605 to more efficiently coordinate communications (such as, communications including control signaling) in next generation WLANs, that may include devices such as device 605. Based on implementing the multi-user preamble formats and control signaling techniques as described herein, a processor of a UE 115 (e.g., controlling the receiver 610, the transmitter 620, or the transceiver 920 as described with reference to FIG. 9) may increase signaling efficiency while maintaining backwards compatibility, and allow increased capabilities of access points and stations in a WLAN.

Figure 7:
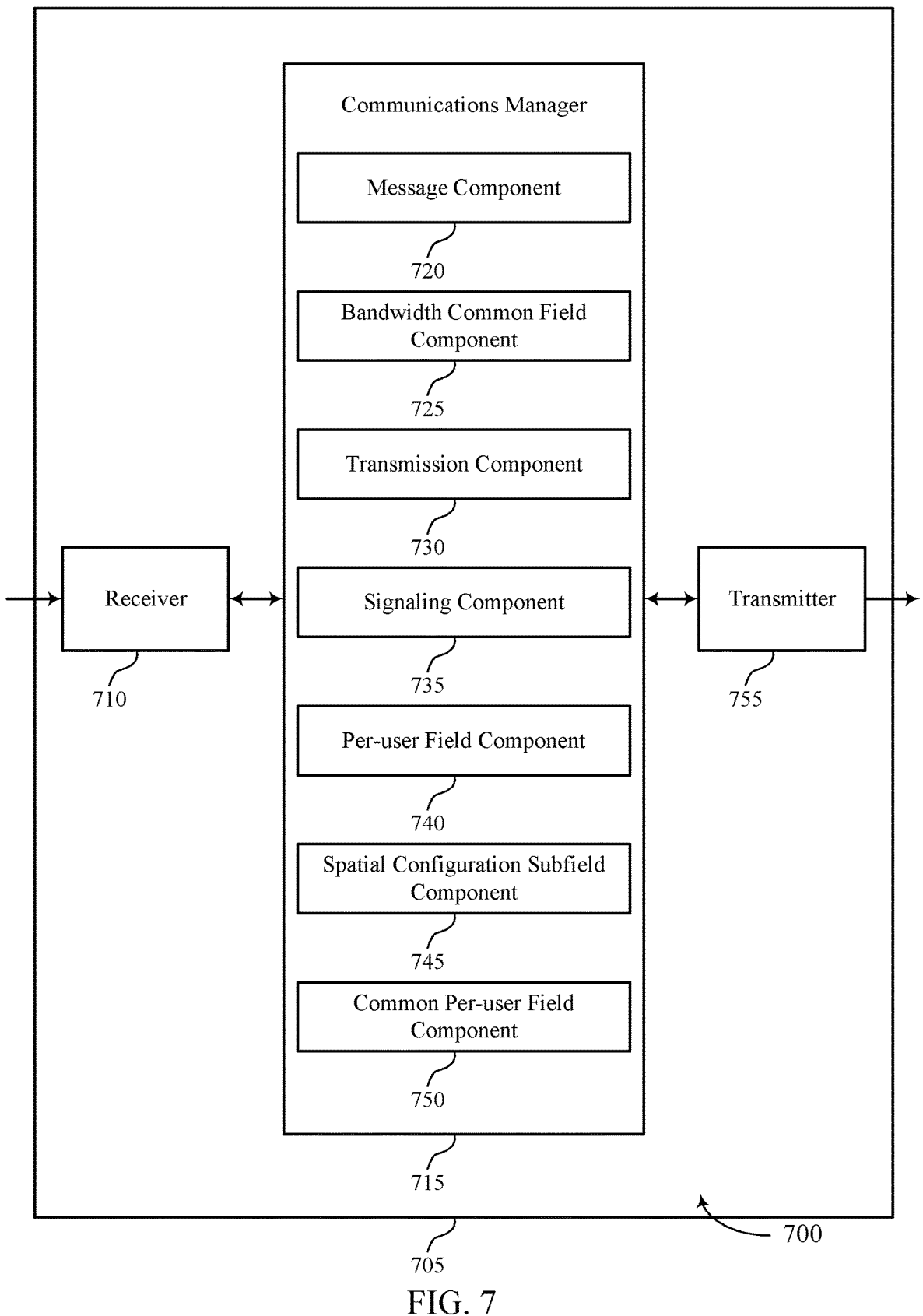

FIG. 7 shows a block diagram 700 of a device 705 that supports multi-user preamble format for a WLAN in accordance with aspects of the present disclosure. The device 705 may be an example of aspects of a device 605 or an access point 105 as described herein. The device 705 may include a receiver 710, a communications manager 715, and a transmitter 755. The device 705 may also include a processor. Each of these components may be in communication with one another (e.g., via one or more buses).

The receiver 710 may receive information such as packets, user data, or control information associated with various information channels (e.g., control channels, data channels, and information related to multi-user preamble format for a WLAN). Information may be passed on to other components of the device. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a message component 720, a bandwidth common field component 725, a transmission component 730, a signaling component 735, a per-user field component 740, a spatial configuration subfield component 745, and a common per-user field component 750. The communications manager 715 may be an example of aspects of the communications manager 805 described herein.

The message component 720 may transmit a SIG-A portion of a preamble for a MU-MIMO transmission, where the SIG-A portion configures a bandwidth of the MU-MIMO transmission and indicates that a SIG-B portion of the preamble includes a full bandwidth common field. The bandwidth common field component 725 may transmit the SIG-B portion of the preamble, the SIG-B portion including the full bandwidth common field duplicated once on each of a set of segments of the bandwidth, where the full bandwidth common field configures a puncturing pattern for the bandwidth and a number of a set of stations for the MU-MIMO transmission. In some implementations, SIG-A and SIG-B fields may be high efficiency (HE) fields, EHT fields, or a combination of thereof. In some cases, preambles may be an HE preamble, an EHT preamble, or a combination thereof. In some cases, LTFs may be HE-LTFs, EHT-LTFs, or a combination thereof.

The transmission component 730 may perform the MU-MIMO transmission to the set of MU-MIMO stations on the bandwidth in accordance with the puncturing pattern. The signaling component 735 may transmit a SIG-A portion of a preamble for a MU-MIMO transmission. The per-user field component 740 may transmit a SIG-B portion of the preamble, the SIG-B portion including multiple instances of a per-user field for a station of a set of stations associated with the MU-MIMO transmission, where the multiple instances of the per-user field collectively indicate a spatial configuration of the station for the MU-MIMO transmission.

The transmission component 730 may perform the MU-MIMO transmission to the station according to the indicated spatial configuration. The signaling component 735 may transmit a SIG-A portion of a preamble for a MU-MIMO transmission. The spatial configuration subfield component 745 may transmit a SIG-B portion of the preamble, the SIG-B portion including a set of per-user fields, each per-user field indicating a spatial configuration of a different station of a set of stations associated with the MU-MIMO transmission, where a first spatial configuration of a first per-user field of the set per-user fields references a first spatial configuration table, and one or more remaining spatial configurations of one or more remaining per-user fields of the set of per-user fields reference a second spatial configuration table.

The transmission component 730 may perform the MU-MIMO transmission to the set of stations according to the indicated spatial configurations. The signaling component 735 may transmit a SIG-A portion of a preamble for a MU-MIMO transmission. The common per-user field component 750 may transmit a SIG-B portion of the preamble, the SIG-B portion including an indication of a spatial configuration table and a set of per-user fields, the spatial configuration table indicating a spatial configuration of a different station of a set of stations associated with the MU-MIMO transmission by reference to the indicated spatial configuration table. The transmission component 730 may perform the MU-MIMO transmission to the set of stations according to the indicated spatial configurations.

The transmitter 755 may transmit signals generated by other components of the device. In some examples, the transmitter 755 may be collocated with a receiver 710 in a transceiver module. For example, the transmitter 755 may be an example of aspects of the transceiver 920 described with reference to FIG. 9. The transmitter 755 may utilize a single antenna or a set of antennas.

Figure 8:
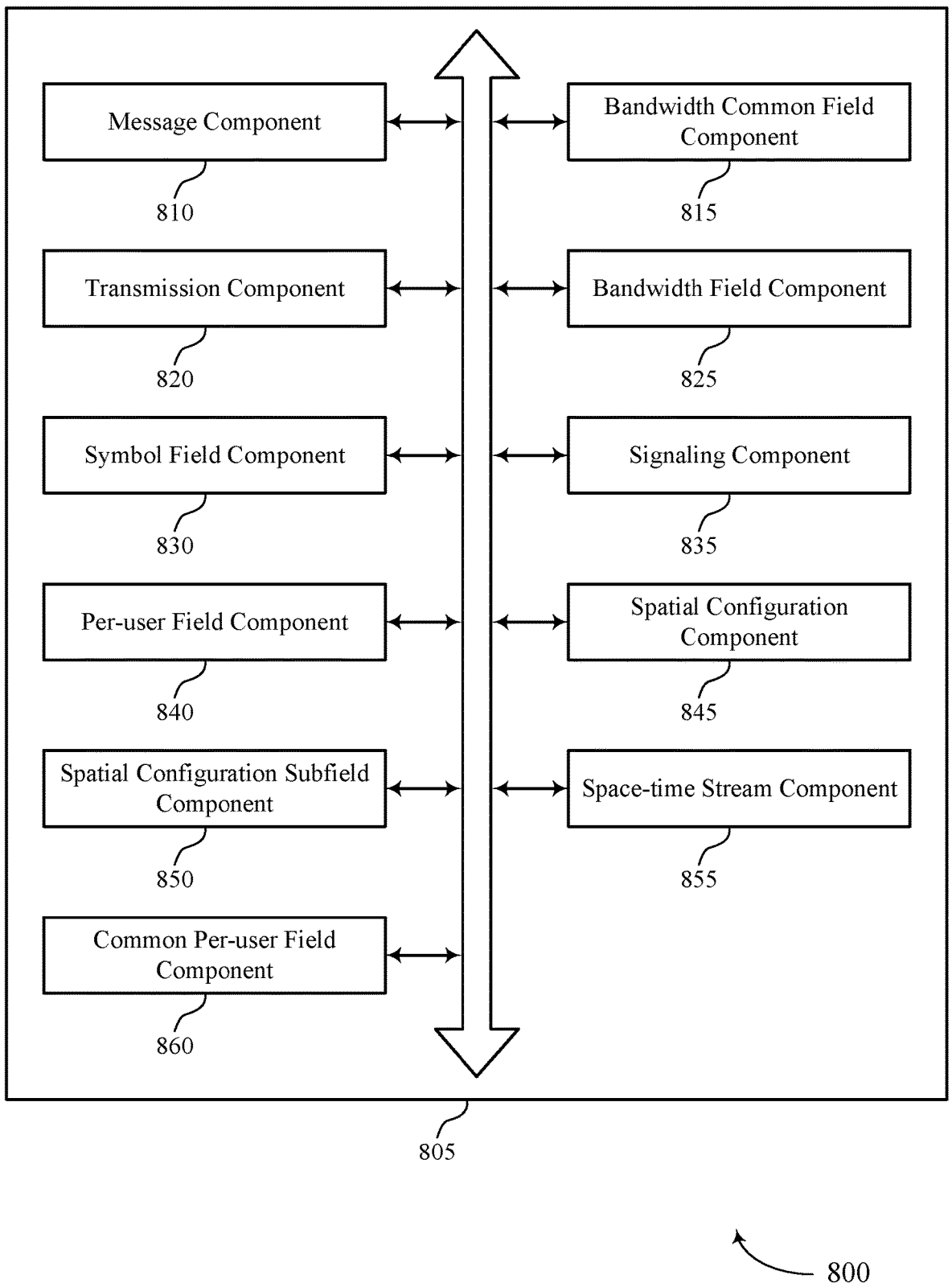
FIG. 8 shows a block diagram of a communications manager that supports multi-user preamble format for a WLAN in accordance with aspects of the present disclosure.

FIG. 8 shows a block diagram 800 of a communications manager 805 that supports multi-user preamble format for a WLAN in accordance with aspects of the present disclosure. The communications manager 805 may be an example of aspects of a communications manager 615 or a communications manager 715. The communications manager 805 may include a message component 810, a bandwidth common field component 815, a transmission component 820, a bandwidth field component 825, a symbol field component 830, a signaling component 835, a per-user field component 840, a spatial configuration component 845, a spatial configuration subfield component 850, a space-time stream component 855, and a common per-user field component 860. Each of these modules may communicate, directly or indirectly, with one another (e.g., via one or more buses).

The message component 810 may transmit a SIG-A portion of a preamble for a MU-MIMO transmission, where the SIG-A portion configures a bandwidth of the MU-MIMO transmission and indicates that a SIG-B portion of the preamble includes a full bandwidth common field. In some examples, transmitting the SIG-A portion of the preamble includes setting a bit of a SIG-B Compression field to indicate that the SIG-B includes the full bandwidth common field. In some examples, transmitting the SIG-A portion of the preamble includes setting a bit of a SIG-B Compression field to indicate that the SIG-B includes an OFDMA common field indicating an RU allocation and the number of the set of stations. In some cases, the bandwidth of the MU-MIMO transmission is 320 MHz. In some cases, each of the set of segments of the bandwidth is 20 MHz. In some implementations, SIG-A and SIG-B fields may be high efficiency (HE) fields, EHT fields, or a combination of thereof. In some cases, preambles may be an HE preamble, an EHT preamble, or a combination thereof. In some cases, LTFs may be HE-LTFs, EHT-LTFs, or a combination thereof.

The bandwidth common field component 815 may transmit the SIG-B portion of the preamble, the SIG-B portion including the full bandwidth common field duplicated once on each of a set of segments of the bandwidth, where the full bandwidth common field configures a puncturing pattern for the bandwidth and a number of a set of stations for the MU-MIMO transmission.

In some examples, the bandwidth common field component 815 may generate a first field of the full bandwidth common field indicating the puncturing pattern of the bandwidth, a second field of the full bandwidth common field indicating the number of the set of stations for the MU-MIMO transmission, a third field of the full bandwidth common field including a cyclic redundancy check, and a fourth field of the full bandwidth common field including a convolutional decoding tail.

In some examples, the bandwidth common field component 815 may generate a first field of the full bandwidth common field indicating the puncturing pattern of the bandwidth and the number of the set of stations for the MU-MIMO transmission, a second field of the full bandwidth common field including a cyclic redundancy check, and a third field of the full bandwidth common field including a convolutional decoding tail. In some cases, the first field of the full bandwidth common field includes 5 bits, the second field of the full bandwidth common field includes 4 bits, the third field of the full bandwidth common field includes 4 bits, and the fourth field of the full bandwidth common field includes 6 bits.

In some cases, the first field of the full bandwidth common field includes 9 bits, the second field of the full bandwidth common field includes 4 bits, and the third field of the full bandwidth common field includes 6 bits. In some cases, the SIG-B portion of the preamble further includes a user field, the full bandwidth common field and the user field being included in the SIG-B portion of the preamble without a padding in between. In some cases, the full bandwidth common field is encoded using a BCC with a code rate of ½, the full bandwidth common field including 19 bits.

The transmission component 820 may perform the MU-MIMO transmission to the set of MU-MIMO stations on the bandwidth in accordance with the puncturing pattern. In some examples, the transmission component 820 may perform the MU-MIMO transmission to the station according to the indicated spatial configuration. In some examples, the transmission component 820 may perform the MU-MIMO transmission to the set of stations according to the indicated spatial configurations. In some examples, the transmission component 820 may perform the MU-MIMO transmission to the set of stations according to the indicated spatial configurations.

The signaling component 835 may transmit a SIG-A portion of a preamble for a MU-MIMO transmission. The per-user field component 840 may transmit a SIG-B portion of the preamble, the SIG-B portion including multiple instances of a per-user field for a station of a set of stations associated with the MU-MIMO transmission, where the multiple instances of the per-user field collectively indicate a spatial configuration of the station for the MU-MIMO transmission.

The spatial configuration subfield component 850 may transmit a SIG-B portion of the preamble, the SIG-B portion including a set of per-user fields, each per-user field indicating a spatial configuration of a different station of a set of stations associated with the MU-MIMO transmission, where a first spatial configuration of a first per-user field of the set per-user fields references a first spatial configuration table, and one or more remaining spatial configurations of one or more remaining per-user fields of the set of per-user fields reference a second spatial configuration table.

In some examples, the spatial configuration subfield component 850 may arrange the set of per-user fields of the SIG-B portion of the preamble in a descending order of a number of space-time streams per station. In some cases, the spatial configuration of each per-user field indicates a starting space-time stream index and a number of space-time streams allocated to the station associated with that per-user field. In some cases, the first spatial configuration table is smaller than the second spatial configuration table. In some cases, the first spatial configuration of the first per-user field has a format different from the one or more remaining spatial configurations of the one or more remaining per-user fields.

The common per-user field component 860 may transmit a SIG-B portion of the preamble, the SIG-B portion including an indication of a spatial configuration table and a set of per-user fields, the spatial configuration table indicating a spatial configuration of a different station of a set of stations associated with the MU-MIMO transmission by reference to the indicated spatial configuration table. In some examples, the common per-user field component 860 may arrange the set of per-user fields of the SIG-B portion of the preamble in a descending order of number of space-time streams per station. In some cases, the spatial configuration indicates a starting space-time stream index and a number of space-time streams allocated to the station associated with that per-user field. In some cases, the spatial configuration table includes 8 bits.

The bandwidth field component 825 may generate a bandwidth field and a bandwidth extension field of the SIG-A, the bandwidth field and the bandwidth extension field collectively configuring the bandwidth of the MU-MIMO transmission. In some cases, the bandwidth extension field is repurposed from a number of SIG-B symbols or MU-MIMO users field of the SIG-A portion of the preamble.

In some cases, the bandwidth field and the bandwidth extension field collectively configure a coarse puncturing of the bandwidth of the MU-MIMO transmission. The symbol field component 830 may generate a number of LTF symbols field and a number of LTF symbols extension field to configure a number of LTF symbols in the preamble. In some cases, the number of LTF symbols extension field is repurposed from a number of SIG-B symbols or MU-MIMO users field of the SIG-A portion of the preamble. In some cases, the number of SIG-B symbols or MU-MIMO users field includes 4 bits.

The spatial configuration component 845 may generate, for each instance of the per-user field for the station, a spatial configuration field and a spatial configuration extension field. In some cases, the spatial configuration field indicates a starting space-time index for the station and the spatial configuration extension field indicates a total number of space-time steams allocated to the station. In some cases, the spatial configuration field includes 4 bits and the spatial configuration extension field includes 2 bits.

The space-time stream component 855 may include an indication of a total number of space-time streams for the MU-MIMO transmission in the first per-user field. In some examples, the space-time stream component 855 may indicate a total number of space-time streams for the MU-MIMO transmission using a set of LTFs of the preamble.

Figure 9:
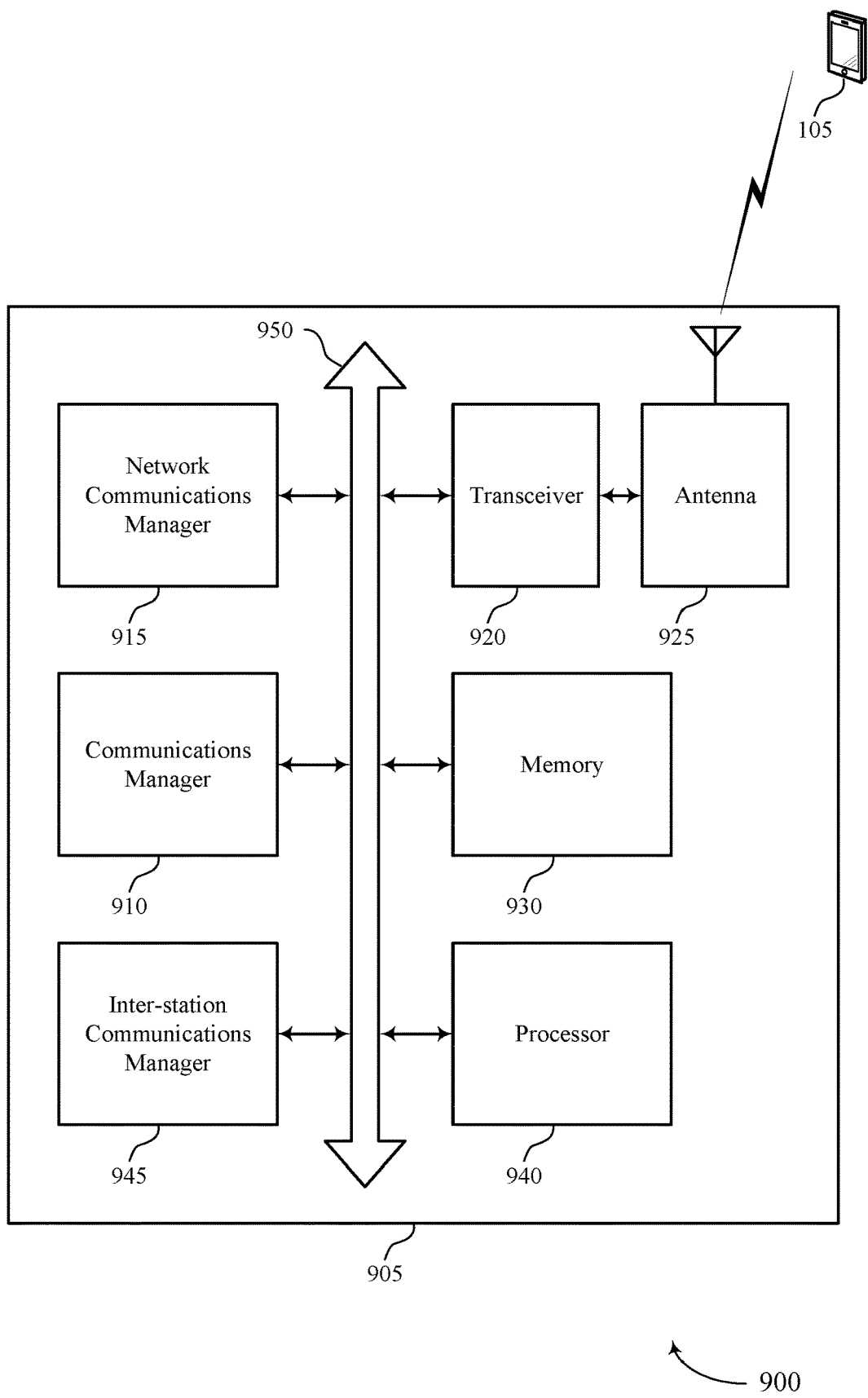
FIG. 9 shows a diagram of a system including a device that supports multi-user preamble format for a WLAN in accordance with aspects of the present disclosure.

FIG. 9 shows a diagram of a system 900 including a device 905 that supports multi-user preamble format for a WLAN in accordance with aspects of the present disclosure. The device 905 may be an example of or include the components of device 605, device 705, or an access point as described herein. The device 905 may include components for bi-directional voice and data communications including components for transmitting and receiving communications, including a communications manager 910, a network communications manager 915, a transceiver 920, an antenna 925, memory 930, a processor 940, and an inter-station communications manager 945. These components may be in electronic communication via one or more buses (e.g., bus 950).

The communications manager 910 may transmit a SIG-A portion of a preamble for a MU-MIMO transmission, where the SIG-A portion configures a bandwidth of the MU-MIMO transmission and indicates that a SIG-B portion of the preamble includes a full bandwidth common field, transmit the SIG-B portion of the preamble, the SIG-B portion including the full bandwidth common field duplicated once on each of a set of segments of the bandwidth, where the full bandwidth common field configures a puncturing pattern for the bandwidth and a number of a set of stations for the MU-MIMO transmission, and perform the MU-MIMO transmission to the set of MU-MIMO stations on the bandwidth in accordance with the puncturing pattern. The communications manager 910 may also transmit a SIG-A portion of a preamble for a MU-MIMO transmission, transmit a SIG-B portion of the preamble, the SIG-B portion including multiple instances of a per-user field for a station of a set of stations associated with the MU-MIMO transmission, where the multiple instances of the per-user field collectively indicate a spatial configuration of the station for the MU-MIMO transmission, and perform the MU-MIMO transmission to the station according to the indicated spatial configuration. In some implementations, SIG-A and SIG-B fields may be high efficiency (HE) fields, EHT fields, or a combination of thereof. In some cases, preambles may be an HE preamble, an EHT preamble, or a combination thereof. In some cases, LTFs may be HE-LTFs, EHT-LTFs, or a combination thereof.

The communications manager 910 may also transmit a SIG-A portion of a preamble for a MU-MIMO transmission, transmit a SIG-B portion of the preamble, the SIG-B portion including a set of per-user fields, each per-user field indicating a spatial configuration of a different station of a set of stations associated with the MU-MIMO transmission, where a first spatial configuration of a first per-user field of the set per-user fields references a first spatial configuration table, and one or more remaining spatial configurations of one or more remaining per-user fields of the set of per-user fields reference a second spatial configuration table, and perform the MU-MIMO transmission to the set of stations according to the indicated spatial configurations. The communications manager 910 may also transmit a SIG-A portion of a preamble for a MU-MIMO transmission, transmit a SIG-B portion of the preamble, the SIG-B portion including an indication of a spatial configuration table and a set of per-user fields, the spatial configuration table indicating a spatial configuration of a different station of a set of stations associated with the MU-MIMO transmission by reference to the indicated spatial configuration table, and perform the MU-MIMO transmission to the set of stations according to the indicated spatial configurations.

The network communications manager 915 may manage communications with the core network (e.g., via one or more wired backhaul links). For example, the network communications manager 915 may manage the transfer of data communications for client devices, such as one or more stations 115.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas. In some cases, the wireless device may include a single antenna 925. However, in some cases the device may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code 935 including instructions that, when executed, cause the processor to perform various functions described herein. In some cases, the memory 930 may contain, among other things, a basic I/O system (BIOS) which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into processor 940. The processor 940 may be configured to execute computer-readable instructions stored in a memory to perform various functions (e.g., functions or tasks supporting multi-user preamble format for a WLAN).

The inter-station communications manager 945 may manage communications with other access points 105, and may include a controller or scheduler for controlling communications with stations 115 in cooperation with other access points 105. For example, the inter-station communications manager 945 may coordinate scheduling for transmissions to stations 115 for various interference mitigation techniques such as beamforming or joint transmission. In some examples, the inter-station communications manager 945 may provide an X2 interface within an LTE/LTE-A wireless communication network technology to provide communication between access points 105.

Figure 10:
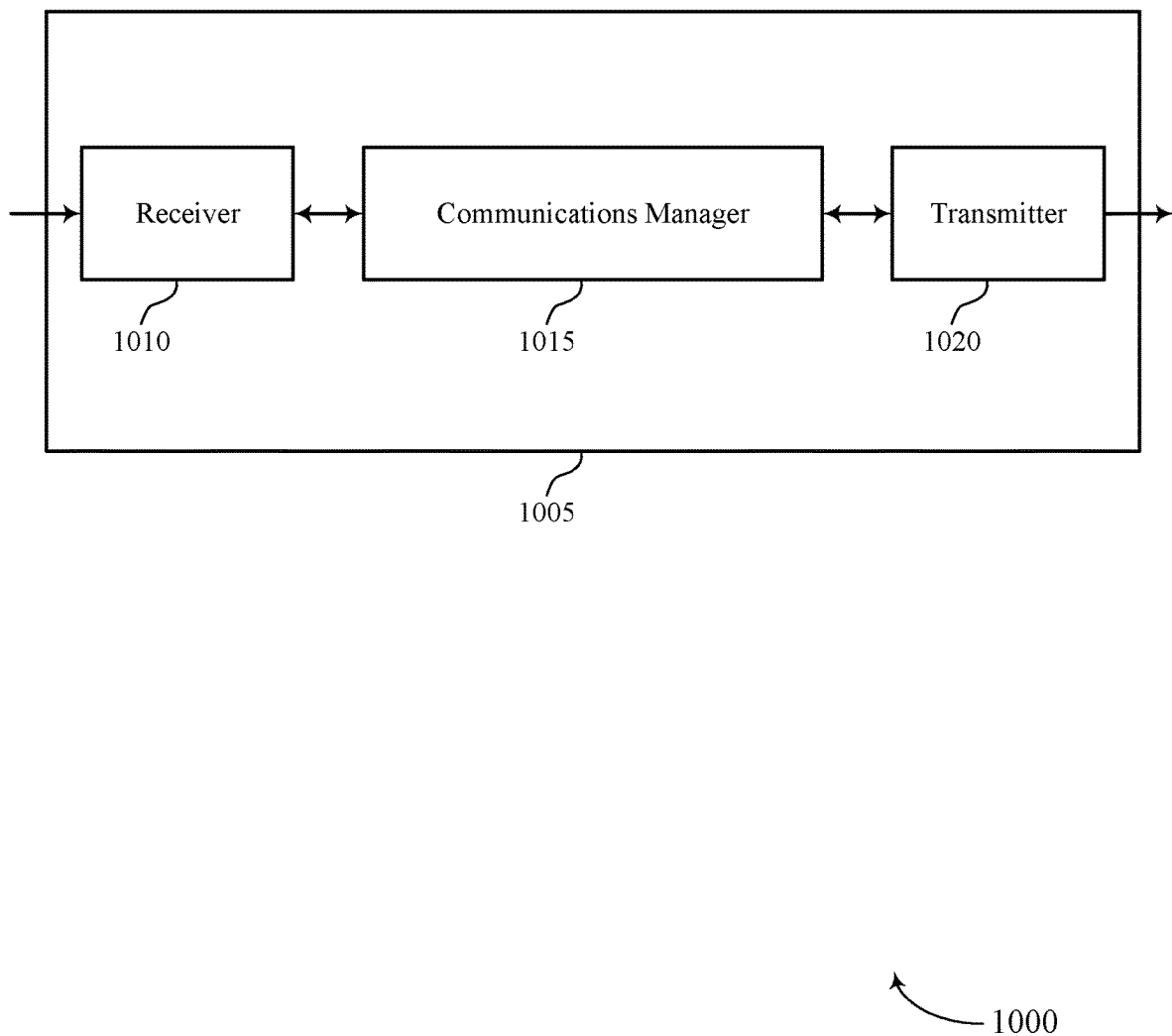
FIGS. 10 and 11 show block diagrams of devices that support multi-user preamble format for a WLAN in accordance with aspects of the present disclosure.

FIG. 10 shows a block diagram 1000 of a device 1005 that supports multi-user preamble format for a WLAN in accordance with aspects of the present disclosure. The device 1005 may be an example of aspects of a station as described herein. The device 1005 may include a receiver 1010, a communications manager 1015, and a transmitter 1020. The device 1005 may also include a processor. Each of these components may be in communication with one another (e.g., via one or more buses).

Receiver 1010 may receive information such as packets, user data, or control information associated with various information channels (e.g., control channels, data channels, and information related to multi-user preamble format for a WLAN). Information may be passed on to other components of the device. The receiver 1010 may be an example of aspects of the transceiver 1320 described with reference to FIG. 13. The receiver 1010 may utilize a single antenna or a set of antennas.

The communications manager 1015 may receive from an access point, a SIG-A portion of a preamble for a MU-MIMO transmission, where the SIG-A portion configures a bandwidth of the MU-MIMO transmission and indicates that a SIG-B portion of the preamble includes a full bandwidth common field, receive from the access point, the SIG-B portion of the preamble, the SIG-B portion including the full bandwidth common field duplicated once on each of a set of segments of the bandwidth, where the full bandwidth common field configures a puncturing pattern for the bandwidth and a number of a set of stations for the MU-MIMO transmission, and perform the MU-MIMO transmission to the access point on the bandwidth in accordance with the puncturing pattern. In some implementations, SIG-A and SIG-B fields may be high efficiency (HE) fields, EHT fields, or a combination of thereof. In some cases, preambles may be an HE preamble, an EHT preamble, or a combination thereof. In some cases, LTFs may be HE-LTFs, EHT-LTFs, or a combination thereof.

The communications manager 1015 may also receive from an access point, a SIG-A portion of a preamble for a MU-MIMO transmission, receive from the access point, a SIG-B portion of the preamble, the SIG-B portion including multiple instances of a per-user field for the station of a set of stations associated with the MU-MIMO transmission, where the multiple instances of the per-user field collectively indicate a spatial configuration of the station for the MU-MIMO transmission, and perform the MU-MIMO transmission to the access point according to the indicated spatial configuration.

The communications manager 1015 may also receive from an access point, a SIG-A portion of a preamble for a MU-MIMO transmission, receive from the access point, a SIG-B portion of the preamble, the SIG-B portion including a set of per-user fields, each per-user field indicating a spatial configuration of a different station of a set of stations associated with the MU-MIMO transmission, where a first spatial configuration of a first per-user field of the set per-user fields references a first spatial configuration table, and one or more remaining spatial configurations of one or more remaining per-user fields of the set of per-user fields reference a second spatial configuration table, and perform the MU-MIMO transmission to the access point according to the indicated spatial configurations.

The communications manager 1015 may also receive from an access point, a SIG-A portion of a preamble for a MU-MIMO transmission, receive from the access point, a SIG-B portion of the preamble, the SIG-B portion including an indication of a spatial configuration table and a set of per-user fields, the spatial configuration table indicating a spatial configuration of a different station of a set of stations associated with the MU-MIMO transmission by reference to the indicated spatial configuration table, and perform the MU-MIMO transmission to the access point according to the indicated spatial configurations. The communications manager 1015 may be an example of aspects of the communications manager 1305 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an I/O component, a transceiver, a network server, another computing device, one or more other components described in the present disclosure, or a combination thereof in accordance with various aspects of the present disclosure.

In some implementations, the communication manager 1015 may be implemented as a wireless modem that connects to the receiver over a first interface and to the transmitter over a second interface. The wireless modem may obtain and decode signals received wirelessly from the receiver over the first interface, and may output signals for wireless transmission over the transmitter via the second interface.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
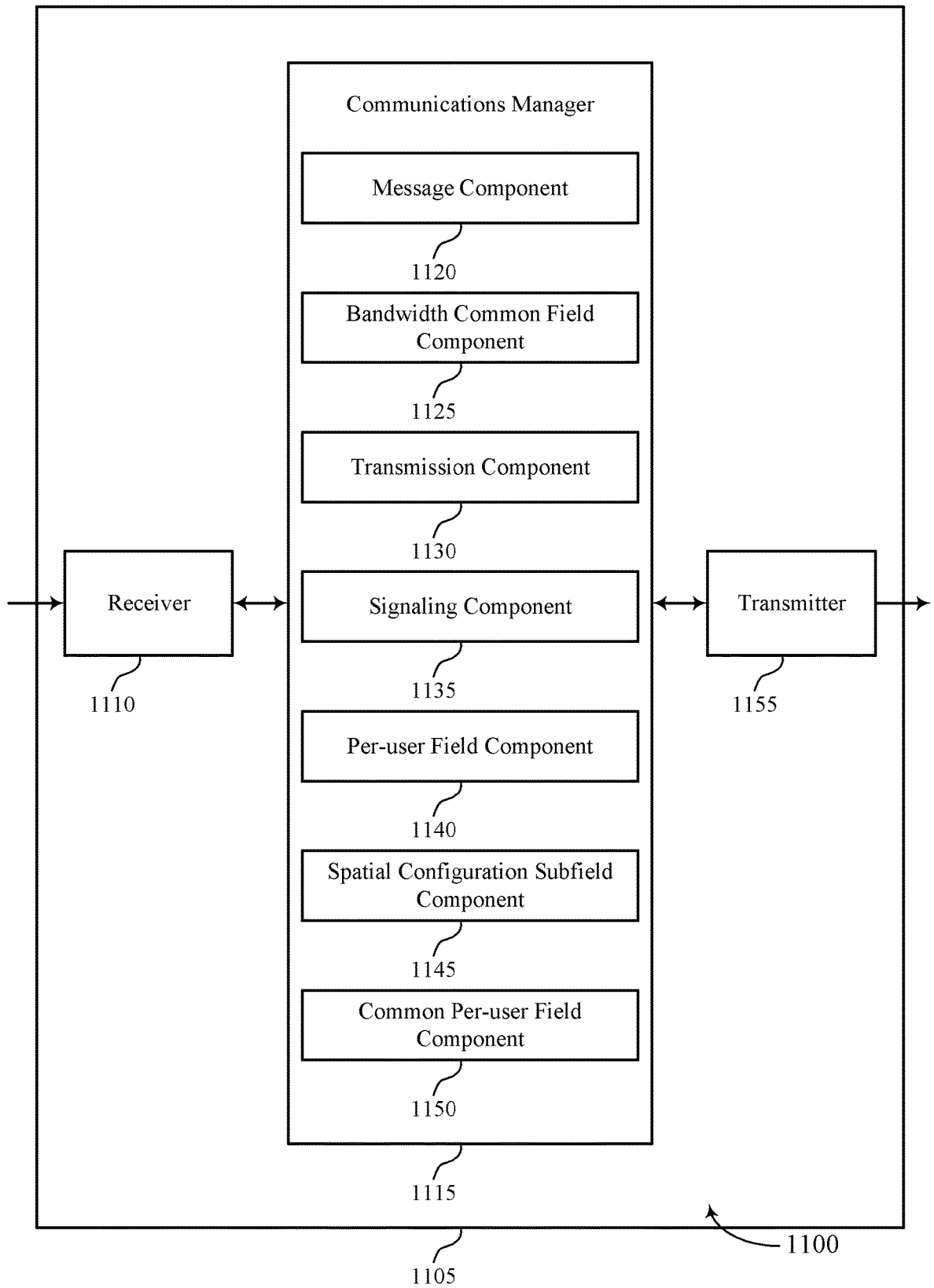

FIG. 11 shows a block diagram 1100 of a device 1105 that supports multi-user preamble format for a WLAN in accordance with aspects of the present disclosure. The device 1105 may be an example of aspects of a device 1005 or a station 115 as described herein. The device 1105 may include a receiver 1110, a communications manager 1115, and a transmitter 1155. The device 1105 may also include a processor. Each of these components may be in communication with one another (e.g., via one or more buses).

Receiver 1110 may receive information such as packets, user data, or control information associated with various information channels (e.g., control channels, data channels, and information related to multi-user preamble format for a WLAN). Information may be passed on to other components of the device. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a message component 1120, a bandwidth common field component 1125, a transmission component 1130, a signaling component 1135, a per-user field component 1140, a spatial configuration subfield component 1145, and a common per-user field component 1150. The communications manager 1115 may be an example of aspects of the communications manager 1305 described herein.

The message component 1120 may receive from an access point, a SIG-A portion of a preamble for a MU-MIMO transmission, where the SIG-A portion configures a bandwidth of the MU-MIMO transmission and indicates that a SIG-B portion of the preamble includes a full bandwidth common field. In some implementations, SIG-A and SIG-B fields may be high efficiency (HE) fields, EHT fields, or a combination of thereof. In some cases, preambles may be an HE preamble, an EHT preamble, or a combination thereof. In some cases, LTFs may be HE-LTFs, EHT-LTFs, or a combination thereof.

The bandwidth common field component 1125 may receive from the access point, the SIG-B portion of the preamble, the SIG-B portion including the full bandwidth common field duplicated once on each of a set of segments of the bandwidth, where the full bandwidth common field configures a puncturing pattern for the bandwidth and a number of a set of stations for the MU-MIMO transmission.

The transmission component 1130 may perform the MU-MIMO transmission to the access point on the bandwidth in accordance with the puncturing pattern. The signaling component 1135 may receive from an access point, a SIG-A portion of a preamble for a MU-MIMO transmission.

The per-user field component 1140 may receive from the access point, a SIG-B portion of the preamble, the SIG-B portion including multiple instances of a per-user field for the station of a set of stations associated with the MU-MIMO transmission, where the multiple instances of the per-user field collectively indicate a spatial configuration of the station for the MU-MIMO transmission. The transmission component 1130 may perform the MU-MIMO transmission to the access point according to the indicated spatial configuration.

The signaling component 1135 may receive from an access point, a SIG-A portion of a preamble for a MU-MIMO transmission. The spatial configuration subfield component 1145 may receive from the access point, a SIG-B portion of the preamble, the SIG-B portion including a set of per-user fields, each per-user field indicating a spatial configuration of a different station of a set of stations associated with the MU-MIMO transmission, where a first spatial configuration of a first per-user field of the set per-user fields references a first spatial configuration table, and one or more remaining spatial configurations of one or more remaining per-user fields of the set of per-user fields reference a second spatial configuration table.

The transmission component 1130 may perform the MU-MIMO transmission to the access point according to the indicated spatial configurations. The signaling component 1135 may receive from an access point, a SIG-A portion of a preamble for a MU-MIMO transmission.

The common per-user field component 1150 may receive from the access point, a SIG-B portion of the preamble, the SIG-B portion including an indication of a spatial configuration table and a set of per-user fields, the spatial configuration table indicating a spatial configuration of a different station of a set of stations associated with the MU-MIMO transmission by reference to the indicated spatial configuration table. The transmission component 1130 may perform the MU-MIMO transmission to the access point according to the indicated spatial configurations.

Transmitter 1155 may transmit signals generated by other components of the device. In some examples, the transmitter 1155 may be collocated with a receiver 1110 in a transceiver module. For example, the transmitter 1155 may be an example of aspects of the transceiver 1320 described with reference to FIG. 13. The transmitter 1155 may utilize a single antenna or a set of antennas.

Figure 12:
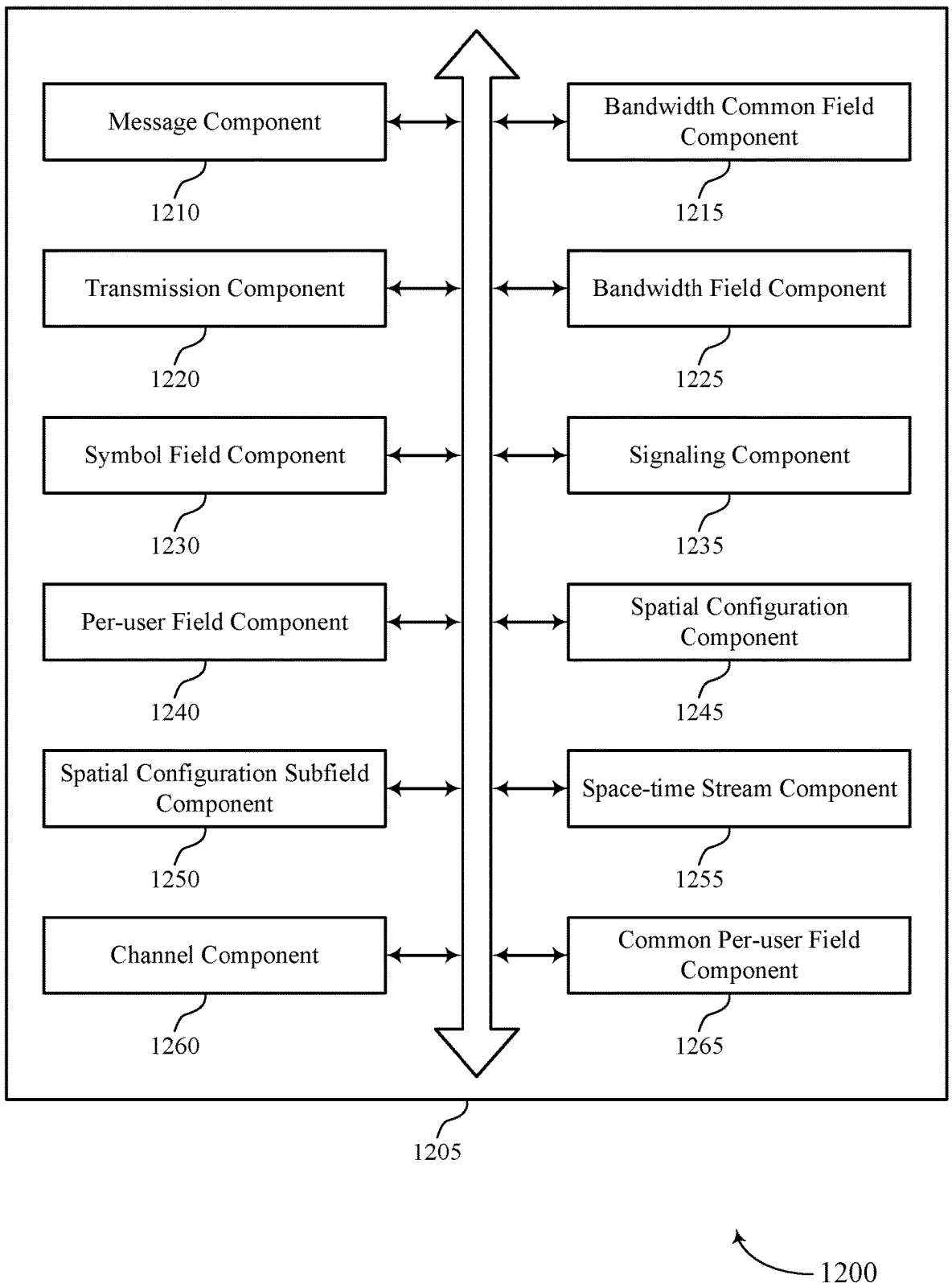
FIG. 12 shows a block diagram of a communications manager that supports multi-user preamble format for a WLAN in accordance with aspects of the present disclosure.

FIG. 12 shows a block diagram 1200 of a communications manager 1205 that supports multi-user preamble format for a WLAN in accordance with aspects of the present disclosure. The communications manager 1205 may be an example of aspects of a communications manager 1015 or a communications manager 1115 described herein. The communications manager 1205 may include a message component 1210, a bandwidth common field component 1215, a transmission component 1220, a bandwidth field component 1225, a symbol field component 1230, a signaling component 1235, a per-user field component 1240, a spatial configuration component 1245, a spatial configuration subfield component 1250, a space-time stream component 1255, a channel component 1260, and a common per-user field component 1265. Each of these modules may communicate, directly or indirectly, with one another (e.g., via one or more buses).

The message component 1210 may receive from an access point, a SIG-A portion of a preamble for a MU-MIMO transmission, where the SIG-A portion configures a bandwidth of the MU-MIMO transmission and indicates that a SIG-B portion of the preamble includes a full bandwidth common field. In some implementations, SIG-A and SIG-B fields may be high efficiency (HE) fields, EHT fields, or a combination of thereof. In some cases, preambles may be an HE preamble, an EHT preamble, or a combination thereof. In some cases, LTFs may be HE-LTFs, EHT-LTFs, or a combination thereof.

In some examples, receiving the SIG-A portion of the preamble includes determining that a bit of a SIG-B Compression field is set to indicate that the SIG-B includes the full bandwidth common field. In some examples, receiving the SIG-A portion of the preamble includes determining that a bit of a SIG-B Compression field is set to indicate that the SIG-B includes an OFDMA common field indicating an RU allocation and the number of the set of stations. In some cases, the bandwidth of the MU-MIMO transmission is 320 MHz. In some cases, each of the set of segments of the bandwidth is 20 MHz.

The bandwidth common field component 1215 may receive from the access point, the SIG-B portion of the preamble, the SIG-B portion including the full bandwidth common field duplicated once on each of a set of segments of the bandwidth, where the full bandwidth common field configures a puncturing pattern for the bandwidth and a number of a set of stations for the MU-MIMO transmission.

In some examples, the bandwidth common field component 1215 may receive a first field of the full bandwidth common field indicating the puncturing pattern of the bandwidth, a second field of the full bandwidth common field indicating the number of the set of stations for the MU-MIMO transmission, a third field of the full bandwidth common field including a cyclic redundancy check, and a fourth field of the full bandwidth common field including a convolutional decoding tail.

In some examples, the bandwidth common field component 1215 may receive a first field of the full bandwidth common field indicating the puncturing pattern of the bandwidth and the number of the set of stations for the MU-MIMO transmission, a second field of the full bandwidth common field including a cyclic redundancy check, and a third field of the full bandwidth common field including a convolutional decoding tail. In some cases, the first field of the full bandwidth common field includes 5 bits, the second field of the full bandwidth common field includes 4 bits, the third field of the full bandwidth common field includes 4 bits, and the fourth field of the full bandwidth common field includes 6 bits.

In some cases, the first field of the full bandwidth common field includes 9 bits, the second field of the full bandwidth common field includes 4 bits, and the third field of the full bandwidth common field includes 6 bits. In some cases, the SIG-B portion of the preamble further includes a user field, the full bandwidth common field and the user field being included in the SIG-B portion of the preamble without a padding in between.

In some cases, the full bandwidth common field is encoded using a BCC with a code rate of ½, the full bandwidth common field including 19 bits. The transmission component 1220 may perform the MU-MIMO transmission to the access point on the bandwidth in accordance with the puncturing pattern. In some examples, the transmission component 1220 may perform the MU-MIMO transmission to the access point according to the indicated spatial configuration. In some examples, the transmission component 1220 may perform the MU-MIMO transmission to the access point according to the indicated spatial configurations.

In some examples, the transmission component 1220 may perform the MU-MIMO transmission to the access point according to the indicated spatial configurations. The signaling component 1235 may receive from an access point, a SIG-A portion of a preamble for a MU-MIMO transmission.

The per-user field component 1240 may receive from the access point, a SIG-B portion of the preamble, the SIG-B portion including multiple instances of a per-user field for the station of a set of stations associated with the MU-MIMO transmission, where the multiple instances of the per-user field collectively indicate a spatial configuration of the station for the MU-MIMO transmission.

The spatial configuration subfield component 1250 may receive from the access point, a SIG-B portion of the preamble, the SIG-B portion including a set of per-user fields, each per-user field indicating a spatial configuration of a different station of a set of stations associated with the MU-MIMO transmission, where a first spatial configuration of a first per-user field of the set per-user fields references a first spatial configuration table, and one or more remaining spatial configurations of one or more remaining per-user fields of the set of per-user fields reference a second spatial configuration table. In some examples, the spatial configuration subfield component 1250 may receive the set of per-user fields of the SIG-B portion of the preamble arranged in a descending order of a number of space-time streams per station.

In some cases, the spatial configuration of each per-user field indicates a starting space-time stream index and a number of space-time streams allocated to the station associated with that per-user field. In some cases, the first spatial configuration table is smaller than the second spatial configuration table. In some cases, the first spatial configuration of the first per-user field has a format different from the one or more remaining spatial configurations of the one or more remaining per-user fields.

The common per-user field component 1265 may receive from the access point, a SIG-B portion of the preamble, the SIG-B portion including an indication of a spatial configuration table and a set of per-user fields, the spatial configuration table indicating a spatial configuration of a different station of a set of stations associated with the MU-MIMO transmission by reference to the indicated spatial configuration table.

In some examples, the common per-user field component 1265 may receive the set of per-user fields of the SIG-B portion of the preamble arranged in a descending order of number of space-time streams per station. In some examples, the common per-user field component 1265 may identify a per-user field from the set of per-user fields using a station identifier. In some cases, the spatial configuration indicates a starting space-time stream index and a number of space-time streams allocated to the station associated with that per-user field. In some cases, the spatial configuration table includes 8 bits.

The bandwidth field component 1225 may receive a bandwidth field and a bandwidth extension field of the SIG-A, the bandwidth field and the bandwidth extension field collectively configuring the bandwidth of the MU-MIMO transmission. In some cases, the bandwidth extension field is repurposed from a number of SIG-B symbols or MU-MIMO users field of the SIG-A portion of the preamble. In some cases, the bandwidth field and the bandwidth extension field collectively configure a coarse puncturing of the bandwidth of the MU-MIMO transmission. The symbol field component 1230 may receive a number of LTF symbols field and a number of LTF symbols extension field to configure a number of LTF symbols in the preamble. In some cases, the number of LTF symbols extension field is repurposed from a number of SIG-B symbols or MU-MIMO users field of the SIG-A portion of the preamble. In some cases, the number of SIG-B symbols or MU-MIMO users field includes 4 bits.

The spatial configuration component 1245 may receive, for each instance of the per-user field for the station, a spatial configuration field and a spatial configuration extension field. In some cases, the spatial configuration field indicates a starting space-time index for the station and the spatial configuration extension field indicates a total number of space-time steams allocated to the station. In some cases, the spatial configuration field includes 4 bits and the spatial configuration extension field includes 2 bits.

The space-time stream component 1255 may parse the first per-user field to determine an indication of a total number of space-time streams for the MU-MIMO transmission. In some examples, the space-time stream component 1255 may determine a total number of space-time streams for the MU-MIMO transmission using a set of LTFs of the preamble. The channel component 1260 may determine a channel using a set of LTFs of the preamble.

Figure 13:
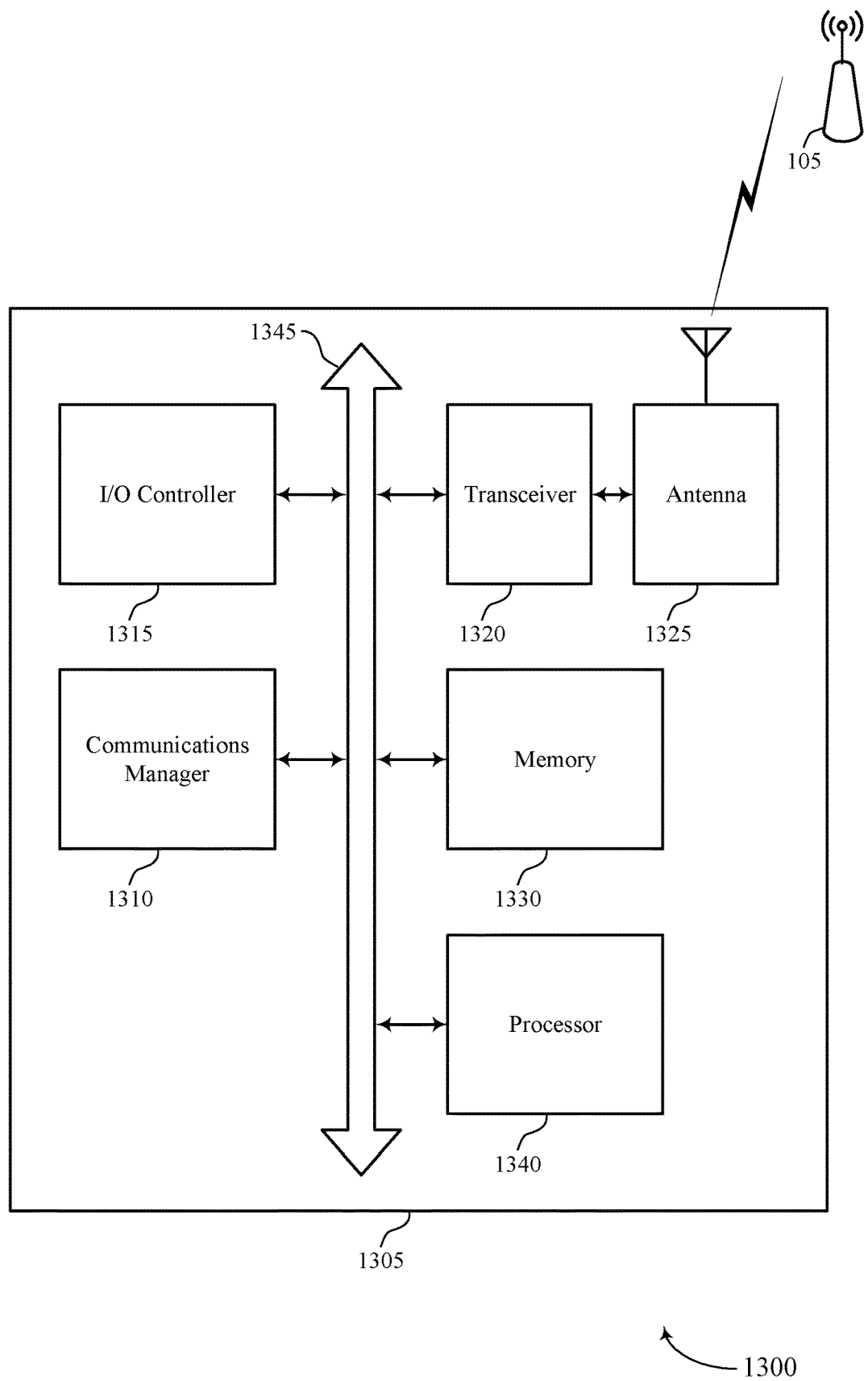
FIG. 13 shows a diagram of a system including a device that supports multi-user preamble format for a WLAN in accordance with aspects of the present disclosure.

FIG. 13 shows a diagram of a system 1300 including a device 1305 that supports multi-user preamble format for a WLAN in accordance with aspects of the present disclosure. The device 1305 may be an example of or include the components of device 1005, device 1105, or a station as described herein. The device 1305 may include components for bi-directional voice and data communications including components for transmitting and receiving communications, including a communications manager 1310, an I/O controller 1315, a transceiver 1320, an antenna 1325, memory 1330, and a processor 1340. These components may be in electronic communication via one or more buses (e.g., bus 1345).

The communications manager 1310 may receive from an access point, a SIG-A portion of a preamble for a MU-MIMO transmission, where the SIG-A portion configures a bandwidth of the MU-MIMO transmission and indicates that a SIG-B portion of the preamble includes a full bandwidth common field, receive from the access point, the SIG-B portion of the preamble, the SIG-B portion including the full bandwidth common field duplicated once on each of a set of segments of the bandwidth, where the full bandwidth common field configures a puncturing pattern for the bandwidth and a number of a set of stations for the MU-MIMO transmission, and perform the MU-MIMO transmission to the access point on the bandwidth in accordance with the puncturing pattern. The communications manager 1310 may also receive from an access point, a SIG-A portion of a preamble for a MU-MIMO transmission, receive from the access point, a SIG-B portion of the preamble, the SIG-B portion including multiple instances of a per-user field for the station of a set of stations associated with the MU-MIMO transmission, where the multiple instances of the per-user field collectively indicate a spatial configuration of the station for the MU-MIMO transmission, and perform the MU-MIMO transmission to the access point according to the indicated spatial configuration. In some implementations, SIG-A and SIG-B fields may be high efficiency (HE) fields, EHT fields, or a combination of thereof. In some cases, preambles may be an HE preamble, an EHT preamble, or a combination thereof. In some cases, LTFs may be HE-LTFs, EHT-LTFs, or a combination thereof.

The communications manager 1310 may also receive from an access point, a SIG-A portion of a preamble for a MU-MIMO transmission, receive from the access point, a SIG-B portion of the preamble, the SIG-B portion including a set of per-user fields, each per-user field indicating a spatial configuration of a different station of a set of stations associated with the MU-MIMO transmission, where a first spatial configuration of a first per-user field of the set per-user fields references a first spatial configuration table, and one or more remaining spatial configurations of one or more remaining per-user fields of the set of per-user fields reference a second spatial configuration table, and perform the MU-MIMO transmission to the access point according to the indicated spatial configurations. The communications manager 1310 may also receive from an access point, a SIG-A portion of a preamble for a MU-MIMO transmission, receive from the access point, a SIG-B portion of the preamble, the SIG-B portion including an indication of a spatial configuration table and a set of per-user fields, the spatial configuration table indicating a spatial configuration of a different station of a set of stations associated with the MU-MIMO transmission by reference to the indicated spatial configuration table, and perform the MU-MIMO transmission to the access point according to the indicated spatial configurations.

I/O controller 1315 may manage input and output signals for device 1305. I/O controller 1315 may also manage peripherals not integrated into device 1305. In some cases, I/O controller 1315 may represent a physical connection or port to an external peripheral. In some cases, I/O controller 1315 may utilize an operating system such as iOS®, ANDROID®, MS-DOS®, MS-WINDOWS®, OS/2®, UNIX®, LINUX®, or another known operating system. In other cases, I/O controller 1315 may represent or interact with a modem, a keyboard, a mouse, a touchscreen, or a similar device. In some cases, I/O controller 1315 may be implemented as part of a processor. In some cases, a user may interact with device 1305 via I/O controller 1315 or via hardware components controlled by I/O controller 1315.

Transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas. In some cases, the wireless device may include a single antenna 1325. However, in some cases the device may have more than one antenna 1325, which may be capable of concurrently transmitting or receiving multiple wireless transmissions.

Memory 1330 may include RAM and ROM. The memory 1330 may store computer-readable, computer-executable software 1335 including instructions that, when executed, cause the processor to perform various functions described herein. In some cases, the memory 1330 may contain, among other things, a BIOS which may control basic hardware or software operation such as the interaction with peripheral components or devices.

Processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1340 may be configured to operate a memory array using a memory controller. In other cases, a memory controller may be integrated into processor 1340. Processor 1340 may be configured to execute computer-readable instructions stored in a memory to perform various functions (e.g., functions or tasks supporting multi-user preamble format for a WLAN).

Figure 14:
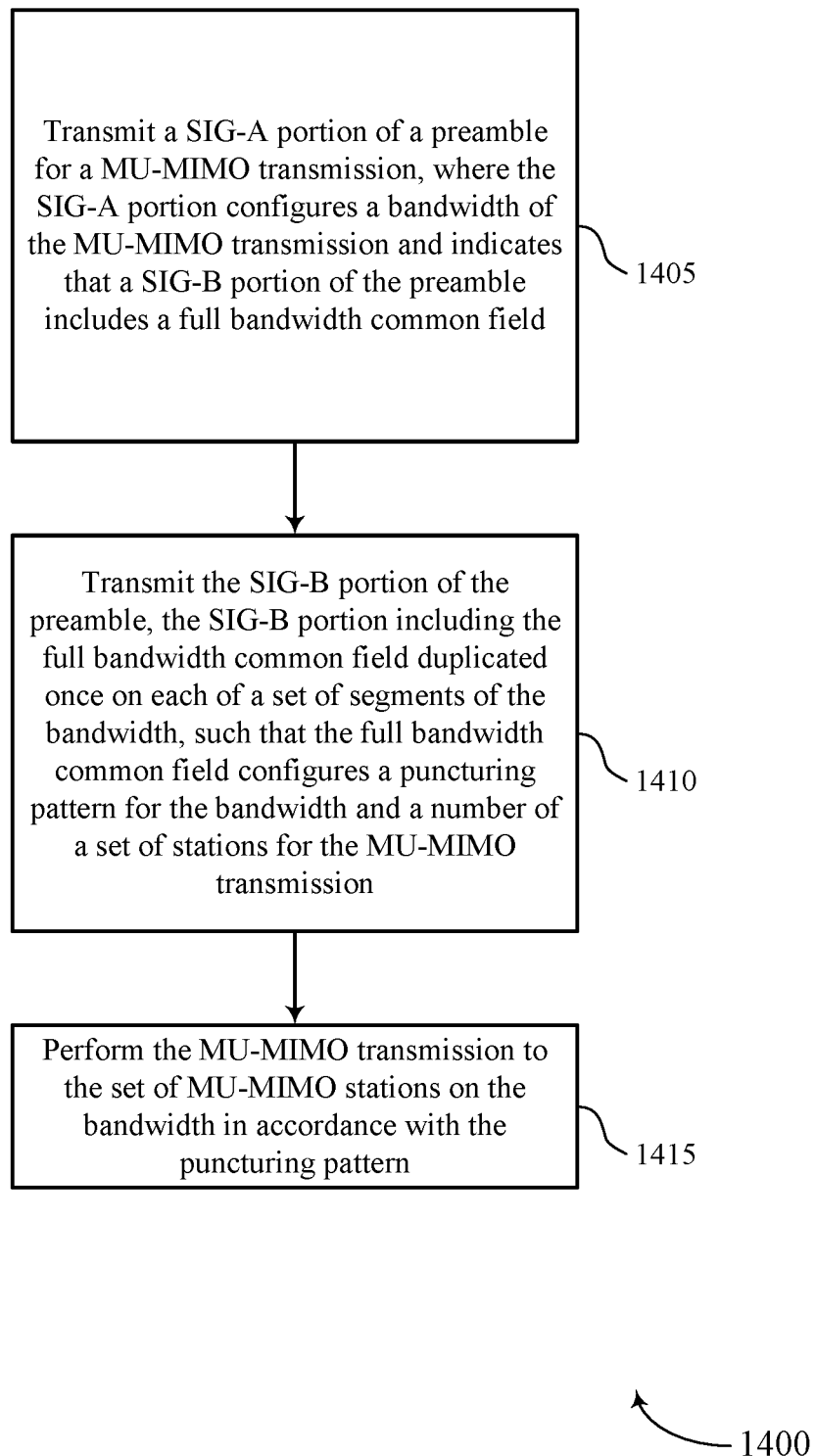
FIGS. 14 through 21 show flowcharts illustrating methods that support multi-user preamble format for a WLAN in accordance with aspects of the present disclosure.

FIG. 14 shows a flowchart illustrating a method 1400 that supports multi-user preamble format for a WLAN in accordance with aspects of the present disclosure. The operations of method 1400 may be implemented by an access point or its components as described herein. For example, the operations of method 1400 may be performed by a communications manager as described with reference to FIGS. 6 through 9. In some examples, an access point may execute a set of instructions to control the functional elements of the access point to perform the functions described below. Additionally or alternatively, an access point may perform aspects of the functions described below using special-purpose hardware.

At 1405, the access point may transmit a SIG-A portion of a preamble for a MU-MIMO transmission, where the SIG-A portion configures a bandwidth of the MU-MIMO transmission and indicates that a SIG-B portion of the preamble includes a full bandwidth common field. The operations of 1405 may be performed according to the methods described herein. In some examples, aspects of the operations of 1405 may be performed by a message component as described with reference to FIGS. 6 through 9. In some implementations, SIG-A and SIG-B fields may be high efficiency (HE) fields, EHT fields, or a combination of thereof. In some cases, preambles may be an HE preamble, an EHT preamble, or a combination thereof. In some cases, LTFs may be HE-LTFs, EHT-LTFs, or a combination thereof.

At 1410, the access point may transmit the SIG-B portion of the preamble, the SIG-B portion including the full bandwidth common field duplicated once on each of a set of segments of the bandwidth, where the full bandwidth common field configures a puncturing pattern for the bandwidth and a number of a set of stations for the MU-MIMO transmission. The operations of 1410 may be performed according to the methods described herein. In some examples, aspects of the operations of 1410 may be performed by a bandwidth common field component as described with reference to FIGS. 6 through 9.

At 1415, the access point may perform the MU-MIMO transmission to the set of MU-MIMO stations on the bandwidth in accordance with the puncturing pattern. The operations of 1415 may be performed according to the methods described herein. In some examples, aspects of the operations of 1415 may be performed by a transmission component as described with reference to FIGS. 6 through 9.

Figure 15:
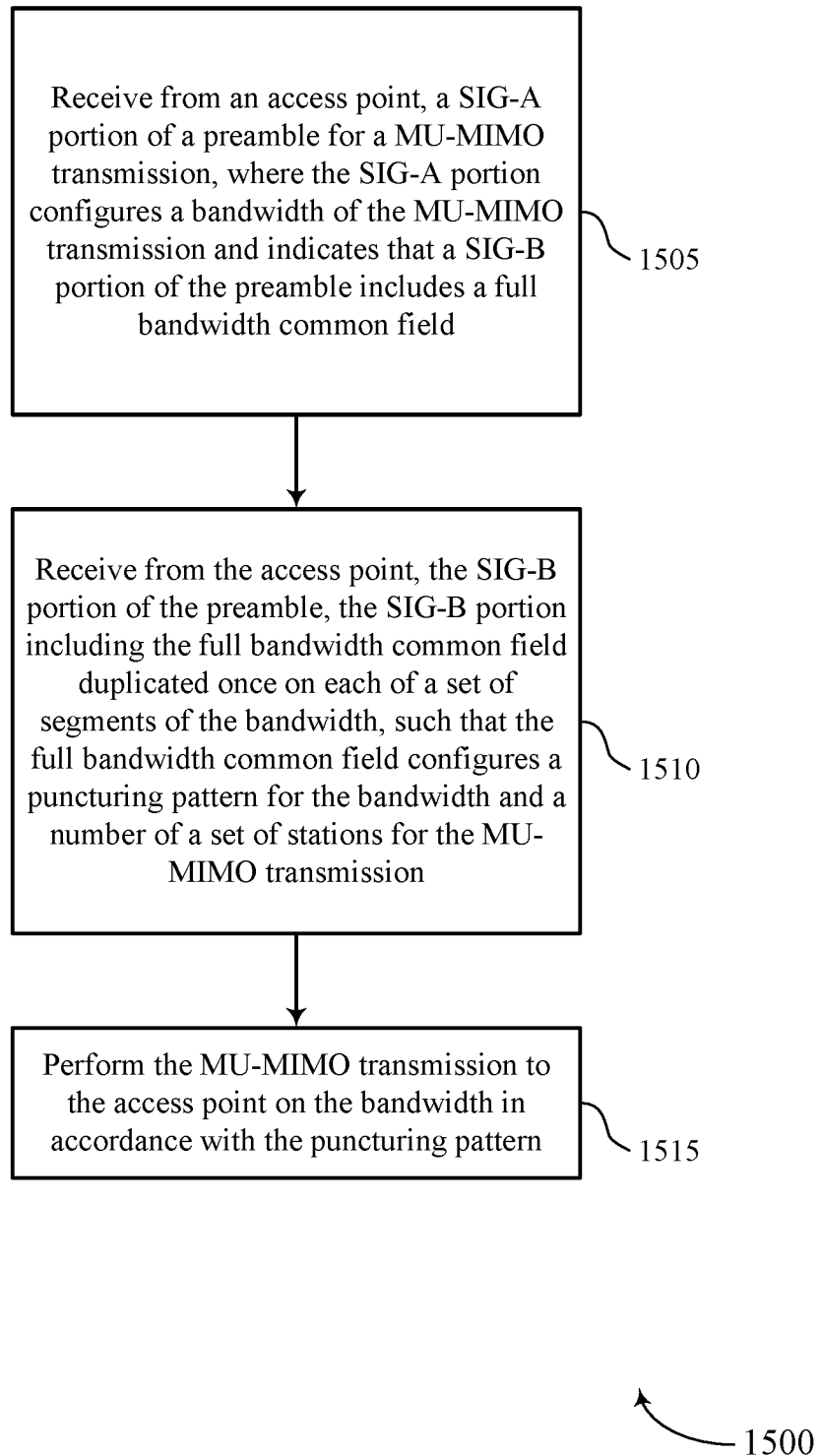

FIG. 15 shows a flowchart illustrating a method 1500 that supports multi-user preamble format for a WLAN in accordance with aspects of the present disclosure. The operations of method 1500 may be implemented by a station or its components as described herein. For example, the operations of method 1500 may be performed by a communications manager as described with reference to FIGS. 10 through 13. In some examples, a station may execute a set of instructions to control the functional elements of the station to perform the functions described below. Additionally or alternatively, a station may perform aspects of the functions described below using special-purpose hardware.

At 1505, the station may receive from an access point, a SIG-A portion of a preamble for a MU-MIMO transmission, where the SIG-A portion configures a bandwidth of the MU-MIMO transmission and indicates that a SIG-B portion of the preamble includes a full bandwidth common field. The operations of 1505 may be performed according to the methods described herein. In some examples, aspects of the operations of 1505 may be performed by a message component as described with reference to FIGS. 10 through 13. In some implementations, SIG-A and SIG-B fields may be high efficiency (HE) fields, EHT fields, or a combination of thereof. In some cases, preambles may be an HE preamble, an EHT preamble, or a combination thereof. In some cases, LTFs may be HE-LTFs, EHT-LTFs, or a combination thereof.

At 1510, the station may receive from the access point, the SIG-B portion of the preamble, the SIG-B portion including the full bandwidth common field duplicated once on each of a set of segments of the bandwidth, where the full bandwidth common field configures a puncturing pattern for the bandwidth and a number of a set of stations for the MU-MIMO transmission. The operations of 1510 may be performed according to the methods described herein. In some examples, aspects of the operations of 1510 may be performed by a bandwidth common field component as described with reference to FIGS. 10 through 13.

At 1515, the station may perform the MU-MIMO transmission to the access point on the bandwidth in accordance with the puncturing pattern. The operations of 1515 may be performed according to the methods described herein. In some examples, aspects of the operations of 1515 may be performed by a transmission component as described with reference to FIGS. 10 through 13.

Figure 16:
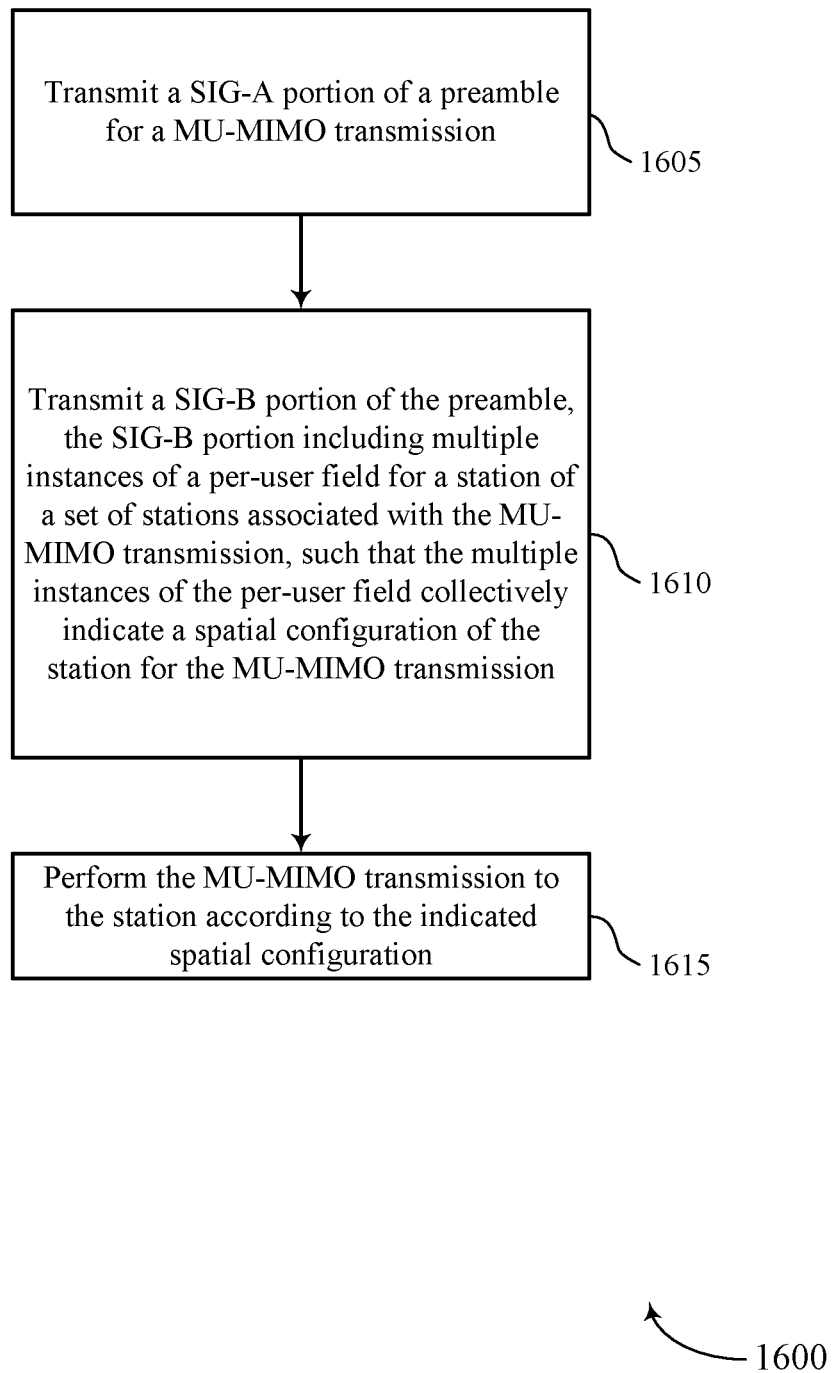

FIG. 16 shows a flowchart illustrating a method 1600 that supports multi-user preamble format for a WLAN in accordance with aspects of the present disclosure. The operations of method 1600 may be implemented by an access point or its components as described herein. For example, the operations of method 1600 may be performed by a communications manager as described with reference to FIGS. 6 through 9. In some examples, an access point may execute a set of instructions to control the functional elements of the access point to perform the functions described below. Additionally or alternatively, an access point may perform aspects of the functions described below using special-purpose hardware.

At 1605, the access point may transmit a SIG-A portion of a preamble for a MU-MIMO transmission. The operations of 1605 may be performed according to the methods described herein. In some examples, aspects of the operations of 1605 may be performed by a signaling component as described with reference to FIGS. 6 through 9. In some implementations, SIG-A and SIG-B fields may be high efficiency (HE) fields, EHT fields, or a combination of thereof. In some cases, preambles may be an HE preamble, an EHT preamble, or a combination thereof. In some cases, LTFs may be HE-LTFs, EHT-LTFs, or a combination thereof.

At 1610, the access point may transmit a SIG-B portion of the preamble, the SIG-B portion including multiple instances of a per-user field for a station of a set of stations associated with the MU-MIMO transmission, where the multiple instances of the per-user field collectively indicate a spatial configuration of the station for the MU-MIMO transmission. The operations of 1610 may be performed according to the methods described herein. In some examples, aspects of the operations of 1610 may be performed by a per-user field component as described with reference to FIGS. 6 through 9.

At 1615, the access point may perform the MU-MIMO transmission to the station according to the indicated spatial configuration. The operations of 1615 may be performed according to the methods described herein. In some examples, aspects of the operations of 1615 may be performed by a transmission component as described with reference to FIGS. 6 through 9.

Figure 17:
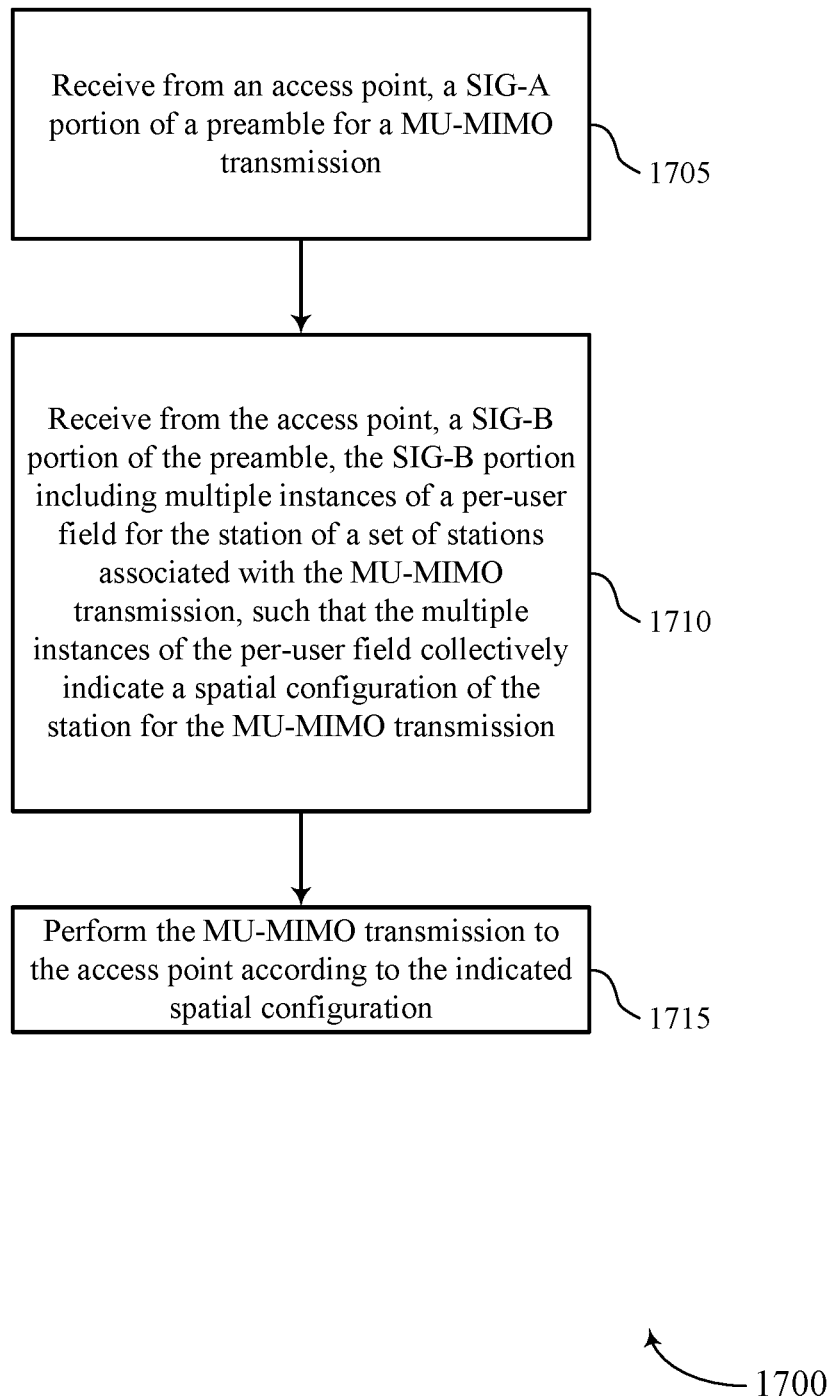

FIG. 17 shows a flowchart illustrating a method 1700 that supports multi-user preamble format for a WLAN in accordance with aspects of the present disclosure. The operations of method 1700 may be implemented by a station or its components as described herein. For example, the operations of method 1700 may be performed by a communications manager as described with reference to FIGS. 10 through 13. In some examples, a station may execute a set of instructions to control the functional elements of the station to perform the functions described below. Additionally or alternatively, a station may perform aspects of the functions described below using special-purpose hardware.

At 1705, the station may receive from an access point, a SIG-A portion of a preamble for a MU-MIMO transmission. The operations of 1705 may be performed according to the methods described herein. In some examples, aspects of the operations of 1705 may be performed by a signaling component as described with reference to FIGS. 10 through 13. In some implementations, SIG-A and SIG-B fields may be high efficiency (HE) fields, EHT fields, or a combination of thereof. In some cases, preambles may be an HE preamble, an EHT preamble, or a combination thereof. In some cases, LTFs may be HE-LTFs, EHT-LTFs, or a combination thereof.

At 1710, the station may receive from the access point, a SIG-B portion of the preamble, the SIG-B portion including multiple instances of a per-user field for the station of a set of stations associated with the MU-MIMO transmission, where the multiple instances of the per-user field collectively indicate a spatial configuration of the station for the MU-MIMO transmission. The operations of 1710 may be performed according to the methods described herein. In some examples, aspects of the operations of 1710 may be performed by a per-user field component as described with reference to FIGS. 10 through 13.

At 1715, the station may perform the MU-MIMO transmission to the access point according to the indicated spatial configuration. The operations of 1715 may be performed according to the methods described herein. In some examples, aspects of the operations of 1715 may be performed by a transmission component as described with reference to FIGS. 10 through 13.

Figure 18:
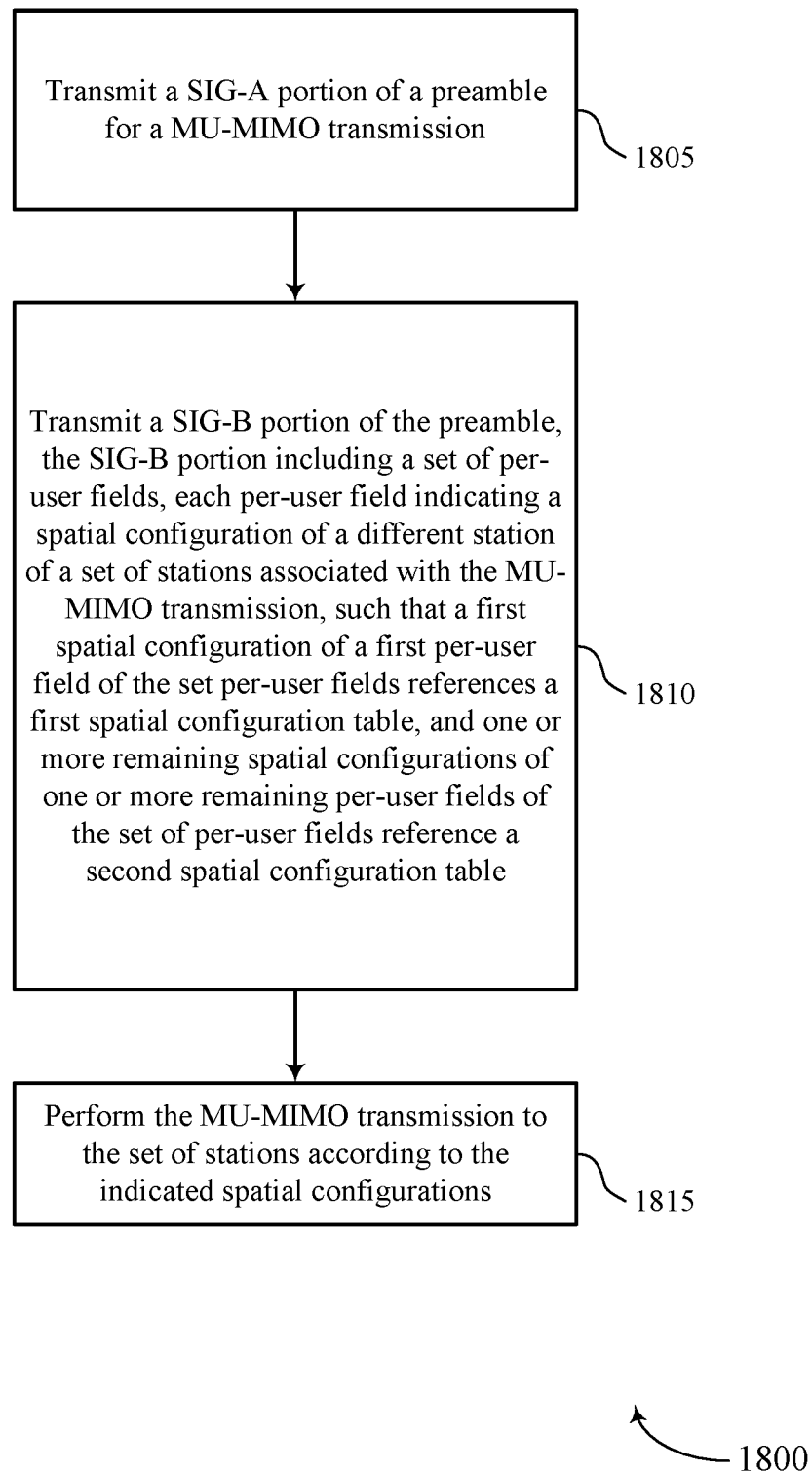

FIG. 18 shows a flowchart illustrating a method 1800 that supports multi-user preamble format for a WLAN in accordance with aspects of the present disclosure. The operations of method 1800 may be implemented by an access point or its components as described herein. For example, the operations of method 1800 may be performed by a communications manager as described with reference to FIGS. 6 through 9. In some examples, an access point may execute a set of instructions to control the functional elements of the access point to perform the functions described below. Additionally or alternatively, an access point may perform aspects of the functions described below using special-purpose hardware.

At 1805, the access point may transmit a SIG-A portion of a preamble for a MU-MIMO transmission. The operations of 1805 may be performed according to the methods described herein. In some examples, aspects of the operations of 1805 may be performed by a signaling component as described with reference to FIGS. 6 through 9. In some implementations, SIG-A and SIG-B fields may be high efficiency (HE) fields, EHT fields, or a combination of thereof. In some cases, preambles may be an HE preamble, an EHT preamble, or a combination thereof. In some cases, LTFs may be HE-LTFs, EHT-LTFs, or a combination thereof.

At 1810, the access point may transmit a SIG-B portion of the preamble, the SIG-B portion including a set of per-user fields, each per-user field indicating a spatial configuration of a different station of a set of stations associated with the MU-MIMO transmission, where a first spatial configuration of a first per-user field of the set per-user fields references a first spatial configuration table, and one or more remaining spatial configurations of one or more remaining per-user fields of the set of per-user fields reference a second spatial configuration table. The operations of 1810 may be performed according to the methods described herein. In some examples, aspects of the operations of 1810 may be performed by a spatial configuration subfield component as described with reference to FIGS. 6 through 9.

At 1815, the access point may perform the MU-MIMO transmission to the set of stations according to the indicated spatial configurations. The operations of 1815 may be performed according to the methods described herein. In some examples, aspects of the operations of 1815 may be performed by a transmission component as described with reference to FIGS. 6 through 9.

Figure 19:
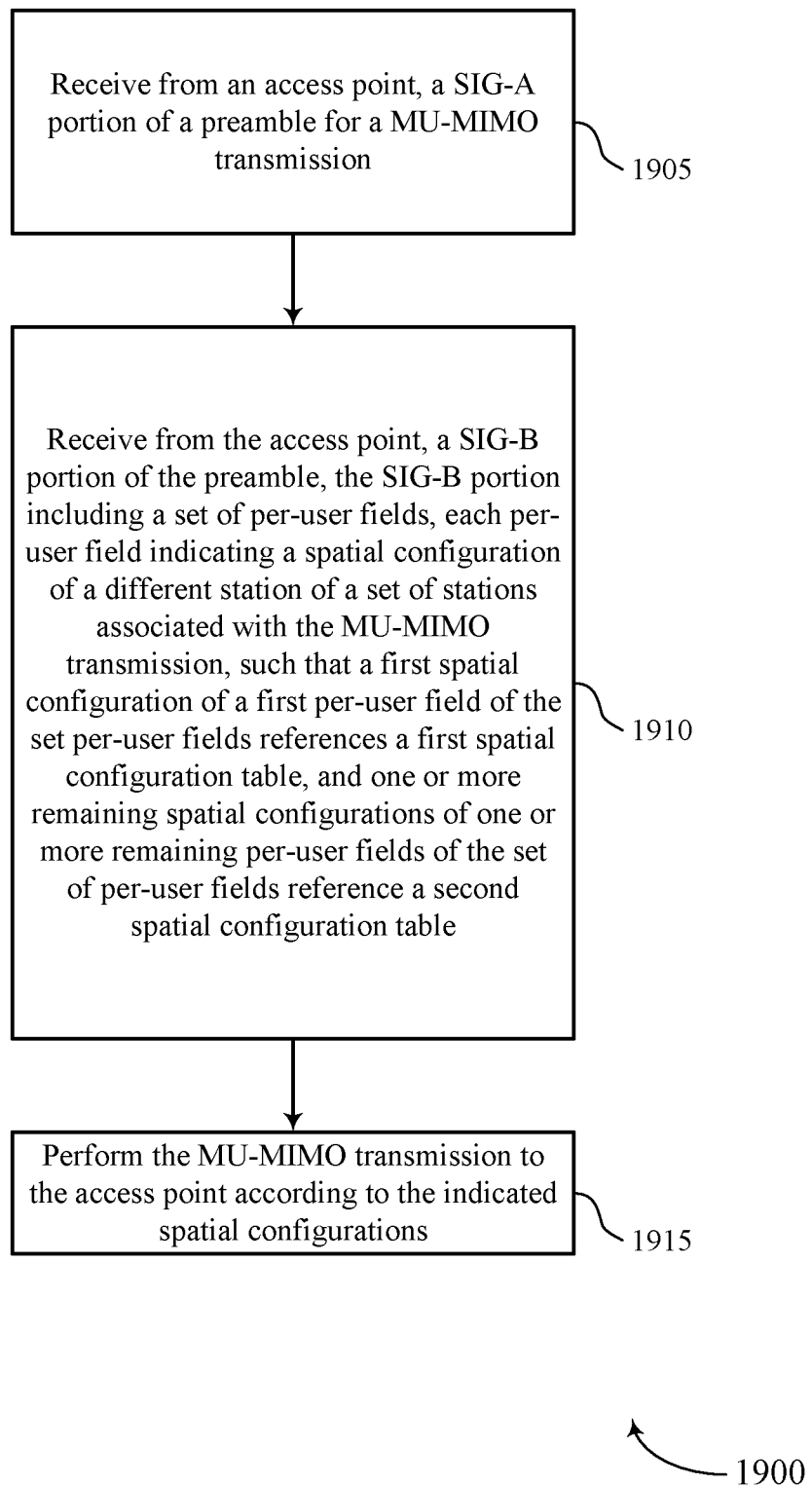

FIG. 19 shows a flowchart illustrating a method 1900 that supports multi-user preamble format for a WLAN in accordance with aspects of the present disclosure. The operations of method 1900 may be implemented by a station or its components as described herein. For example, the operations of method 1900 may be performed by a communications manager as described with reference to FIGS. 10 through 13. In some examples, a station may execute a set of instructions to control the functional elements of the station to perform the functions described below. Additionally or alternatively, a station may perform aspects of the functions described below using special-purpose hardware.

At 1905, the station may receive from an access point, a SIG-A portion of a preamble for a MU-MIMO transmission. The operations of 1905 may be performed according to the methods described herein. In some examples, aspects of the operations of 1905 may be performed by a signaling component as described with reference to FIGS. 10 through 13. In some implementations, SIG-A and SIG-B fields may be high efficiency (HE) fields, EHT fields, or a combination of thereof. In some cases, preambles may be an HE preamble, an EHT preamble, or a combination thereof. In some cases, LTFs may be HE-LTFs, EHT-LTFs, or a combination thereof.

At 1910, the station may receive from the access point, a SIG-B portion of the preamble, the SIG-B portion including a set of per-user fields, each per-user field indicating a spatial configuration of a different station of a set of stations associated with the MU-MIMO transmission, where a first spatial configuration of a first per-user field of the set per-user fields references a first spatial configuration table, and one or more remaining spatial configurations of one or more remaining per-user fields of the set of per-user fields reference a second spatial configuration table. The operations of 1910 may be performed according to the methods described herein. In some examples, aspects of the operations of 1910 may be performed by a spatial configuration subfield component as described with reference to FIGS. 10 through 13.

At 1915, the station may perform the MU-MIMO transmission to the access point according to the indicated spatial configurations. The operations of 1915 may be performed according to the methods described herein. In some examples, aspects of the operations of 1915 may be performed by a transmission component as described with reference to FIGS. 10 through 13.

Figure 20:
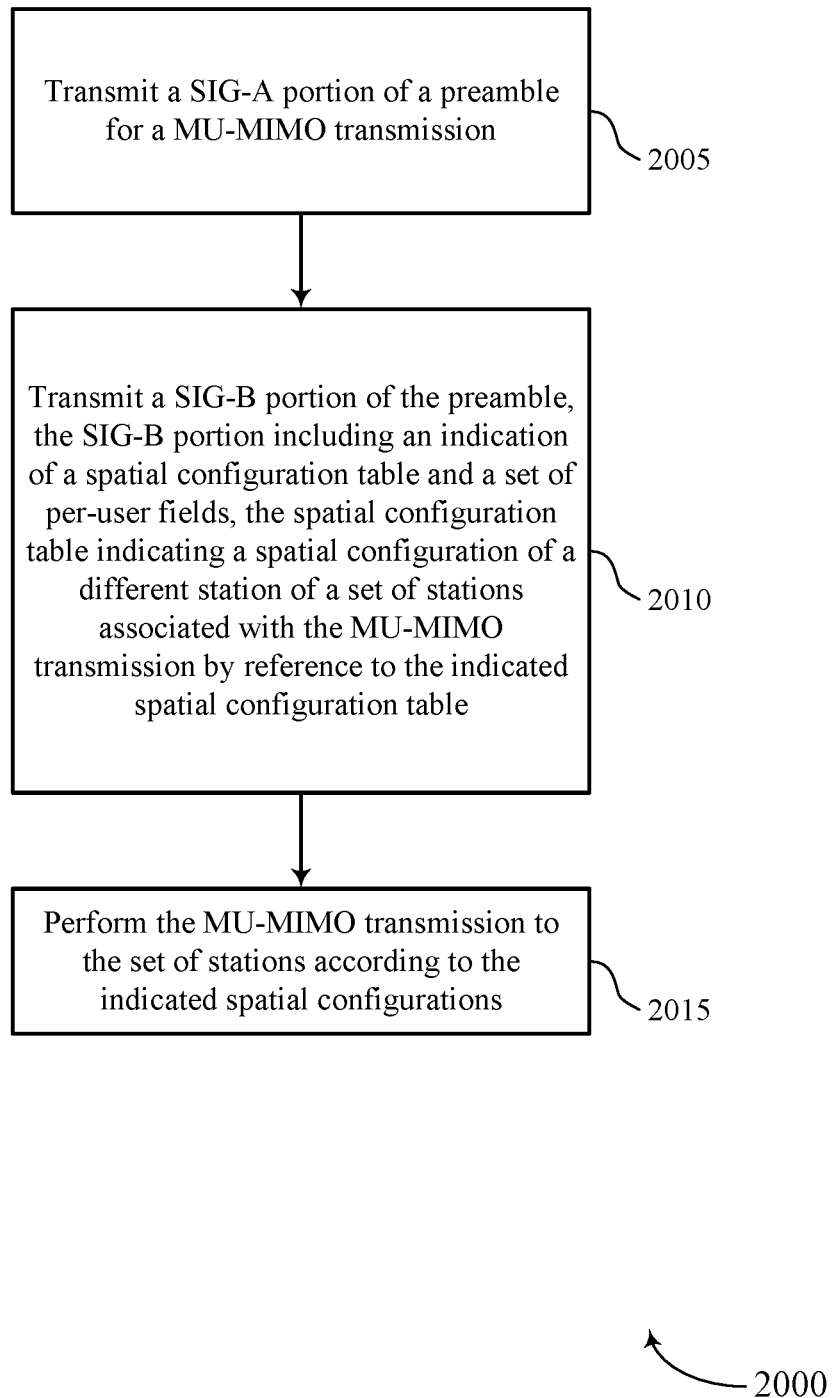

FIG. 20 shows a flowchart illustrating a method 2000 that supports multi-user preamble format for a WLAN in accordance with aspects of the present disclosure. The operations of method 2000 may be implemented by an access point or its components as described herein. For example, the operations of method 2000 may be performed by a communications manager as described with reference to FIGS. 6 through 9. In some examples, an access point may execute a set of instructions to control the functional elements of the access point to perform the functions described below. Additionally or alternatively, an access point may perform aspects of the functions described below using special-purpose hardware.

At 2005, the access point may transmit a SIG-A portion of a preamble for a MU-MIMO transmission. The operations of 2005 may be performed according to the methods described herein. In some examples, aspects of the operations of 2005 may be performed by a signaling component as described with reference to FIGS. 6 through 9. In some implementations, SIG-A and SIG-B fields may be high efficiency (HE) fields, EHT fields, or a combination of thereof. In some cases, preambles may be an HE preamble, an EHT preamble, or a combination thereof. In some cases, LTFs may be HE-LTFs, EHT-LTFs, or a combination thereof.

At 2010, the access point may transmit a SIG-B portion of the preamble, the SIG-B portion including an indication of a spatial configuration table and a set of per-user fields, the spatial configuration table indicating a spatial configuration of a different station of a set of stations associated with the MU-MIMO transmission by reference to the indicated spatial configuration table. The operations of 2010 may be performed according to the methods described herein. In some examples, aspects of the operations of 2010 may be performed by a common per-user field component as described with reference to FIGS. 6 through 9.

At 2015, the access point may perform the MU-MIMO transmission to the set of stations according to the indicated spatial configurations. The operations of 2015 may be performed according to the methods described herein. In some examples, aspects of the operations of 2015 may be performed by a transmission component as described with reference to FIGS. 6 through 9.

Figure 21:
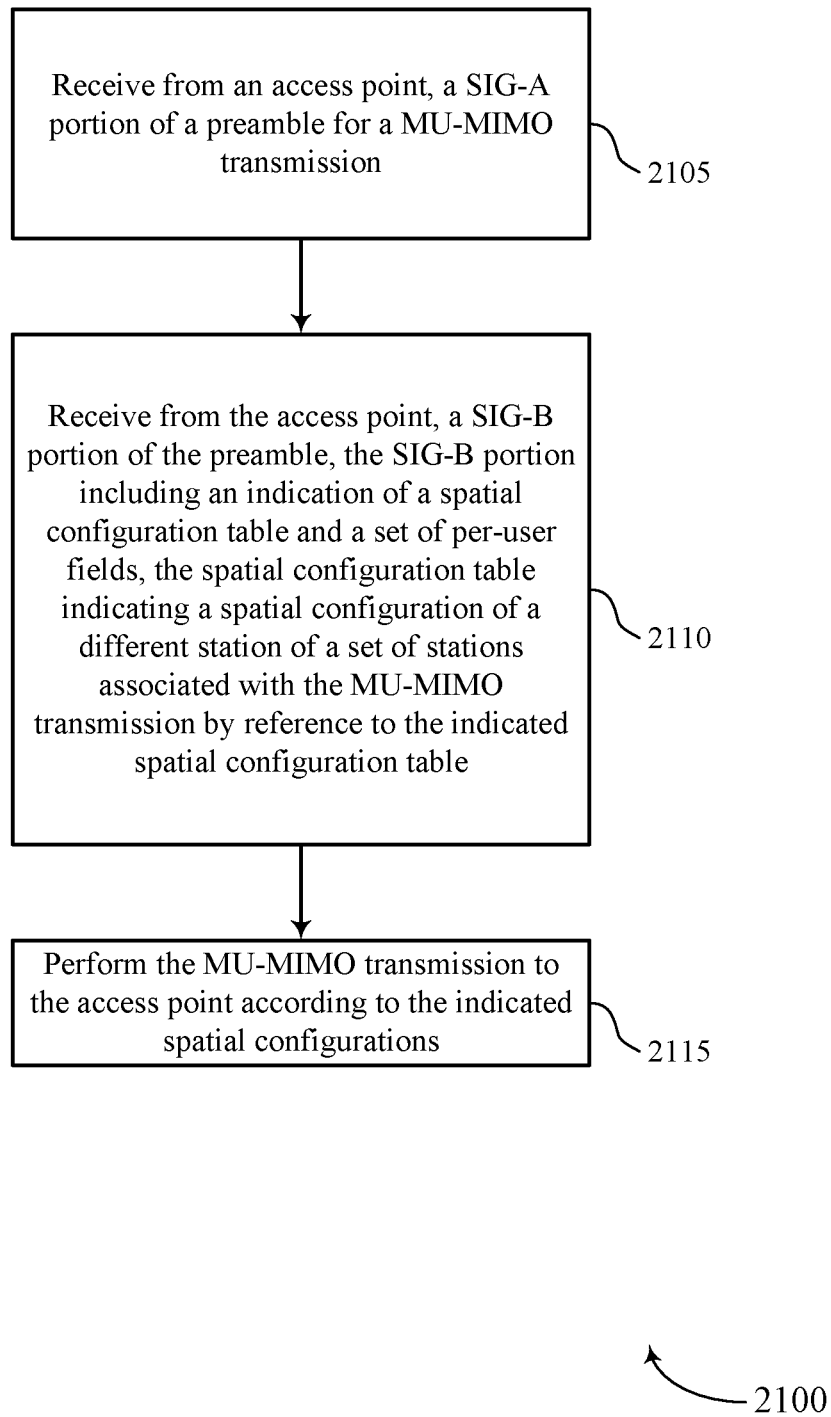

FIG. 21 shows a flowchart illustrating a method 2100 that supports multi-user preamble format for a WLAN in accordance with aspects of the present disclosure. The operations of method 2100 may be implemented by a station or its components as described herein. For example, the operations of method 2100 may be performed by a communications manager as described with reference to FIGS. 10 through 13. In some examples, a station may execute a set of instructions to control the functional elements of the station to perform the functions described below. Additionally or alternatively, a station may perform aspects of the functions described below using special-purpose hardware.

At 2105, the station may receive from an access point, a SIG-A portion of a preamble for a MU-MIMO transmission. The operations of 2105 may be performed according to the methods described herein. In some examples, aspects of the operations of 2105 may be performed by a signaling component as described with reference to FIGS. 10 through 13. In some implementations, SIG-A and SIG-B fields may be high efficiency (HE) fields, EHT fields, or a combination of thereof. In some cases, preambles may be an HE preamble, an EHT preamble, or a combination thereof. In some cases, LTFs may be HE-LTFs, EHT-LTFs, or a combination thereof.

At 2110, the station may receive from the access point, a SIG-B portion of the preamble, the SIG-B portion including an indication of a spatial configuration table and a set of per-user fields, the spatial configuration table indicating a spatial configuration of a different station of a set of stations associated with the MU-MIMO transmission by reference to the indicated spatial configuration table. The operations of 2110 may be performed according to the methods described herein. In some examples, aspects of the operations of 2110 may be performed by a common per-user field component as described with reference to FIGS. 10 through 13.

At 2115, the station may perform the MU-MIMO transmission to the access point according to the indicated spatial configurations. The operations of 2115 may be performed according to the methods described herein. In some examples, aspects of the operations of 2115 may be performed by a transmission component as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), OFDMA, single carrier FDMA (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc.

The wireless communications system or systems described herein may support synchronous or asynchronous operation. For synchronous operation, the stations may have similar frame timing, and transmissions from different stations may be approximately aligned in time. For asynchronous operation, the stations may have different frame timing, and transmissions from different stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 of FIG. 1—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method of wireless communication at a multi-user multiple-input multiple output (MU-MIMO) station, comprising:
receiving from an access point, a first signaling (SIG-A) portion of a preamble for a MU-MIMO transmission, wherein the SIG-A portion configures a bandwidth of the MU-MIMO transmission and indicates that a second signaling (SIG-B) portion of the preamble comprises a full bandwidth common field;
receiving from the access point, the SIG-B portion of the preamble, the SIG-B portion comprising the full bandwidth common field duplicated once on each of a plurality of segments of the bandwidth, wherein the full bandwidth common field configures a puncturing pattern for the bandwidth and a number of a plurality of stations for the MU-MIMO transmission; and
performing the MU-MIMO transmission to the access point on the bandwidth in accordance with the puncturing pattern.

2. The method of claim 1, wherein receiving the SIG-A portion comprises:
receiving a bandwidth field and a bandwidth extension field of the SIG-A, the bandwidth field and the bandwidth extension field collectively configuring the bandwidth of the MU-MIMO transmission.

3. The method of claim 2, wherein the bandwidth extension field is repurposed from a number of SIG-B symbols or MU-MIMO users field of the SIG-A portion of the preamble.

4. The method of claim 2, wherein the bandwidth field and the bandwidth extension field collectively configure a coarse puncturing of the bandwidth of the MU-MIMO transmission.

5. The method of claim 1, wherein receiving the SIG-A portion of the preamble comprises:
receiving a number of legacy training field (LTF) symbols field and a number of LTF symbols extension field to configure a number of LTF symbols in the preamble.

6. The method of claim 5, wherein the number of LTF symbols extension field is repurposed from a number of SIG-B symbols or MU-MIMO users field of the SIG-A portion of the preamble.

7. The method of claim 6, wherein the number of SIG-B symbols or MU-MIMO users field comprises 4 bits.

8. The method of claim 1, wherein:
receiving the SIG-A portion of the preamble comprises determining that a bit of a SIG-B Compression field is set to indicate that the SIG-B comprises the full bandwidth common field.

9. The method of claim 1, wherein:
receiving the SIG-A portion of the preamble comprises determining that a bit of a SIG-B Compression field is set to indicate that the SIG-B comprises an orthogonal frequency-division multiple access (OFDMA) common field indicating a resource unit (RU) allocation and the number of the plurality of stations.

10. The method of claim 1, wherein receiving the SIG-B portion of the preamble comprises:
receiving a first field of the full bandwidth common field indicating the puncturing pattern of the bandwidth, a second field of the full bandwidth common field indicating the number of the plurality of stations for the MU-MIMO transmission, a third field of the full bandwidth common field comprising a cyclic redundancy check, and a fourth field of the full bandwidth common field comprising a convolutional decoding tail.

11. The method of claim 10, wherein the first field of the full bandwidth common field comprises 5 bits, the second field of the full bandwidth common field comprises 4 bits, the third field of the full bandwidth common field comprises 4 bits, and the fourth field of the full bandwidth common field comprises 6 bits.

12. The method of claim 1, wherein receiving the SIG-B portion of the preamble comprises:
receiving a first field of the full bandwidth common field indicating the puncturing pattern of the bandwidth and the number of the plurality of stations for the MU-MIMO transmission, a second field of the full bandwidth common field comprising a cyclic redundancy check, and a third field of the full bandwidth common field comprising a convolutional decoding tail.

13. The method of claim 12, wherein the first field of the full bandwidth common field comprises 9 bits, the second field of the full bandwidth common field comprises 4 bits, and the third field of the full bandwidth common field comprises 6 bits.

14. The method of claim 1, wherein the bandwidth of the MU-MIMO transmission is 320 MHz.

15. The method of claim 1, wherein each of the plurality of segments of the bandwidth is 20 MHz.

16. The method of claim 1, wherein the SIG-B portion of the preamble further comprises a user field, the full bandwidth common field and the user field being included in the SIG-B portion of the preamble without a padding in between.

17. The method of claim 1, wherein the full bandwidth common field is encoded using a binary convolutional code (BCC) with a code rate of ½, the full bandwidth common field comprising 19 bits.

18. A method of wireless communication at a station, comprising:
receiving from an access point, a first signaling (SIG-A) portion of a preamble for a multi-user multiple-input multiple output (MU-MIMO) transmission;

receiving from the access point, a second signaling (SIG-B) portion of the preamble, the SIG-B portion comprising a plurality of per-user fields, each per-user field indicating a spatial configuration of a different station of a plurality of stations associated with the MU-MIMO transmission, wherein a first spatial configuration of a first per-user field of the plurality per-user fields references a first spatial configuration table, and the spatial configurations of each remaining per-user field of the plurality of per-user fields reference a second spatial configuration table, wherein the first spatial configuration table is different from the second spatial configuration table; and performing the MU-MIMO transmission to the access point according to the indicated spatial configurations.

19. The method of claim 18, wherein receiving the SIG-B portion of the preamble comprises:

receiving the plurality of per-user fields of the SIG-B portion of the preamble arranged in a descending order of a number of space-time streams per station.

20. The method of claim 18, wherein the spatial configuration of each per-user field indicates a starting space-time stream index and a number of space-time streams allocated to the station associated with that per-user field.

21. The method of claim 18, wherein the first spatial configuration table is smaller than the second spatial configuration table.

22. The method of claim 18, wherein the first spatial configuration of the first per-user field has a format different from the spatial configurations of each remaining per-user field.

23. The method of claim 18, wherein receiving the SIG-B portion of the preamble comprises:

parsing the first per-user field to determine an indication of a total number of space-time streams for the MU-MIMO transmission.

24. The method of claim 18, wherein receiving the SIG-B portion of the preamble comprises:

determining a total number of space-time streams for the MU-MIMO transmission using a plurality of legacy training fields (LTFs) of the preamble.

25. The method of claim 24, wherein determining the total number of space-time streams for the MU-MIMO transmission comprises:

determining a channel using a plurality of LTFs of the preamble.

26. An apparatus for wireless communication, comprising: a first interface; a second interface; and a wireless modem configured to:

obtain via the first interface, a first signaling (SIG-A) portion of a preamble from an access point for a multi-user multiple-input multiple output (MU-MIMO) transmission, wherein the SIG-A portion configures a bandwidth of the MU-MIMO transmission and indicates that a second signaling (SIG-B) portion of the preamble comprises a full bandwidth common field;

obtain via the first interface, the SIG-B portion of the preamble from the access point, the SIG-B portion comprising the full bandwidth common field duplicated once on each of a plurality of segments of the bandwidth, wherein the full bandwidth common field configures a puncturing pattern for the bandwidth and a number of a plurality of stations for the MU-MIMO transmission; and output via the second interface, the MU-MIMO transmission to the access point on the bandwidth in accordance with the puncturing pattern.

27. The apparatus of claim 26, wherein the wireless modem is further configured to:

obtain via the first interface, a bandwidth field and a bandwidth extension field of the SIG-A, the bandwidth field and the bandwidth extension field collectively configuring the bandwidth of the MU-MIMO transmission.

28. An apparatus for wireless communication, comprising: a first interface; a second interface; and a wireless modem configured to:

obtain via the first interface, a first signaling (SIG-A) portion of a preamble from an access point for a multi-user multiple-input multiple output (MU-MIMO) transmission;

obtain via the first interface, a second signaling (SIG-B) portion of the preamble from the access point, the SIG-B portion comprising a plurality of per-user fields, each per-user field indicating a spatial configuration of a different station of a plurality of stations associated with the MU-MIMO transmission, wherein a first spatial configuration of a first per-user field of the plurality per-user fields references a first spatial configuration table, and the spatial configurations of each remaining per-user field of the plurality of per-user fields reference a second spatial configuration table, wherein the first spatial configuration table is different from the second spatial configuration table; and output via the second interface, the MU-MIMO transmission to the access point according to the indicated spatial configurations.

29. The apparatus of claim 28, wherein the wireless modem is configured to obtain via the first interface, the SIG-B portion of the preamble by:

obtaining via the first interface, the plurality of per-user fields of the SIG-B portion of the preamble arranged in a descending order of a number of space-time streams per station.

30. The apparatus of claim 28, wherein the spatial configuration of each per-user field indicates a starting space-time stream index and a number of space-time streams allocated to the station associated with that per-user field.

* * * * *